(12) United States Patent
Alexander et al.

(10) Patent No.: US 8,495,301 B1
(45) Date of Patent: Jul. 23, 2013

(54) SYSTEM AND METHOD FOR SCATTER GATHER CACHE PROCESSING

(75) Inventors: Praveen Alexander, Royersford, PA (US); Cheng Yi, Vancouver, CA (US); Tao Zhong, Coquitlam, CA (US); David J. Clinton, Coopersburg, PA (US); Gary Nichols, Auburn, CA (US)

(73) Assignee: PMC-Sierra US, Inc., Santa Clara, CA (US)

( * ) Notice: Subject to any disclaimer, the term of this patent is extended or adjusted under 35 U.S.C. 154(b) by 338 days.

(21) Appl. No.: 12/939,128

(22) Filed: Nov. 3, 2010

Related U.S. Application Data

(63) Continuation-in-part of application No. 12/203,455, filed on Sep. 3, 2008, now Pat. No. 8,176,252.

(60) Provisional application No. 60/989,846, filed on Nov. 23, 2007.

(51) Int. Cl.
*G06F 13/00* (2006.01)

(52) U.S. Cl.
USPC ............... 711/118; 711/154; 710/22; 710/23; 710/26

(58) Field of Classification Search
None
See application file for complete search history.

(56) References Cited

U.S. PATENT DOCUMENTS

| | | | |
|---|---|---|---|
| 5,301,287 A | 4/1994 | Herrell et al. | |
| 5,386,524 A | 1/1995 | Lary et al. | |
| 5,473,761 A | 12/1995 | Parks et al. | |
| 5,497,496 A | 3/1996 | Ando | |
| 5,708,849 A | 1/1998 | Coke et al. | |
| 5,991,854 A | 11/1999 | Watkins | |
| 6,012,106 A | 1/2000 | Schumann et al. | |
| 6,449,709 B1* | 9/2002 | Gates | 712/202 |
| 6,732,198 B1* | 5/2004 | Johnson et al. | 710/22 |
| 6,754,735 B2 | 6/2004 | Kale et al. | |
| 6,886,171 B2 | 4/2005 | MacLeod | |
| 7,216,186 B2* | 5/2007 | Richardson | 710/53 |
| 7,216,218 B2 | 5/2007 | Wilson | |
| 7,249,242 B2 | 7/2007 | Ramchandran | |
| 7,315,911 B2* | 1/2008 | Davies et al. | 710/260 |
| 7,523,228 B2 | 4/2009 | Biran et al. | |
| 7,620,749 B2 | 11/2009 | Biran et al. | |
| 7,877,524 B1 | 1/2011 | Annem et al. | |
| 2006/0090016 A1 | 4/2006 | Edirisooriya | |
| 2006/0143506 A1* | 6/2006 | Whitt et al. | 714/6 |
| 2006/0265568 A1 | 11/2006 | Burton | |
| 2007/0162643 A1 | 7/2007 | Tousek | |

(Continued)

OTHER PUBLICATIONS

IEEE Standard for Communicating Among Processors and Peripherals Using Shared Memory (Direct Memory Access—DMA), ANSI, IEEE Std 1212.1-1993, Dec. 2, 1993, Entire 134 Pages.

*Primary Examiner* — Idriss N Alrobaye
*Assistant Examiner* — Richard B Franklin
(74) *Attorney, Agent, or Firm* — Dennis R. Haszko

(57) ABSTRACT

A scatter gather cache system and method are provided, which increase performance of scatter-gather DMA operations by reducing the time taken by the DMA engine to perform a logical to physical address translation. This is done primarily by two-dimensional caching of scatter-gather elements of selected scatter-gather lists using a novel indexing, line swapping and replacement methodology. The cache can also include a context victim table (CVT) for storing scatter-gather list contexts from evicted cache entries and also allows for pre-fetching of SGL elements from Scatter-Gather Lists (SGL). It also provides coherency support when there are multiple instances of the cache accessing the same memory space.

27 Claims, 35 Drawing Sheets

U.S. PATENT DOCUMENTS

| | | |
|---|---|---|
| 2007/0266206 A1 | 11/2007 | Kim et al. |
| 2008/0065855 A1 | 3/2008 | King et al. |
| 2008/0126602 A1 | 5/2008 | Biran et al. |
| 2008/0209130 A1 | 8/2008 | Kegel et al. |

* cited by examiner

SYSTEM AND METHOD FOR SCATTER GATHER CACHE PROCESSING

CROSS-REFERENCE TO RELATED APPLICATIONS

This application is a continuation-in-part of U.S. patent application Ser. No. 12/203,455 filed Sep. 3, 2008 which issued as U.S. Pat. No. 8,176,252 on May 8, 2012, which claims the benefit of priority of U.S. Provisional Patent Application No. 60/989,846 filed on Nov. 23, 2007, which is incorporated herein by reference in its entirety.

FIELD

The present disclosure relates generally to address translation caches, such as memory management unit (MMU) and translation look-aside buffer (TLB) structures. More particularly, the present disclosure relates to direct memory access (DMA).

BACKGROUND

A DMA transfer essentially copies a block of memory from one device to another. The block of memory that resides in these devices may be further subdivided into smaller chunks that may not be contiguously located. For example, a 4 MB chunk may be located as 4 separate 1 MB chunks anywhere in the memory space of the device. Therefore, some information is needed as to their physical locations so that the DMA Master (the DMA controller) can then use this information to either collect the data from these separate chunks (Gather) or write data into these separate chunks (Scatter). This is where a Scatter/Gather element comes into the picture.

A Scatter/Gather element contains the physical location of one memory chunk (also called a fragment) along with the size of the data contained in that chunk. A number of Scatter/Gather elements together can describe the locations and sizes of the chunks of memory that make up the block of data to be transferred. The format of a Scatter/Gather element can be different depending upon the application. For the purpose of uniformity, the IEEE 1212.1 compliant Scatter/Gather element, which is illustrated in FIG. 1, will be described.

As shown in FIG. 1, a typical Scatter/Gather element has the following fields: a 64-bit Address field 100 that points to the starting location of the fragment in memory; a 32-bit Length field 102 that indicates the amount of data contained in that particular fragment; a 31 bit Reserved field 104 that is set to zeroes; and a 1 bit Extension (Ext) field 106 that indicates whether this element is a pointer to the next SG element or not. This Extension field 106 is needed because the SG elements themselves may not be stored contiguously in memory. In this case, the Address field 100 of an SG element can be used to point to the location of the next SG element in the list. For such an SG element, the Length field 102 is ignored and the Ext 106 bit will be set. A Scatter/Gather element may also have a Length field set to all zeroes, which can mean: that the DMA controller should ignore the contents of this element and move on to the next element in the list; or that the block is empty.

FIG. 2 shows how a Scatter/Gather List (also called SGL, a chained list of Scatter Gather elements) can be used to completely specify a block of memory in a device. As shown in FIG. 2, Fragments 0 through 4 are located at non-contiguous and random locations in physical memory 108 (which may reside in different memory spaces). The SGL 110 however puts all of these together by having SG elements 112 that point to the starting location of each fragment. As we traverse the list, we appear to have a contiguous logical memory block, whose total size is the combined sizes of all of the fragments. An illustration of such a logical memory block 114 is shown in FIG. 2 for illustrative purposes, though it is understood not to exist physically.

Notice in the example of FIG. 2 that the SGL 110 itself is not contiguously located in physical memory. The fifth SG element of the first set of SG elements points to the next SG element in the list by using the extension capability of the SGL. Also notice that we cannot traverse the list backwards—for example, we cannot go back to the fifth SG element once we traverse on to the sixth one, as we have no information in the sixth SG element that points back to the address of the fifth SG element.

The DMA controller may have a number of SGLs in memory, each corresponding to a different logical block of memory that is involved in a data transfer. Each SGL may be identified using a unique data word, also called a descriptor. Each descriptor typically contains the starting location of a particular SGL (or SGLs) in physical memory, which physical memory contains the SGL(s) (if there are multiple separate physical memories), the total size to be transferred, and other details pertaining to that particular data transfer. This way, the CPU can simply instruct the DMA controller to initiate a data transfer by giving it the descriptors. The DMA controller can then find the starting address of the first SGL using the descriptor, and then proceed to transfer data by using the information obtained from traversing the SGL.

The starting address of the SGL itself can be 64 bits (depending on the system), which could make the descriptor large. In order to conserve space on the descriptor fields, descriptor information can be stored in physically contiguous locations in memory and the descriptor itself can be used to point to this information. This memory structure is called a descriptor table. In this case, the descriptor itself can be reduced to a simple index, which can then be manipulated and then added to an offset to arrive at the location of the actual contents of the descriptor in physical memory.

FIG. 3 illustrates a scatter gather list descriptor table. For the purposes of illustration, assume that each entry in the descriptor table 116 holds only the starting address of the SGL. Each descriptor 118 is simply represented as an integer and is nothing more than an index in this case. To locate the entry in the descriptor table, the descriptor is multiplied by 8 bytes (since each descriptor entry is 64-bits wide and holds the starting address of the SGL) and an offset value (0x1000 in this case) is added to the multiplied value to arrive at the location 120 of that descriptor's contents. In the case where the descriptor value is 1 for example, we find the contents of the descriptor at memory location (1*8)+0x1000=0x1008 in physical memory 122. We can then use the contents at this memory location (0xffe0 in this case) to get our first SG element in the SGL.

After the data transfer is complete, the DMA controller will interrupt the CPU to inform of a successful transfer. The CPU may then 'retire' the descriptor, wherein it may re-use this particular descriptor for another DMA transfer by storing the starting address of a completely different SG list in the descriptor table. (In the example above in FIG. 3, the CPU will overwrite the address 0x1008 with a value other than 0xffe0). Until now, we have assumed only a simple descriptor (only an index) and a simple descriptor table (SG element address) for this example. In reality, the descriptors may hold many more bits that may be used to indicate other parameters in the DMA transfer.

A structure of a more complex descriptor is shown in FIG. 4 and relevant portions are described below. A Source Descriptor Index 124 (N bits wide) holds the descriptor index that is required by the controller to locate the Descriptor table for the Source of data for the transfer. Src DT Location 126 (M bits wide) bits indicate which memory space contains the Descriptor Table for the Source of the Data Transfer, such as in the case where there are multiple memories in the system. For example, there can be 3 addressable memory spaces—a DDR DRAM memory space, a PCI Host memory space and a GSM on-chip embedded memory space. This scenario can apply to each of the portions described below in relation to FIG. 4 that indicate which memory contains a certain element of interest.

Src SGL Location 128 (P bits wide) bits indicate which memory contains the Scatter Gather List for the Source of the data transfer. Dest Descriptor Index 130 (N bits wide) holds the descriptor index that is required by the controller to locate the Descriptor table for the Destination of data for the transfer. Dest DT Location 132 (M bits wide) bits indicate which memory contains the Descriptor Table for the Destination of the Data Transfer. Dest SG Location 134 (P bits wide) bits indicate which memory contains the Scatter Gather List for the Destination of the data transfer. Finally, Transfer Size 136 (Y bits wide) indicates how many total bytes are to be transferred for this particular DMA operation.

Using the descriptor and the SGLs, a DMA controller (DMA Master) can transfer data to and from devices. The DMA Master will read through the descriptors, locate the SGLs and then proceed to transfer information from one device to another. Some DMA controllers may use temporary buffers that hold the data read from one device, before it is written into the other device. For example, a DMA controller may choose to transfer 1 KB at a time between devices until the entire transfer is finished. Therefore it will first traverse as many source device SG elements as it needs to fill up this 1 KB buffer. It will then proceed to write this 1 KB by reading as many destination device SG elements. This is usually done for performance and ease of transfers.

Fragment Size and Alignment:

Consider virtual memory management in a Host CPU and operating system. Modern CPUs use intelligent MMUs, which utilize a hierarchy of segment and/or page tables to map a logically contiguous user memory space for each process into the physical memory hierarchy, for protection of one user space from another, and provide a linear view of memory from each user process. Furthermore, this also allows the logical memory space to be much larger than the actual physical main memory space by swapping certain regions of logical memory that are currently not in use with much larger disk swap space.

Before a data buffer can be used as a DMA data buffer, typically, the application layer allocates a data buffer in virtual address space. The kernel or device driver page lock the virtual address buffer to ensure the entire virtual address buffers are loaded and fixed in physical main memory space (no swapping to disk). Since the virtual to physical address translation is done based on MMU 'pages' (e.g. 4K byte long physical memory that is perfectly aligned at 4K address boundaries for example), the virtual buffer is now mapped into a sequence of physical pages, each page being uniform in size and alignment that can be presented by a SGL.

However, since the virtual address buffer can start at arbitrary byte address granularity, the first byte of the virtual address buffer can start from an arbitrary byte offset of a physical page. In other words, the SGL represents a sequence of uniform size pages that are page aligned, except for the first fragment that can start at an arbitrary byte offset of a page, and the last fragment can end at an arbitrary byte offset of another page. This approach is well suited for limited SGL buffers denoted as "page fragments", where the size and alignment of a fragment is fixed. But because of the page index based lookup structure, this approach can only handle uniform size buffer fragments, therefore can not support "arbitrary fragments" that have no restrictions on the alignment and the size of each buffer fragment.

Performance:

Assume that Scatter Gather Lists contain extension elements, which means that the DMA controller has to traverse the list for a while before getting to the next SG element that contains valid fragment information. FIG. 5 shows how a typical DMA controller may spend its time on a DMA operation (either when Reading or Writing).

As shown in FIG. 5, the Master first spends time 138 on locating the Descriptor Table to get the address of the first SG element. Once this has been obtained, the Master then traverses the SG list until it finds the first SG element that contains a data fragment (this portion of time is indicated as 'SG frag 1' 140 in FIG. 5). The DMA Master then transfers data to/from the fragment during time 142. When this is finished, the DMA Master then searches for the next fragment to transfer data, and thus once again traverses the SG List to find the next fragment during time 144. Once the second fragment has been found, the Master can now transfer data to/from the second fragment during time 146. Other time periods 148 and 150 represent similar searching and data transfer, which can be repeated for the required number of SG elements. As we can see, the efficiency of data transfers is affected because the Master has to traverse SG lists between data transfers in order to find fragments. In reality, the performance will be even worse, as the Master has to fetch the SG Lists of both the Source and the Destination when transferring data between them. Also note that the time taken to fetch SG elements keeps increasing as the Master has to traverse down the list, because it has to skip over n−1 SG elements to find the nth element, which further degrades performance.

Maintaining Context:

The majority of known DMA operates in physical address space. This means the requestor of a DMA operation specifies a DMA request using physical addresses, or a scatter gather list that contains physical address information on each DMA operation. This approach is quite intuitive and simple when handling data movement in contiguous data buffers. But when the DMA operation needs to do context switching between partial transfers using different scatter-gather lists, the use of physical addressing pushes a significant burden on the DMA Master (requestor). To enable the DMA to resume data transfer on a partial SGL buffer, the DMA Master needs to save much information in SGL partial transfer context, including: the current pointer in SGL, the head pointer to the SGL, the current fragment physical address, the remaining byte count within the current fragment. Such context needs to be managed on per concurrent SGL basis.

When the DMA resumes data transfer on a SGL buffer, the DMA Master needs to reload the partial context to allow proper physical address calculation. The SGL partial context not only adds very significant complexity to both the DMA engine, the DMA Master, but also adds cost for the context storage, and reduces the performance of DMA engine because of the extra processing step involved in context management. This problem can be particularly severe in the storage controller application that needs to support a large number of concurrent I/Os (SGLs) that are time interleaved over the physical bus.

For example, assuming that the SG List contained elements each containing fragments of 1 byte (Length field=1), the Master would have the information contained in the eighth SG element during the transfer of the eighth byte of data. The Master must also keep track of the total data transferred by adding the Length fields of all the fragments in the SG elements that it had traversed so far. This should be done in order to keep track of when to stop transferring data. For example, even though the Master fetches the eighth SG element, which has a fragment of size 1 byte, it has to know that this is the eighth byte being transferred in order to keep track of the total bytes transferred. If at this time, the DMA Master had to abort this transfer and then subsequently retry it or if it had to retry starting from (for example) the seventh byte of data, it would have to traverse the SG List starting from the descriptor table, as it does not have the information required to traverse backwards (a fundamental limitation of SG Lists, as discussed earlier). This again results in a wastage of bandwidth and performance.

Error Recovery and Debug:

Most SG lists are created by drivers that run on the Host operating system. Imagine a case where a driver has a bug, wherein the transfer size is larger than the total size of the memory block contained in an SG list. The DMA Master cannot tell the end of an SG list. If it has more data to transfer, it will move on to the memory locations immediately after the last correct SG element and incorrectly assume that it is the next SG element. It would then interpret the random data in those memory locations as contents of an SG element. Two scenarios can happen in this case:

1. The DMA Master could attempt to read/write to a non-existent address. This could cause a memory error leading to a system crash.

2. The DMA Master could potentially overwrite valuable data on an existent unintended location pointed to by the false SG element, causing a system crash or other potentially fatal failures. The problem with this type of error is that the system may not immediately fail, but may fail later when it attempts to use the data that has been overwritten by the DMA Master.

It is, therefore, desirable to provide an address translation scheme and cache with a modified scatter gather element. It is also desirable to provide for approaches that address certain scenarios and provide for improved performance.

SUMMARY

It is an object of the present disclosure to obviate or mitigate at least one disadvantage of previous scatter gather and DMA approaches.

Due to the shortcomings of both the physical address DMA (maintaining context) and virtual address DMA (no support for arbitrary fragment size and alignment), there exists a need to solve the DMA address translation by treating each logical data buffer as one independent linear logical space, while the underlying physical memory is defined by an SGL with arbitrary fragments. Embodiments of the present disclosure are designed to work with memory systems that employ arbitrarily sized and aligned fragments.

In an aspect, the present disclosure provides a scatter gather cache module including a main memory interface, an SG cache memory and a memory management system interface. The main memory interface reads SG lists and descriptor tables from main memory and modifies SG element information prior to storage. The SG cache memory stores SG element context in one or more cache lines including modified SG element information regarding one or more SG elements for a particular descriptor. The memory management system interface interfaces with a memory management system controller to exchange information about SG elements.

The SG cache memory can store SG element context and memory space location for memory fragments with non-uniform alignment and/or length. The main memory interface can manipulate the entire contents of the length field of an SG element to calculate an accumulated length value for storage in the cache line. The main memory interface can determine a remaining byte count for the SGL based on the calculated accumulated length value. The main memory interface can compress SG element information prior to storage in the SG cache memory, such as by removing reserved bits from the SG element information prior to storage.

The main memory interface can proactively pre-fetch SG elements before they are needed by a memory management system controller. The memory management system interface can be a DMA master interface to interface with a DMA Master.

The one or more cache lines can store a partial address of a previous SG element to permit traversing backward through the SGL. The one or more cache lines can include: an accumulated start offset field including information to calculate the amount of data contained in a fragment referenced by a particular SGL element; one or more accumulated end offset fields containing information required to calculate the amount of data contained in memory fragments referenced by the one or more SG elements; one or more cache line memory space location fields to indicate a memory space location for each SG element represented in the cache line; and one or more SGL element addresses including the starting address of the memory fragments referenced by one or more SG elements in the cache line.

The main memory interface can compute an accumulated length value for storage in the one or more accumulated end offset fields by adding the length of a particular SG element to the length of all previous SG elements in the cache line. The main memory interface can omit the length of an extension SG element in the computation of the accumulated length value.

Each cache line can further include: a valid field to indicate whether the current line contains valid information, or if the cache location is empty; a tag field to hold upper bits of a descriptor index and memory space location of the corresponding descriptor table; and a next SG element/extension address field to store the starting address of the next SG element in the current SG list that occurs after the last SG element in the cache line. Each cache line can further include a field that stores the address of the first SG element in a cache line. The tag field can include a bit to associate a DMA master with SG elements stored in the cache line.

The SG cache module can further include a hit-test module to provide a contiguous buffer view to the DMA master. The hit-test module can determine whether SG fragment information requested by a DMA master resides in the cache based on a comparison of tag field bits with upper bits of the descriptor and a comparison of a completed byte count with the accumulated start and end offset fields, and a value of the valid field.

In another aspect, the present disclosure provides a direct memory access system. The system includes: a system bus (or memory bus), a central processing unit connected to the system bus; a main memory connected to the system bus; a DMA master connected to the system bus and in communication with input/output devices; and a scatter gather cache module connected to the system bus. The SG cache module can include a main memory interface, an SG cache memory and a DMA master interface (similar to the memory management system interface), with features as described above.

The SGLs can be stored in secondary memory that has slower access time than the main memory. The system can include a second DMA master, in which case the SG cache module can further include a second DMA master interface to permit the SG cache module to be shared between the two DMA masters. Alternatively, the system can further include a second DMA master and a second SG cache module for dedicated interaction with the second DMA master. The SG cache module can be located between the memory that holds the descriptor table and/or the SGLs and the system bus to determine whether a descriptor table or SG access occurs and proactively pre-fetch SG elements from memory.

In a further aspect, the present disclosure provides a method for logical to physical address translation for arbitrarily aligned and arbitrarily sized segment based memory management schemes. The method includes the following steps: receiving a descriptor index and transferred byte count from a memory management system controller; accessing a scatter gather cache memory to determine whether information is stored pertaining to the received descriptor and, if not, accessing a main memory to find a descriptor table location for the descriptor index, which points to the starting address of the first SG element in the SG list; storing the highest order bits of the descriptor index in a tag field in the SG cache memory, along with SG element memory space location information for the descriptor table; reading each SG element and preparing for modification and storage of SG element information into a cache line in the SG cache memory; for each SG element read, accumulating length fields into the cache line by adding the length of a current SG element to the length of all previous SG elements in the cache line, and copying an SG element memory space location; for each cache line, copying next SG element address information from the last address in the cache line; and returning information about the first segment to the memory management system controller.

The method can further include comparing an accumulated length field value with a completed byte count to determine which SG element information to return.

In a yet further aspect, the present disclosure provides a memory for storing data for access by an application program being executed on a data processing system, comprising a data structure stored in said memory, said data structure representing an SG element. The data structure comprises: a scatter gather element including: a plurality of address bits to point to the starting location of a memory fragment; a plurality of length bits to indicate the amount of data contained in the memory fragment; an extension field to indicate whether the SG element is a pointer to the next SG element; a memory location field to specify a physical memory location for the SG element from among a plurality of physical memory locations; and an end of buffer field to specify whether the SG element is the end of the SG list.

In an embodiment, the present disclosure provides a method of scatter gather (SG) cache processing including: receiving a DMA request having a tag and a virtual index, the tag comprising a buffer state table (BST) index uniquely identifying a scatter gather list (SGL); comparing the tag and virtual index of the received DMA request with tag and virtual index pairs for a plurality of cache lines in an SGL cache memory; and processing the DMA request based on the comparison of the tag and virtual index values in the DMA request and in the SGL cache memory.

Each virtual index value can be equal to a cache line number. A plurality of virtual indices can be mapped to one PHY, or a plurality of PHYs can be mapped to the same virtual index.

The method can further include: providing a one-to-one mapping between a PHY, virtual index and a cache line to provide bandwidth dedication for the PHY; or performing cache line replacement and eviction based on virtual index.

The method can further include writing out a current context of an evicted SGL element to enable the SG cache. The current context can include an address of the most recently requested SGL element and its accumulated offset in the SGL. The method can further include resuming data transfers for an SGL associated with the evicted SGL element without having to traverse the entire list.

The method can further include: storing an error status of a given SGL; returning an error status substantially immediately when a subsequent request is received for the given SGL; or providing a discard address to a DMA master in response to an error on an SGL request.

The method can further include prefetching a plurality of SGL elements before a DMA requires the plurality of SGL elements for processing. The plurality of SGL elements can be prefetched when a request is present for a given SGL and the DMA request matches the given SGL and the request satisfies prefetch criteria.

When the DMA request's tag matches a tag stored in a first cache line and the DMA request's virtual index matches a virtual index stored in a second cache line, the method can include swapping the virtual indices of the first and second cache lines, to avoid swapping cache line data and cache line tags.

When the DMA request includes a flush bit that is set, the method can further include: fetching SGL elements from the BST table for the current BST index, without accessing a context victim table (CVT), and storing the SGL elements in the cache line that matches the tag of the DMA request.

Processing the DMA request can include returning SGL elements from a selected cache line when both the tag and virtual index of the request match a stored tag and virtual index pair associated with the selected cache line.

When the DMA request includes a flush bit that is set, processing the DMA request can include: fetching SGL elements from the BST table for the current BST index, without accessing a context victim table (CVT), and storing the SGL elements in a cache line that matches the tag of the DMA request when the virtual index of the request matches a virtual index stored in the cache line.

When the DMA request includes a flush bit that is not set, processing the DMA request can include: fetching SGL elements from a context victim table (CVT) for the current BST index when the tag of the DMA request does not match any valid tags in any cache line.

The method can further include evicting another BST index stored in the cache memory to a context victim table when a cache line having a virtual index matching the incoming request's virtual index has its valid bit set.

When DMA request includes a flush bit that is set, the method can further include fetching SGL elements from the BST table for the current BST index without accessing a context victim table (CVT), when the tag of the DMA request does not match a valid tag in the SGL memory.

The method can further include evicting another BST index stored in the cache memory to a context victim table when a cache line having a virtual index matching the incoming request's virtual index has its valid bit set.

Stored data associated with the BST index can be flushed inline as part of the incoming DMA request when the BST index is re-issued for a new SGL.

In another embodiment, the present disclosure provides a scatter gather (SG) cache module, comprising: a memory management system interface to interface with a memory management system controller to exchange information about SG elements; an SG cache memory for storing SG element context in one or more cache lines; and a request manager in communication with the memory management system and the SG cache memory. The request manager is arranged to: receive a DMA request having a tag and a virtual index, the tag comprising a buffer state table (BST) index uniquely identifying a scatter gather list (SGL); compare the tag and virtual index of the received DMA request with tag and virtual index pairs for a plurality of cache lines the SG cache memory; and process the DMA request based on the comparison of the tag and virtual index values in the DMA request and in the SGL cache memory.

The SG cache module can further include a context victim table (CVT) storing a starting address of a most recently used SGL element, to enable the SG cache to resume data transfers for an associated SGL without having to traverse the entire list. The SG cache module can further include a prefetcher for prefetching the plurality of SGL elements when a request is present for a given SGL and the DMA request matches the given SGL and the request satisfies prefetch criteria. The SG cache module can further include an error processing module for storing an error status of a given SGL, and for returning an error status substantially immediately when a subsequent request is received for the given SGL.

In a further embodiment, the present disclosure provides a scatter gather (SG) cache module, comprising: a memory management system interface to interface with a memory management system controller to exchange information about SG elements; an SG cache memory for storing SG element context in one or more cache lines; and a context victim table (CVT) storing a starting address of a most recently used SGL element, to enable the SG cache to resume data transfers for an associated SGL without having to traverse the entire list.

In a yet further embodiment, the present disclosure provides a scatter gather (SG) cache module, comprising: a memory management system interface to interface with a memory management system controller to exchange information about SG elements; an SG cache memory for storing SG element context in one or more cache lines; and a pref etcher for prefetching the plurality of SGL elements when a request is present for a given scatter gather list (SGL) and the DMA request matches the given SGL and the request satisfies pref etch criteria.

In a still further embodiment, the present disclosure provides a scatter gather (SG) cache module, comprising: a memory management system interface to interface with a memory management system controller to exchange information about SG elements; an SG cache memory for storing SG element context in one or more cache lines; and an error processing module for storing an error status of a given scatter gather list (SGL), and for returning an error status substantially immediately when a subsequent request is received for the given SGL.

In another embodiment, the present disclosure provides a non-transitory memory for storing data for access by an application program being executed on a data processing system, comprising a data structure stored in said memory, said data structure representing a scatter gather (SG) element and comprising: a tag field comprising a buffer state table (BST) index uniquely identifying a scatter gather list (SGL); and a virtual index field comprising a virtual index associated with at least one cache line. The memory can further comprise a flush bit to indicate whether information stored with an associated virtual index is to be flushed from system storage. The memory can further comprise a valid bit to indicate whether information stored in an associated cache line is valid.

Other aspects and features of the present disclosure will become apparent to those ordinarily skilled in the art upon review of the following description of specific embodiments of the disclosure in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
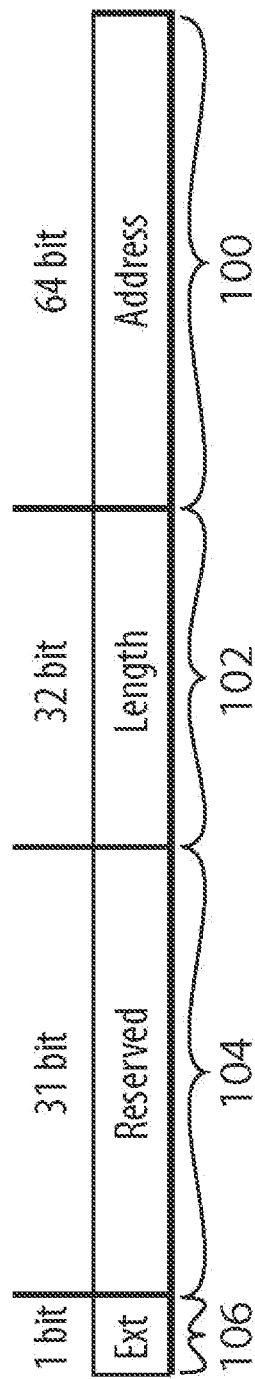
FIG. 1 illustrates a scatter gather element.
Figure 2:
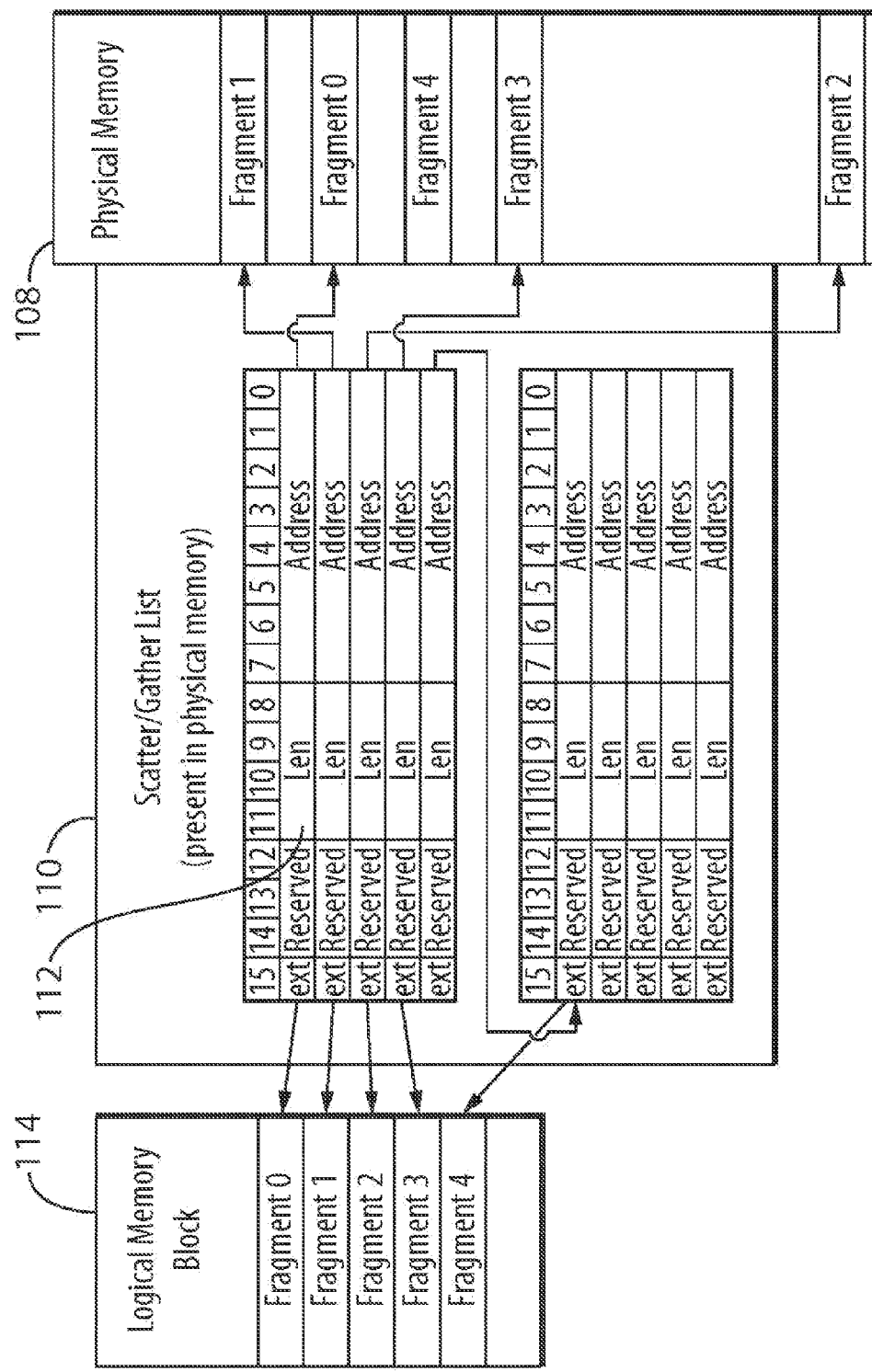
FIG. 2 illustrates a scatter gather list.
Figure 3:
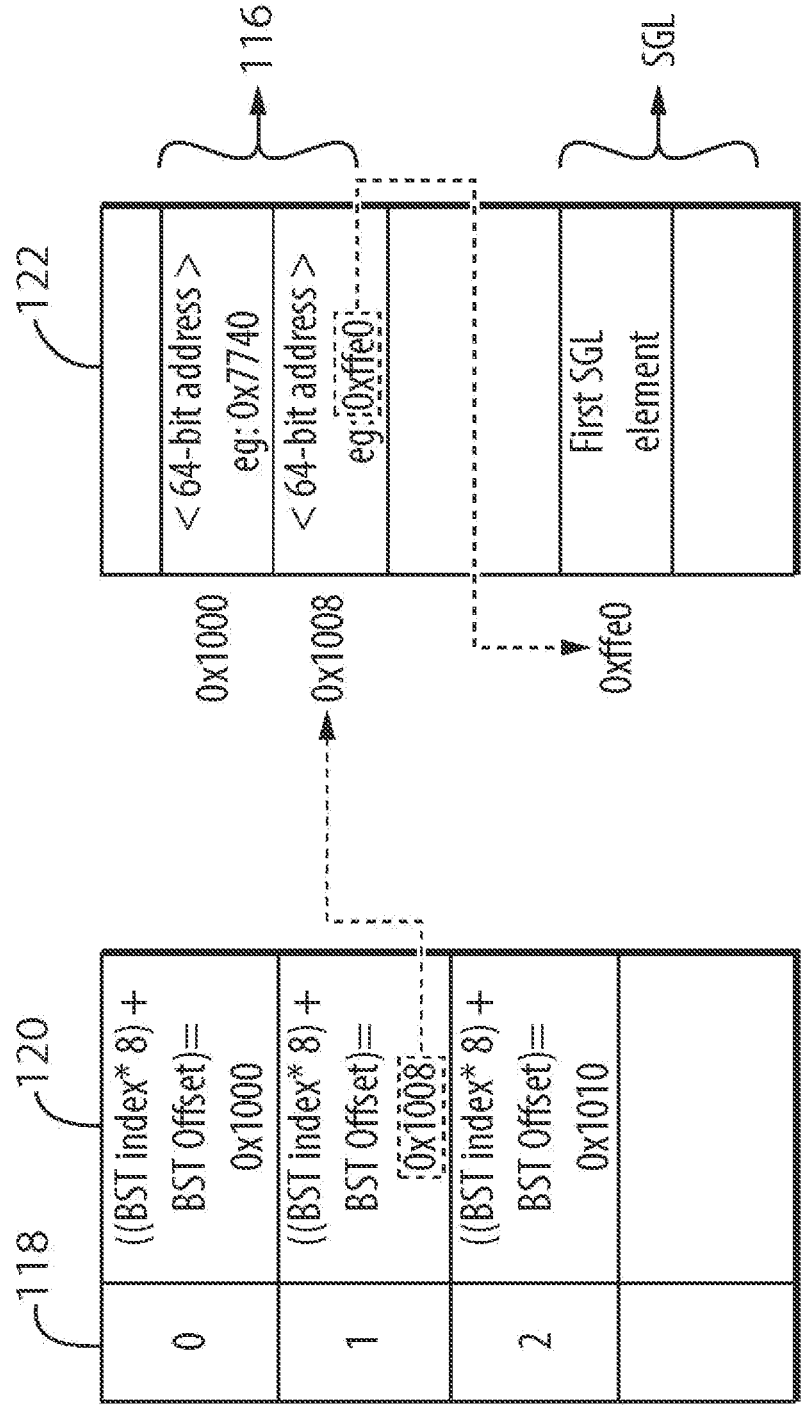
FIG. 3 is an example of a scatter gather list descriptor table.
Figure 4:
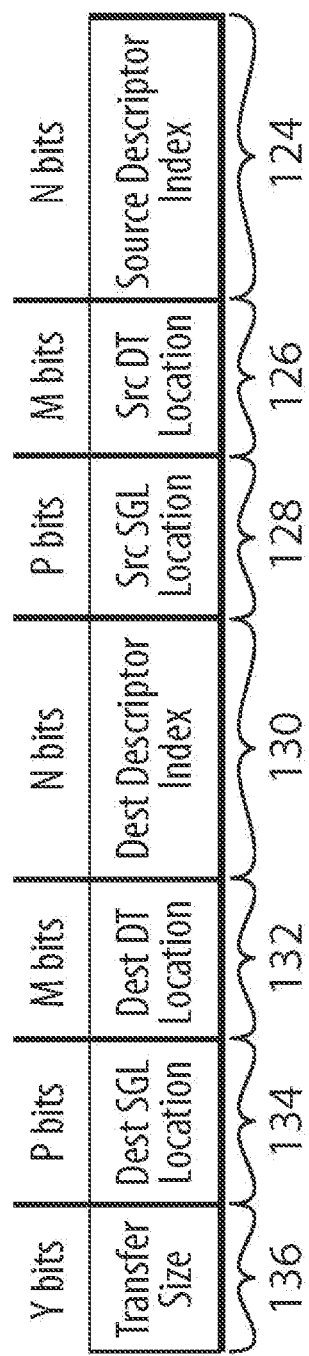
FIG. 4 illustrates a scatter gather list descriptor format.
Figure 5:
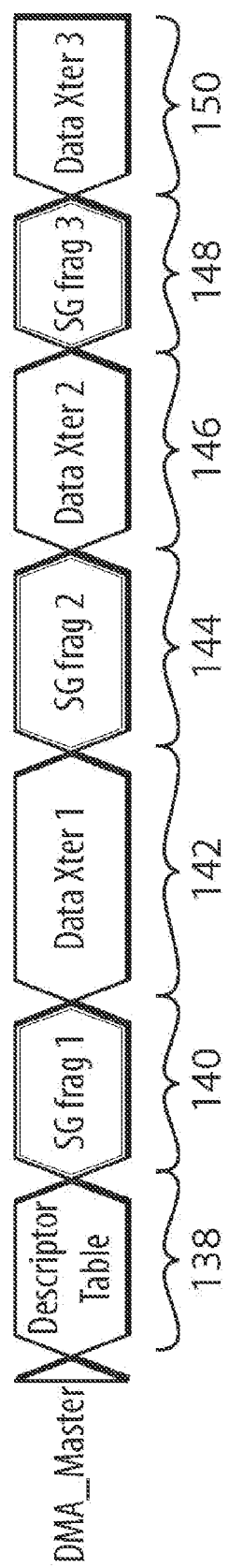
FIG. 5 illustrates a conventional DMA timing diagram.

Generally, the present disclosure provides a scatter gather element based caching system along with a modified scatter gather element, that supports efficient logical to physical address translation for arbitrarily aligned and arbitrarily sized fragment (segment) based memory management schemes. This is different from modern CPU implementations with MMUs that support page-based implementations. A primary application of embodiments of the present disclosure is in DMA applications. The system enables frequent switching of contexts between I/Os using a novel caching technique. An embodiment of the present disclosure also includes the modification of the conventional scatter-gather element used in DMA for supporting multiple memory spaces, backward list traversals, better error recovery and debugging.

The Scatter/Gather block descriptor will be addressed as a 'Scatter/Gather element' for the remainder of this document.

In order to overcome the problems presented earlier, embodiments of the present disclosure now introduce a context storing cache and a modified SG element that supports arbitrarily aligned and sized fragments in multiple memory spaces, and aides error recovery. These fragments can be described as having an unrestricted or unconstrained fragment size, which can be referred to as variable, unequal or irregular. The alignment of the fragments can be described as unrestricted or unconstrained, variable or irregular.

Supporting arbitrarily sized fragments avoids unnecessary memory movement. For example, a user program wants to write some data fields from various data structures into a file. Instead of allocating a contiguous data buffer in the virtual address space as a temporary workspace to copy all the necessary fields before issuing the I/O from the workspace buffer, the user program chooses to create a SGL with each entry pointing to the direct location of the necessary data structure fields to be written. Then, the write I/O is issued to the file system using the SGL as the argument representing the I/O buffer. This creates an I/O operation using an arbitrary SGL with the benefit of eliminating the extra step of managing the workspace buffer and the data movement between the data structure and the workspace.

A primary purpose of the cache is to store SG element context (similar to how a TLB would do in a MMU) and this drives the organization of the cache. However, another feature of the cache is to proactively pre-fetch SG elements before they are needed by the DMA Master, and to also keep track (depending on the configuration of the cache) of previously fetched SG elements to avoid traversing the SG list from the start.

Another feature of the cache is its ability to avoid writes into the cache by modifying and compressing the SG element before storage. In addition, the cache also uses the modified SG element in order to find the end of the SG list, which helps error recovery and debugging much easier. There are several possible configurations of the cache, including its position and placement in the system, which will be different depending on the application and performance required.

The context storing cache can be organized in a variety of ways depending on the requirements of the system. In general, each cache line (or cache entry) comprises information regarding one or more SG elements for a particular descriptor. Along with this information, the higher order bits of the descriptor and other details (like the memory space location of the Descriptor Table) are stored as a tag. This is done so the cache can distinguish between various descriptors and memory spaces where the descriptor could be located. The associativity of the cache depends upon the system and the desired performance. All other things being equal, a cache with full associativity will give the better performance, but would likely require more area (for storing tag bits) and tighter timing constraints. A direct-mapped cache will be assumed for the purposes of explaining one variant of the design, though other variations are possible in other embodiments.

Figure 6:
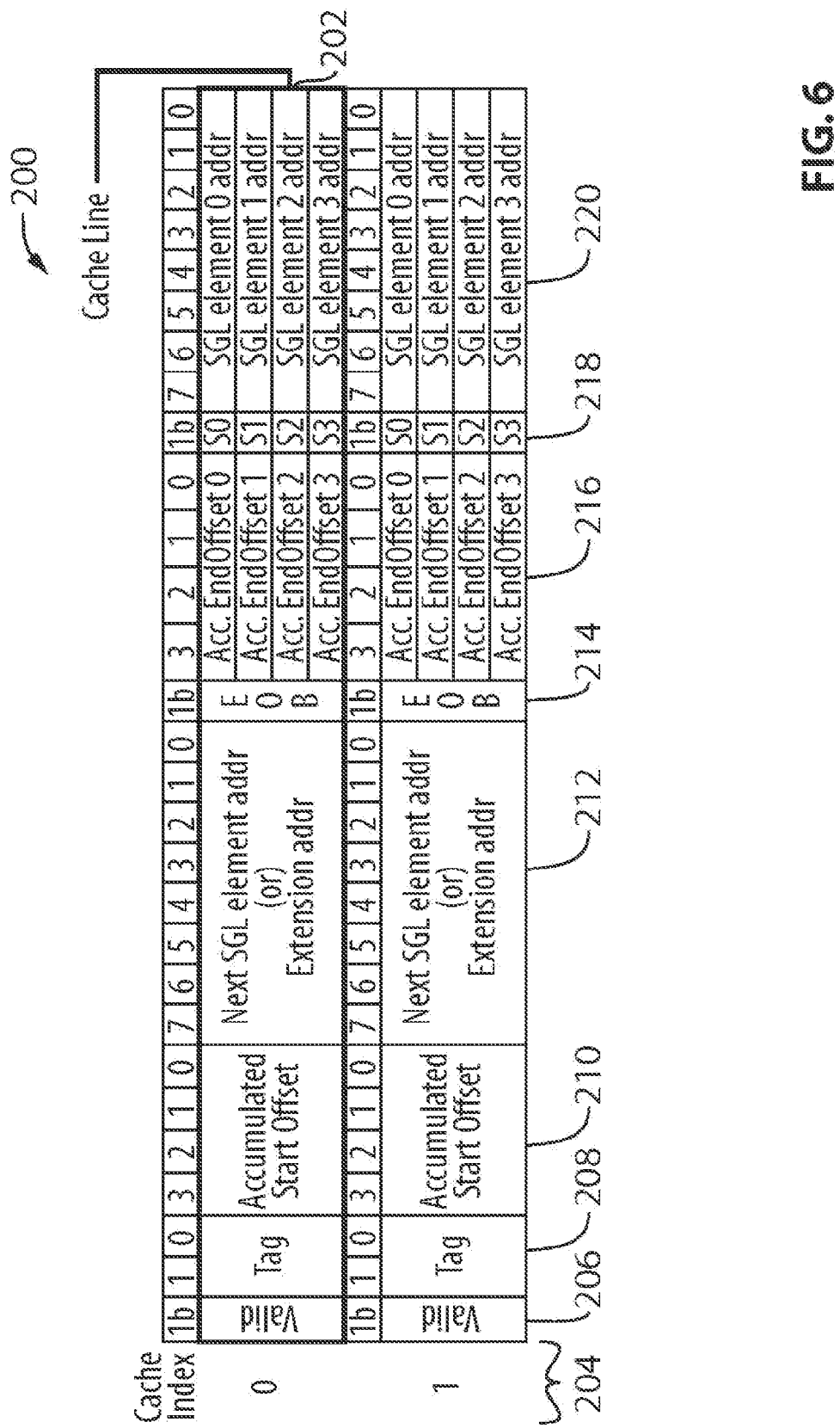
FIG. 6 illustrates organization of a direct-mapped cache line according to an embodiment of the present disclosure.

FIG. 6 shows an example of how a direct-mapped cache line can be organized. In the embodiment of the cache design 200 in FIG. 6, every cache line 202 holds information on up to four SG elements in the SG list for that particular Source or Destination descriptor index 204. Other embodiments can hold more or less element information, or can choose to combine the information for both Source and Destination SG lists in the same line.

The cache may not store all of the information contained in a typical SG element, and can modify the information contained in an element for improving performance. In other words, the information stored for an SG element in the cache line 202 can be a modified version of the information contained in the SG element itself. For example, if all the fragments in the system are always aligned to 1 Kbit boundaries, then we can reduce the number of bits needed to store the starting address of the fragment by 10 bits, since we know that they will always be zeroes. Also, the 'Reserved' portion of the SG element may not be stored, as this will usually be set to all zeroes in an SG element. Some SG element fields can be modified before storage—for example, this particular design accumulates the 'Length' field of an SG, instead of storing the original value. Other, similar variations apply to the other fields in an SG element described herein.

The embodiment of the cache design 200 in FIG. 6 houses the following fields in every cache line 202. A validity field, or valid field, 206 indicates whether the current line contains valid information, or if this cache location is empty. This field can be used to flush out or retire a descriptor after a transfer is complete. A tag field 208 holds the upper bits of the descriptor index along with other information such as the memory space locations of the Descriptor Table. For example, 'Tag' can hold upper bits of either Source or Destination descriptor index, plus some bits for Descriptor Table memory space location.

Accumulated Start Offset field 210 contains information required to calculate the amount of data contained in the fragment that is contained in SGL element 0. In another embodiment, the Tag field can also be used to store other information. A bit in the Tag field can be used to associate a DMA master with SG elements stored in the cache line. For example, in a situation where there are two DMA Masters DMA1 and DMA2, one bit in the Tag field can be used to differentiate between which Master's SG elements are stored in the cache line.

Next SG element Address or Extension Address field 212 contains the starting address of the next SG element in the list that occurs after the last SG element in the cache line, which is SG element 3 in the embodiment of FIG. 6. In most simple cases, the next consecutive address is obtained by adding 16 to the address of SG element 3 (since each SG element is 16 bytes wide). If one of the SG elements in the cache (0, 1, 2 or 3) was an extension SG element, then this field is filled with the extension address from that element. A cache line end of buffer (EOB) field 214 indicates that one of the SG elements in the cache (0, 1, 2 or 3) is the end of the SG list.

One or more accumulated end offset fields 216 are provided in each cache line. The example in FIG. 6 includes four such fields per cache line. Accumulated End Offset 0 contains information required to calculate the amount of data contained in the fragment that is contained in SGL element 0. Similarly, the Accumulated End Offset 1, 2 and 3 fields contain information required to calculate the amount of data contained in the fragment that is contained in SGL elements 1, 2 and 3, respectively.

The total data length of the fragment in SGL element 0 is calculated as:

SGL Element 0 Fragment Length=Accumulated End Offset 0−Accumulated Start Offset.

Similarly, the total data length of the fragment contained in SGL elements 1, 2 and 3 are calculated as follows:

SGL element 1 Fragment Length=Accumulated End Offset 1−Accumulated End Offset 0.

SGL element 2 Fragment Length=Accumulated End Offset 2−Accumulated End Offset 1.

SGL element 3 Fragment Length=Accumulated End Offset 3−Accumulated End Offset 2.

Cache line memory space location fields 218 indicate a memory space location for an SG element represented in the cache line. In FIG. 6, specific memory space location fields 218 labeled S0, S1, S2 and S3 indicate the memory space location of SG elements 0, 1, 2 and 3 respectively. In this embodiment of the cache organization, the cache line memory space location field 218 comprises a one-bit field provided to choose between two possible memory spaces. Additional bits can be added to the cache line memory space location field 218 in other embodiments where it is necessary to choose between more than two memory spaces. Alternatively, the cache line memory space location field 218 can be omitted in the situation where all SG elements reside in only one memory space. These choices are implementation dependent.

SGL element addresses 220 comprise the starting addresses of the fragments for the SG elements in the cache line. For example, SGL element 0 Address is a field that holds the starting address of the fragment contained in SG element 0. Similarly, SGL element 1 Address, SGL element 2 Address, and SGL element 3 Address fields hold the starting address of the fragment contained in SG elements 1, 2 and 3, respectively.

Figure 7:
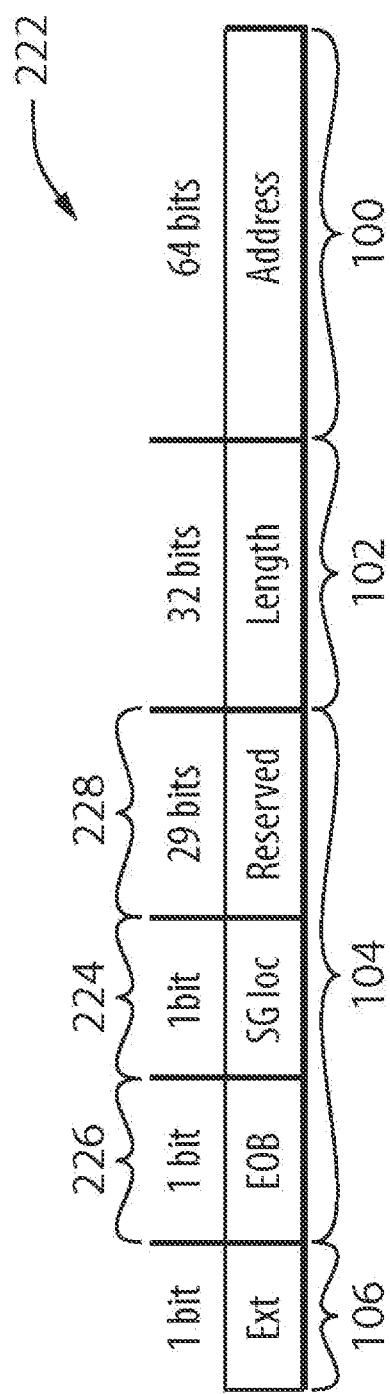
FIG. 7 illustrates a scatter gather element modification for multiple memory spaces and error recovery according to an embodiment of the present disclosure.

A format of a modified SG element according to an embodiment of the present disclosure is shown in FIG. 7. Such a modified SG element 222 can be used to support multiple memory spaces and error recovery. As many additional bits are introduced in the SG element as needed to keep track of the memory space location of the fragment contained in that element. For example, in a situation with two memory spaces A (denoted by '0') and B (denoted by '1'), one more of the originally 'Reserved' bits 104 in the SG element can be used to indicate the location of the fragment. This example is shown in FIG. 7, where the bit is called 'SG loc' 224, also referred to as a SG element memory space location indicator. This allows the flexibility of having a single SGL that mixes buffer fragments from different memory spaces.

In order to aid error recovery, a bit called SG element End-of-Buffer bit 226 is added, which specifies the end of the SG list. For this purpose, one of the originally 'Reserved' bits 104 (specifically, bit 31 in this embodiment) from the SG element is used. If this bit is set in an element, the SG cache will stop processing further elements in the SG list and will consider this element as the pointer to a last fragment. The remaining reserved bits 228 in the embodiment of FIG. 7 remain available for other purposes.

Figure 8:
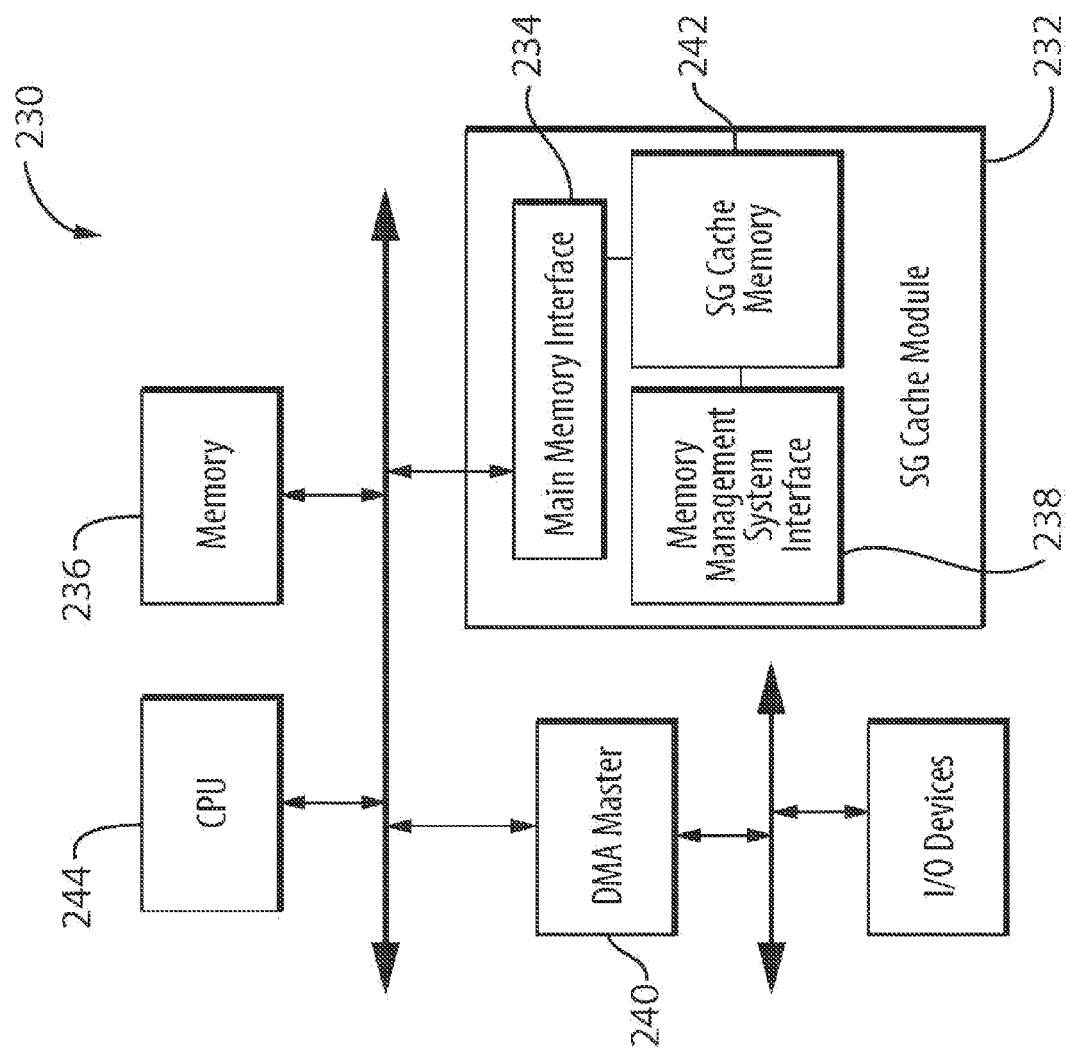
FIG. 8 illustrates an example of usage of an embodiment of the present disclosure in a DMA system.

FIG. 8 illustrates an example of usage of an embodiment of the present disclosure in a DMA system 230. As shown in the embodiment of FIG. 8, an SG cache module 232 can be introduced into a typical DMA system 230 to solve the problems described earlier. This embodiment is only one of several ways that the SG cache module 232 can be placed/used in a DMA system 230. The SG Cache module 232 contains, or includes, a main memory interface 234 to interface with a main memory 236 in order to read the SG lists and Descriptor Tables. A memory management system interface 238, such as a DMA master interface, interfaces with the memory management system controller, such as a DMA Master 240, to exchange information on the fragments. An SG cache memory 242 stores the SG cache line information.

Assume that CPU 244 initially creates the SG lists and assigns unique Source and Destination descriptor indexes and requests the DMA Master 240 to complete the DMA transfer. The DMA Master 240 then transmits the descriptor index for either the Source or Destination SG list and the transferred byte count (which is initially zero since we are beginning the transfer). The SG cache module 232 first accesses its own SG cache memory 242 to find out it had previously stored information pertaining to that particular descriptor (a 'hit'). If not, it then accesses the main memory 236 to find the descriptor table location for that particular descriptor index, which points to the starting address of the first SG element in the SG list. The SG cache module 232 then proceeds to read 64 bytes of data starting from the first SG element address (this is to get at least 4 SG elements worth of information, since each element is 16 bytes wide).

Figure 9:
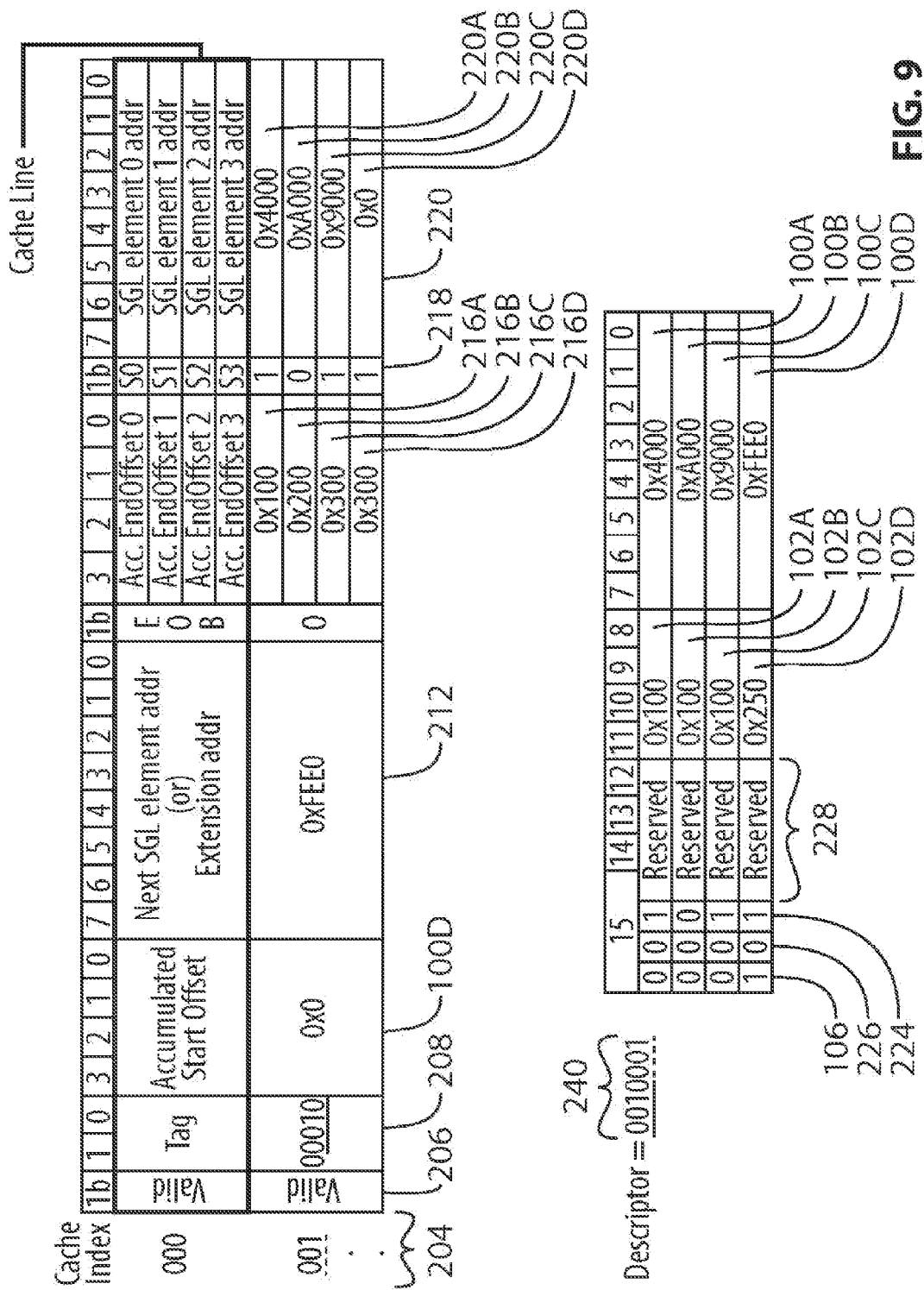
FIG. 9 illustrates cache line loading according to an embodiment of the present disclosure.

FIG. 9 shows how the SG cache module modifies and stores the information gathered by, or read into, a cache line. This modification of the SG element prior to writing into the cache line improves the performance of the cache.

Assume that we have two memory spaces A and B, with the Descriptor Table located in memory space A (denoted by '0') and all but one of the SG elements located in memory space B (denoted by '1'). Further, assume that a descriptor index 240 given to the cache is 0010001. Since the cache memory can be addressed with 3 bits (total of 8 entries in the cache), the higher order bits (0010) are stored in the Tag field 208 as shown in FIG. 9, along with the SG element memory space location information (0) for the Descriptor Table in the highest order bit. The lower order bits (001) of the descriptor are stored in the cache index 204 for that cache line.

From the 64 bytes that are read from the starting SG element address 100A, the cache can determine that there are four SG elements, with the fourth element being an extension SG element (since its Ext bit is set to '1'). The cache proceeds to load the elements into the cache line. In the embodiment of FIG. 9, the length fields of the SG elements are accumulated into the cache line. For example, length field 102A is copied as is to accumulated end offset field 216A. Accumulated end offset field 216B is the sum of the previous accumulated end offset 216A and length 102B of the second SG element, or the sum of lengths 102A and 102B. Similarly, accumulated end offset field 216C is the sum of the previous accumulated end offset 216B and length 102C of the third SG element, which can also be described as the sum of lengths 102A, 102B and 102C. Finally, accumulated end offset field 216D is identical to the previous value 216C, since the fourth SG element is an extension SG element. This can be described as computing an accumulated length value for storage in the one or more accumulated end offset fields by adding the length of a particular SG element to the length of all previous valid SG elements in the SG list. Valid SG elements in the SG list do not include extension elements or zero length fragments.

FIG. 9 also shows that the SG element memory space locations are copied over from the 'SG loc' field 224 of the SG element into the cache line memory space location fields 218. Also, the next SG element address information is taken from the address 100D of the extension SG element and stored in the cache line in field 212. Since the fourth SG element did not contain a valid fragment, it is stored in the cache as a null element (see address 220D) with the accumulated length field copied from the previous element. This is done to ensure that the cache recognizes that this element does not point to any data fragment. The Valid field 206 is also set to '1' to ensure that the next time the DMA Master requests information about this descriptor, the cache will read from this line first rather than go out to main memory to fetch data.

Once the line is loaded, the SG cache returns information about the first fragment to the DMA Master. The DMA Master will then gather or scatter data from this element and then increment the byte count to reflect that it has transferred the necessary bytes contained in this fragment. The DMA Master will then provide the SG cache with the same descriptor index and the incremented byte count and thereby request information for the next fragment. This time, the SG cache will read the information from its cache line and return data immediately (since it had previously stored information about the next fragment in the cache line). The DMA Master can then transfer data for this fragment. Once the DMA Master has exhausted all of the fragments contained in the SG cache line, the SG cache will once again go out to main memory to fetch the next SG elements to be stored in the cache using the Next SG Element Address. This process continues until the DMA Master finishes the DMA operation, at which time the CPU will instruct the DMA Master to retire the descriptor. At this point, the Valid bit is set to zero for the given descriptor in the cache line, which enables us to re-use the descriptor for a new transfer.

The benefits of using the cache will now be discussed, and compared to the existing DMA schemes.

Arbitrary Fragment Size and Alignment:

As seen from the structure of the SG cache in FIG. 6 or FIG. 9, there are no limitations on the size or the alignment of the SG fragment, which makes it an ideal choice for a memory management system that has arbitrary fragments. The SG cache maintains and stores the context and the memory space location of the fragments involved in an SG list. The SG cache fetches the entire 64-bit address of each fragment and returns this data to the DMA Master. There are also no restrictions on how the Descriptor Table or the SGL themselves are aligned in memory. Therefore the SG cache supports arbitrary alignment.

The SG cache also looks at and manipulates the entire contents of the Length field, and manipulates its contents to figure out the remaining byte count and other required variables. Since this field can have any value from 0 to $2^{32}-1$, the SG cache also supports any size of fragment.

Figure 10:
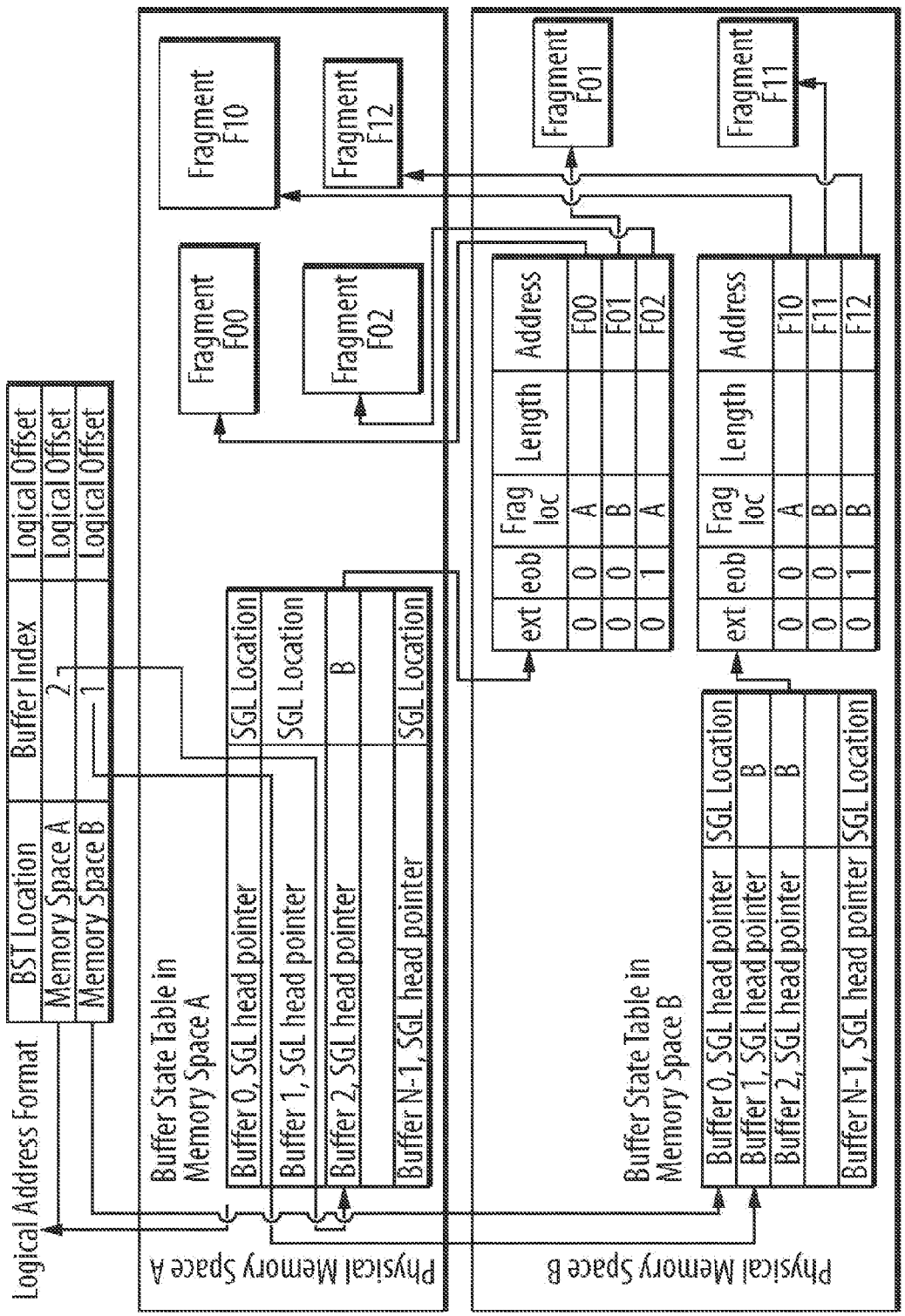
FIG. 10 illustrates support for multiple memory spaces according to an embodiment of the present disclosure, in particular how descriptor table(s), scatter gather list(s) and fragments can be located in different memory spaces.

Support for Multiple Memory Spaces:

FIG. 10 shows how the Descriptor Table(s), Scatter Gather List(s) and the fragments themselves can be located in different memory spaces. (The example in the figure assumes only two memory spaces A and B, but this can be extended to as many as needed). The cache stores enough information to present the fragments as a logically contiguous buffer to the DMA Master.

Performance:

The performance of the DMA operation will be considerably faster than in the conventional DMA case, due to several reasons. A major reason is the pre-fetching and buffering SG elements by the SG cache even before they are needed by the DMA Master. This allows the cache to return subsequent SG element information without accessing the main memory each time.

Figure 11:
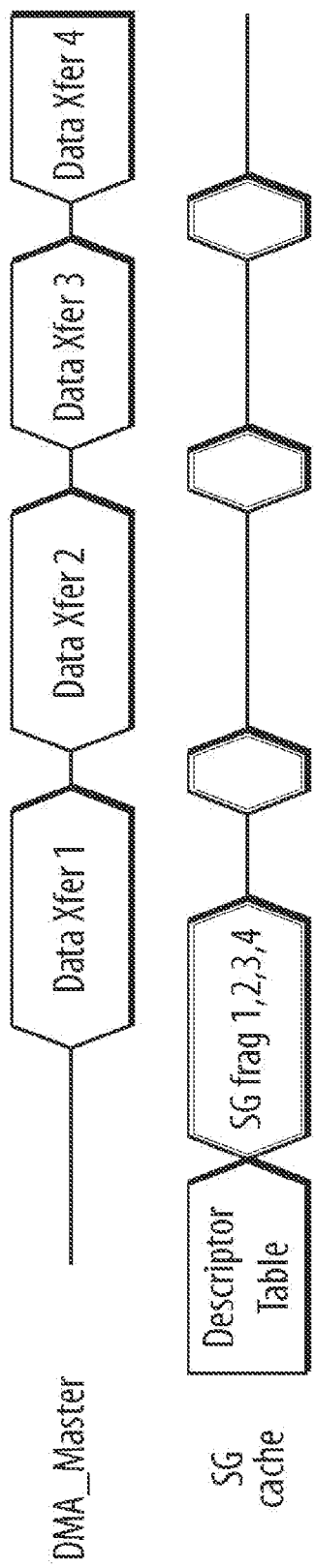
FIG. 11 illustrates a DMA timing with a scatter gather cache according to an embodiment of the present disclosure.

FIG. 11 illustrates a diagram of DMA timing with a scatter gather cache according to an embodiment of the present disclosure. Notice how the DMA Master is able to perform almost back-to-back fragment accesses due to the information being already stored in the cache.

Figure 12:
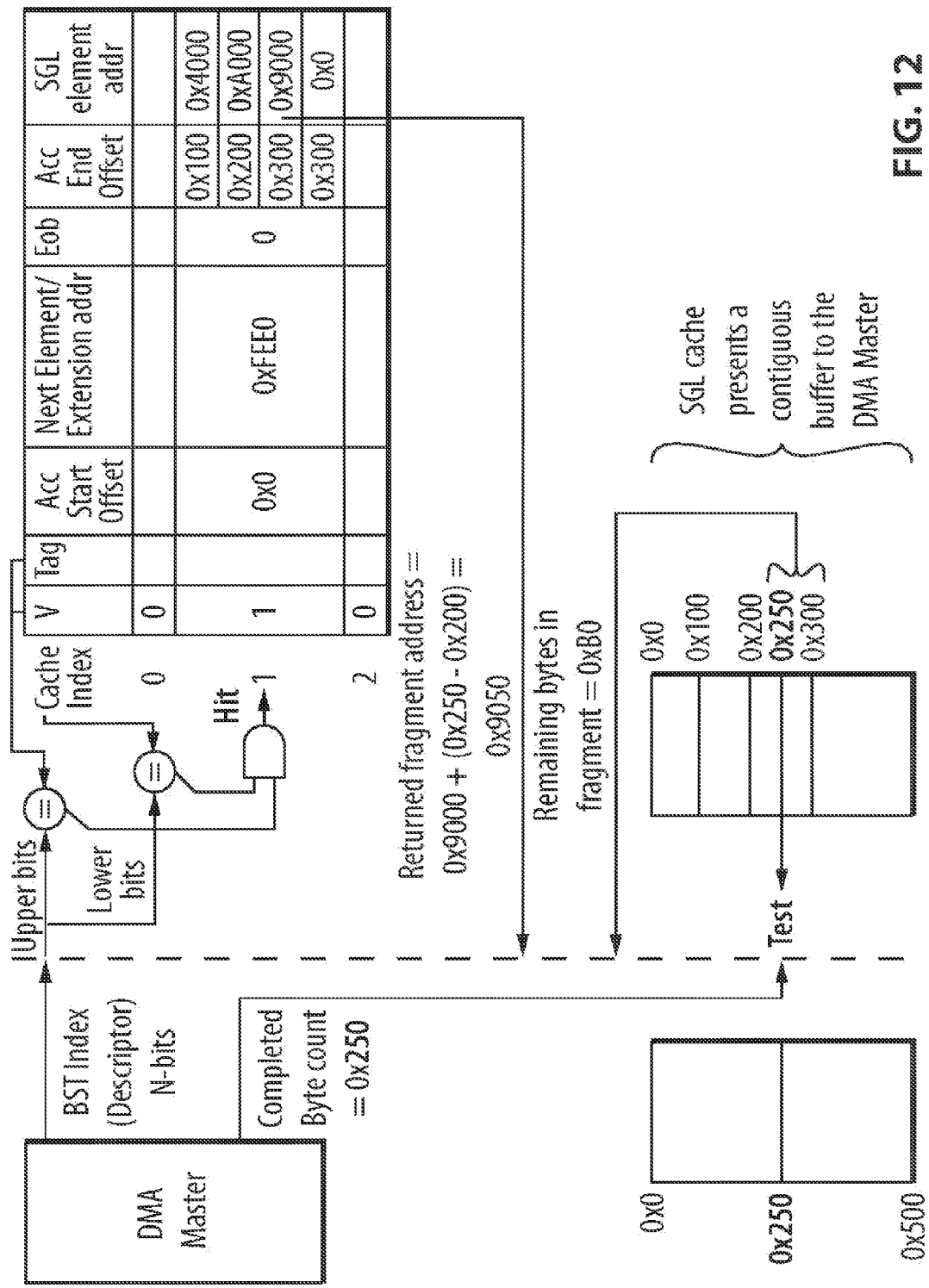
FIG. 12 illustrates a scatter gather cache "hit-test" mechanism according to an embodiment of the present disclosure.

Another feature of the cache that improves its performance is the accumulation of the Length fields of the fragments. By doing so, the cache avoids manipulating and updating the SG element data every time the Master requests a portion of a fragment. Instead, the cache simply performs a 'hit-test' mechanism on the contents stored in its cache line and returns data. FIG. 12 illustrates a scatter gather cache "hit-test" mechanism according to an embodiment of the present disclosure. A device according to an embodiment of the present disclosure can include a hit-test module, or means, to perform a hit-test method or procedure as described below.

The hit-test mechanism is used by the cache to determine whether the SG fragment information requested by the DMA Master resides in the cache, or if the cache should go out to main memory to fetch SG elements in order to satisfy the DMA Master's request. FIG. 12 represents a simplified caching system embodiment where the Descriptor contains only indexing information in the descriptor table and no memory space location information, as it is assumed that both the Descriptor table and the SG elements reside in the same and only memory space. (Alternative embodiments, as discussed earlier, can have more complex schemes. For example, the embodiment of FIG. 7 uses an SG loc bit 224 to locate the particular SG element in one of two memory spaces).

The DMA Master requests fragment address information from the cache by giving the cache the descriptor and a completed byte count (0x250 in this case), as seen in FIG. 12. The completed byte count indicates how many bytes the Master has already transferred for this particular SG list. The cache first checks to see if the particular descriptor's elements are present in any cache line, by indexing into the cache using the lower bits of the descriptor and matching the 'Tag' field bits with the upper bits of the descriptor. If there is a match and the Valid bit (V) is set to '1' for that particular cache line, then this constitutes a 'Hit' condition as the cache contains valid SG element information for that descriptor. FIG. 12 assumes that the cache has a 'Hit' on the descriptor supplied by the Master.

Once a 'Hit' has been established, the cache then proceeds to do a 'Test' whereby it compares the completed byte count supplied by the DMA Master to the Acc Start and End Offset fields. If the completed byte count lies between the values held in the Acc Start Offset and the last Acc End Offset (Acc End Offset 3), then this indicates that the cache contains the SG element that contains fragment information for the DMA Master. In this example, the Acc End Offset 3 has a value 0x300, and therefore the cache does contain information to be returned to the Master. The cache first tests whether the completed byte count rests between the Acc Start Offset and Acc End Offset 0, to see if SG element 0 contains the information to be returned to the Master. Since this is not true for the example in FIG. 12, it then tests whether the completed byte count rests between Acc End Offset 0 and Acc End Offset 1, to see if SG element 1 contains the information to be returned to the Master.

By following this process, the cache concludes that SG element 2 contains necessary information for the DMA Master, as the completed byte count (0x250) rests between Acc End Offset 1 (0x200) and Acc End Offset 2 (0x300). Simple addition and subtraction operations are then performed to supply the correct starting fragment address and remaining byte count in the fragment to the DMA Master, as seen in FIG. 12. This demonstrates one of the key purposes of using the Acc Start and End Offsets—it presents a contiguous buffer view to the DMA Master, also illustrated in FIG. 12.

Sometimes, the cache does have a 'Hit', but the 'Test' mechanism may reveal that the completed byte count is either lesser than the Acc Start Offset or greater than Acc End Offset 3. In the case that the completed byte count is lesser than the Acc Start Offset, the cache will first access the Descriptor table, find the first SG element address and proceed to fetch SG elements from the list until it finds the element that contains the fragment that the DMA Master requested. This is because, in the exemplary embodiment described in FIG. 12, there is no way to traverse an SG list backwards. If the completed byte count is greater than the Acc End Offset 3, then the cache will use the 'Next Element/Extension addr' field's value to access the next SG elements in the SG list.

In case there is no 'Hit' in the cache (either because the Valid bit is '0' or because of a 'Tag' mismatch), the scatter gather cache module will again go out to main memory to fetch SG element information. For either of the cases, the cache will first access the Descriptor table, find the first SG element address and proceed to fetch SG elements from the list until it finds the element that contains the fragment that the DMA Master requested. After the necessary set of SG elements have been found, the cache will load the cache line and set the Valid bit to a '1' (if not previously set), and put the upper bits of the descriptor into the Tag field.

Yet another factor that may improve performance is the prevention of unnecessary data movement due to arbitrarily aligned fragments with arbitrary sizes. As pointed out earlier, embodiments of the present disclosure have the added benefit of eliminating the extra step of managing the workspace buffer and the data movement between the data structure and the workspace, thereby making overall DMA transfers faster.

Notice in FIG. 12 how the SG cache simply compares its Accumulated End Offset fields with the Completed Byte Count from the DMA Master to figure out which SG element information it should return. This 'hit-test' mechanism also helps figure out whether the cache should access further elements down the list (if the Completed Byte Count>=Accumulated End Offset of the last fragment) or if it should traverse the list from the beginning (if the Completed Byte Count<Accumulated Start Offset). The SG cache returns the fragment's address and the remaining number of bytes left in the fragment, as seen in the Figure. Also note that, depending upon the number of SG elements stored, the SG Cache can perform a backward traversal easier than the DMA Master (for example in FIG. 11, if the DMA Master wanted to re-transfer data starting from the 0x100th byte, the SG Cache would return data from the 2nd SG element in the cache line.) This helps improve performance by not having to traverse the SG list from the beginning. A number of other modifications can also improve the performance further, which will be discussed later.

Maintaining Context:

The SG Cache helps store the context of each descriptor index by storing the n currently relevant SG elements for that descriptor, where n is an integer that can be set based on system parameters, and generally equals the number of elements per cache line times the number of cache lines. As described previously, the remaining byte count and physical address are returned almost instantaneously on an access to the SG cache. This is very useful in improving performance when an SGL partial context needs to be reloaded by the DMA Master (when interleaving I/Os or on a retry). The DMA Master does not need to know any information about the length of each fragment or accumulate the number of bytes between fragments to calculate the total bytes transferred. This simplifies the DMA Master design. This is also particularly useful when (say) we have a system with multiple DMA Masters and one SG Cache—all of the information will be centralized, which simplifies the Master's design and makes debugging easier.

Error Recovery and Debug:

The modification of the SG element to include an EOB bit helps in the Error Recovery and Debug process of a data transfer. If the EOB bit was set for a particular element, the cache would identify this as the last element in the list. Now, if the DMA Master requested data beyond the data contents of this element, the SG cache will then raise an error, which can be relayed to the CPU. The SG cache can hold the details of the failure (like Descriptor index, SG element details, byte count requested etc) in a couple of registers accessible to the CPU. The SG cache can also inform the DMA Master of the error. The DMA Master is therefore prevented from accessing areas of memory that could potentially cause a fatal failure. Also note that the DMA Master can now move on to other transfers if need be while the CPU debugs the cause of failure of this particular DMA transfer. This eases the debug process and prevents fatal memory errors compared to the conventional DMA process.

Some of the modifications that can be done to the cache, the SG element and the system will now be presented for various applications. The modifications presented below are not intended to be an exhaustive list. Other variations which can be done for a particular application will be evident in light of this description to one of ordinary skill in the art.

1. Descriptor Strategies:

The number of bits in the descriptor can vary depending upon the size of the memory, the number of outstanding I/Os desired etc. These can be changed for minimizing the number of bits needed to identify the I/O (or) to produce a hit in the cache, thereby increasing performance. Another strategy is to do away with the Descriptor Table, and instead have the address of the first element in the SG list as the descriptor index. This has the advantage that it eliminates the need for a Descriptor Table, but uses more number of bits for the descriptor index.

2. Caching Strategies:

As always, a number of caching strategies are possible, with each one yielding a different performance. Embodiments of the present disclosure were discussed using a direct-mapped cache that stored four SG elements, but this is not a restriction. Some of the straightforward improvements that are possible include changing the associativity (set associative or full associative caches), bigger cache line (to store more SG elements than just four (or) store other relevant information for faster performance). Other possible strategies include reducing the miss penalty (multi-level caches, victim caches) and reducing the miss rate (larger cache size, way prediction, pseudo-associativity).

3. SG Element Modifications:

One of the modifications that was discussed above was the addition of an EOB element to the SG element. The SG element can be modified in other ways for better performance. For example, even with the addition of the memory space location bits and the EOB bit, there are still 29 Reserved bits 228 (see FIG. 7). This space can be used to store a partial address of the previous SG element, so as to make backward traversal easier. The operating system can put the lower 29-bits of the address of the previous SG element in the Reserved bit space of an SG element. This would restrict the available memory space for a given SG list (cannot be more than 512 MBytes, as we have to keep the upper 35 bits constant), but this may not be a huge restriction. With this approach, the cache can store this information gathered from the SG element and can traverse backward with almost the same efficiency as traversing forward.

4. Cache Line Modifications:

The amount of information stored in each cache line about a particular SG list can be increased or decreased depending upon the system requirements for performance. For example, more than 4 consecutive SG elements can be stored in a cache line, or fewer than 4 elements, depending upon the desired performance. Another modification is to only store SG elements that have valid fragment information in the cache line. This means that the SG cache would traverse the SG list until it found valid SG elements while ignoring the extension or null SG elements, until it fills up its cache line (active pre-fetch). The cache line can also be modified to add other fields. For example, in addition to the cache line fields described earlier, a field that stores the address of the first SG element can be added. In case of a backward traversal, this would save an access to the Descriptor Table. Also, as mentioned above, the cache line can also store the lower bits of the previous SG element's address, making backward traversals more efficient.

Figure 13:
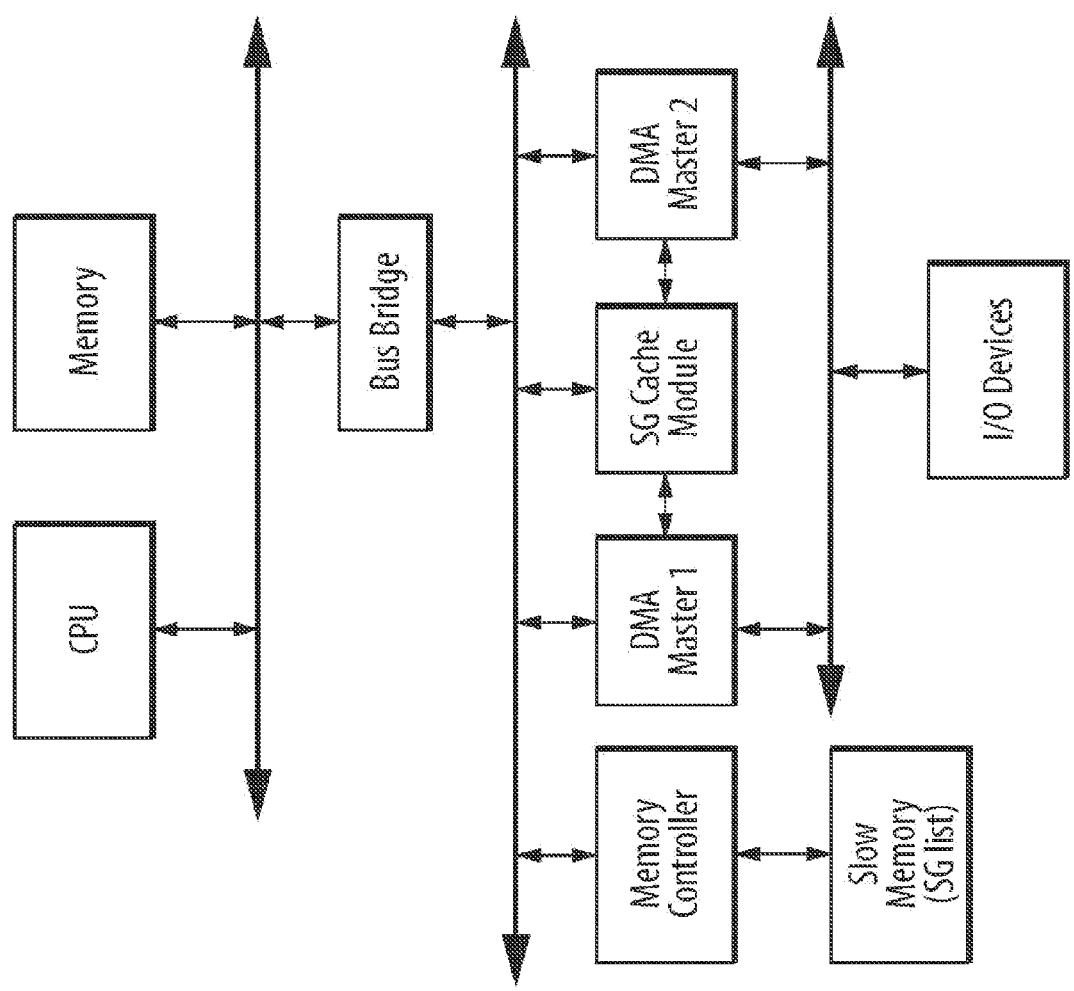
FIG. 13 illustrates a multi-master DMA system including a scatter gather cache according to an embodiment of the present disclosure.

5. Component Modifications:

Given that the SG cache improves the performance of the DMA, the architecture can be modified to include lower performing components in favor of higher performing components in order to reduce cost. For example, the SG list can be held in a secondary memory that has a slower access time than the primary memory—this may not affect the performance of the DMA since the SG cache pref etches SG elements even before they are needed by the Master. Therefore, the latency of the memory is hidden from the DMA Master and the system performance will not suffer due to this change. An example of this implementation is shown in FIG. 13.

Figure 14:
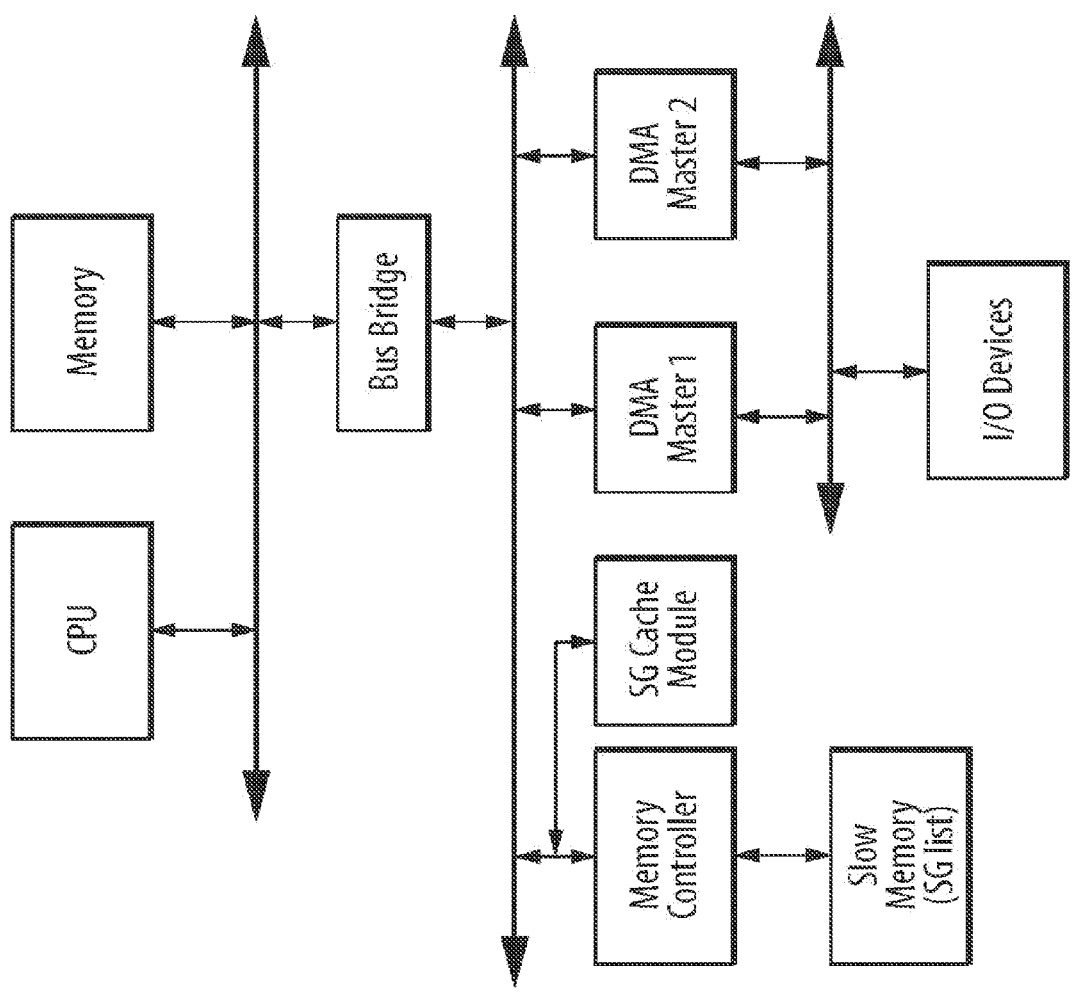
FIG. 14 illustrates a multi-master DMA system including a scatter gather cache according to another embodiment of the present disclosure where the cache is located near the memory.

6. Application Based Modifications:

The SG cache can also be modified based on the applications for which it is being used. We can take a look at several example systems to get an idea of how the cache can be used. Again, this is not intended to be an exhaustive list, but rather a guide to how simple modifications can enable the cache to be used in a wide variety of applications.

a) Multiple Master System:

One of the key advantages of the SG cache is that it can be used for storing SG list context for DMA transfers of multiple DMA Masters, without any modifications to its primary design algorithm. This is because the SG cache only stores information based on descriptors. This kind of system is especially useful in distributed or parallel processing systems with either uniform or non-uniform memory access protocols. Each Master can independently access the centralized SG cache that maintains context information for its transfers. Care should be taken to implement some sort of arbitration algorithm between the DMA Masters requests in case more than one DMA Master requests information from the cache, and also fine tune the parameters of the cache for the desired performance. FIG. 13 shows a system that has two DMA Masters using a single SG cache for DMA transfers. This system also employs a slower memory for storing the SG lists. The arbitration circuitry is not shown and is assumed to be inside the SG cache itself. Alternatively, each Master can also have its own SG cache instead of sharing a cache. This can improve performance at the cost of adding extra SG caches.

b) Locating the Cache Near Memory:

Another possible system configuration is shown in FIG. 14, where we employ a sort of 'snooping' SG cache. This kind of configuration is particularly useful in systems that cannot modify the DMA Master for including support for the SG cache. It can also be used to make the SG cache totally transparent to the DMA Master(s). The SG cache is now located between the memory that holds the Descriptor Table and/or SG list and the memory bus. The SG cache can then snoop the bus to determine when a Descriptor Table or SG access occurs and then proactively pre-fetch the next couple of SG elements from the memory. This way, when a DMA Master requests an SG element from memory the SG cache would return the data instantly instead of the DMA Master having to read from memory. The protocols involved for this type of application of the SG cache are varied and any suitable protocol can be used.

Embodiments of the present disclosure can be implemented in the SAS RAID controllers, and in SPC SAS protocol controller devices.

Embodiments of the present disclosure are generic enough that they can be implemented in any system utilizing a memory architecture that has arbitrarily aligned and sized fragments, which could mean any computer system. Also, embodiments of the present disclosure directly impact the architecture of RAID controllers in the server and external storage RAID controller market. Considering the high attachment rate of ROC in high volume server markets, embodiments of the present disclosure could directly affect how every server in the world is made.

Embodiments of the present disclosure provide an advantage of using a caching mechanism for logical to physical address translation without restrictions on size or alignment of the fragments, thereby providing an MMU for arbitrarily aligned and sized fragments. SG elements can be stored before they are needed (pre-fetching SG elements). SG elements can be modified before storage for improving performance (by not having to perform a write to the cache on every access from the Master). An SG element can be modified for error recovery purposes; for indicating memory space location of the fragment; and/or for storing information for improving performance (e.g. storing the previous SG element address for backward traversal). A hit-test strategy can be used to present a logically contiguous buffer to the DMA Master.

FURTHER EMBODIMENTS

The description that follows relates to further embodiments which address specific scenarios that can arise in SGL cache implementation.

Figure 15:
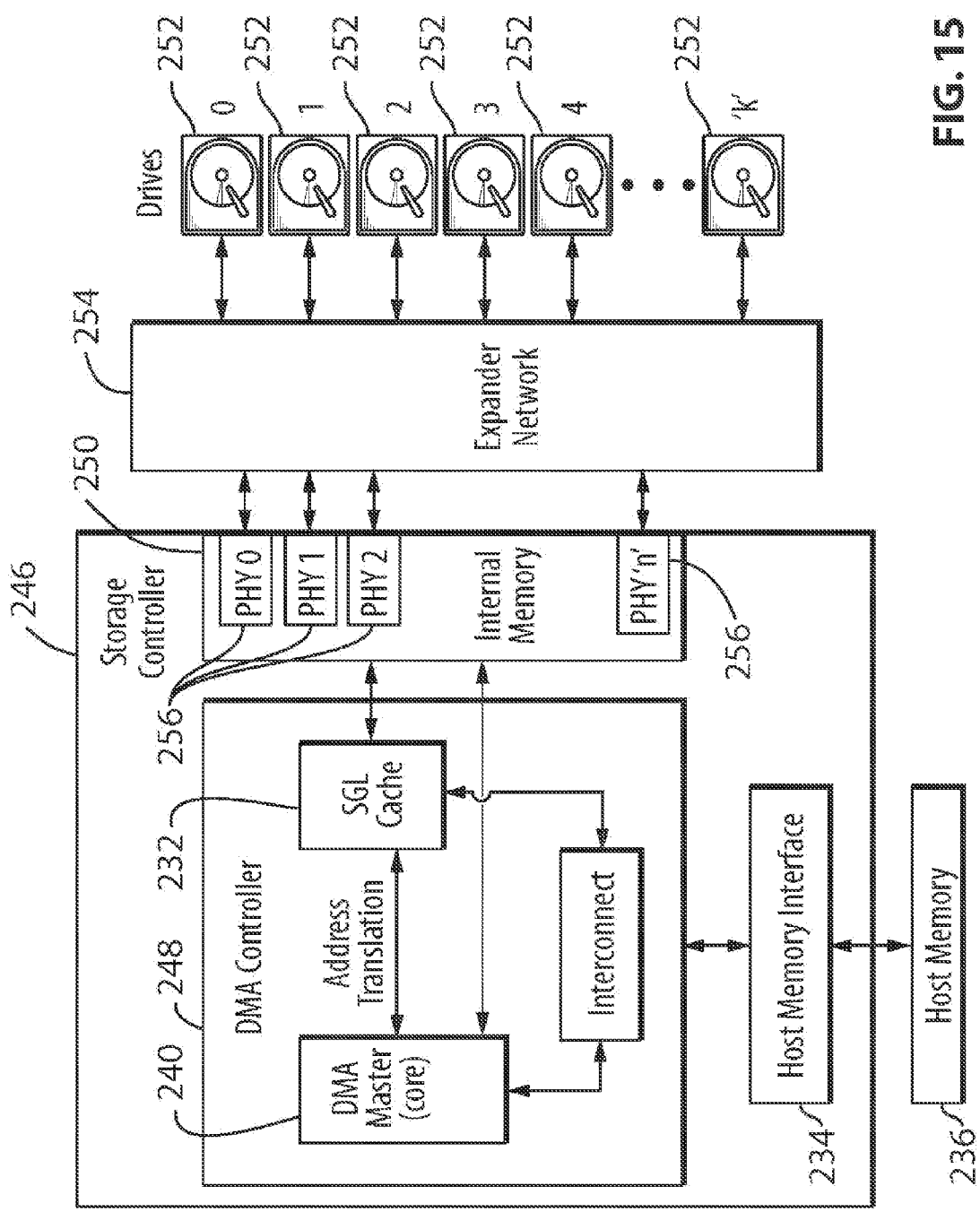
FIG. 15 illustrates a usage model for the SGL cache design of embodiments of the present disclosure as described thus far.

FIG. 15 illustrates a usage model for the SGL cache design of embodiments of the present disclosure as described thus far. In this usage model, the SGL Cache 232 is used in a Storage controller ASIC 246 and is part of a DMA Controller 248 that includes a DMA Master 240 that moves data to/from Host Memory 236 to a plurality of drives via an expander network.

The Host Memory 236 is segmented and therefore accessed using Scatter-Gather elements as in a typical operation system. The DMA Master 240 only transfers data in terms of logical addresses and the SGL Cache 232 does the job of translating the logical address to a physical address in the Host's Memory 236. The Scatter-Gather elements themselves are assumed to be placed either in the Host's Memory or in the Storage Controller's internal memory 250 and therefore the SGL Cache 232 has access to either memory space. The Storage Controller ASIC 246 is able to access a plurality of 'k' drives 252 by going through an expander network 254 via its 'n' PHYs 256. The value 'k' can be much larger than 'n' due to the expander network 254 being able to act as a switch and route traffic between the Storage Controller's PHYs 256 and the drives 252.

At any given time, PHYs 0 through 'n−1' can stream traffic to/from 'n' different drives to the Storage Controller via the expander network. Since the number of drives can be much larger than the number of PHYs (k>>n), drive access to/from the Storage Controller 246 will be arbitrated via the expander network 254. It is not necessary that each drive has a fixed mapping to a PHY 256 on the Storage Controller 246—the expander network may connect a drive 252 through a different PHY 256 depending on the arbitration constraints at that point in time. For example, drive 0 may stream some traffic via PHY 0 on the Storage Controller and some time later the same drive may stream some more traffic via PHY 1 on the Storage Controller. This is because the Storage Controller 246 may support a 'wide' port concept where multiple PHYs 256 share the same address. The amount of data that a drive streams to/from the Storage Controller 246 from the time a connection is made to the time where the connection is terminated is called 'burst size'. A drive 252 may satisfy a data read/write command using multiple 'bursts' of data. Therefore, if one observes a PHY 256 on the Storage Controller 246, one may observe interleaved data from different drives 252, with each drive bursting (more or less) a 'burst size' amount of data.

Typically, each drive's data is transferred to the Host Memory 236 by the DMA Controller 248. Since the Host Memory 236 is segmented, the DMA controller 248 transfers data using Scatter-Gather Lists obtained from the Host. As an example, and for simplicity, assume that each drive's data is associated with a particular Scatter-Gather List in Host Memory 236, so there are 'k' lists that the DMA Controller 248 uses to transfer data from 'k' drives 252. The SGL Cache 232 performs the task of accessing the 'k' Scatter-Gather Lists (SGLs), caching selective SGL elements from each list and returning physical addresses to the DMA Master 240 for the data transfer to/from Host Memory 236. Details of how the SGL Cache performs caching etc have been described earlier.

Thrashing (Unusually High Number of Conflict Misses)

Figure 16:
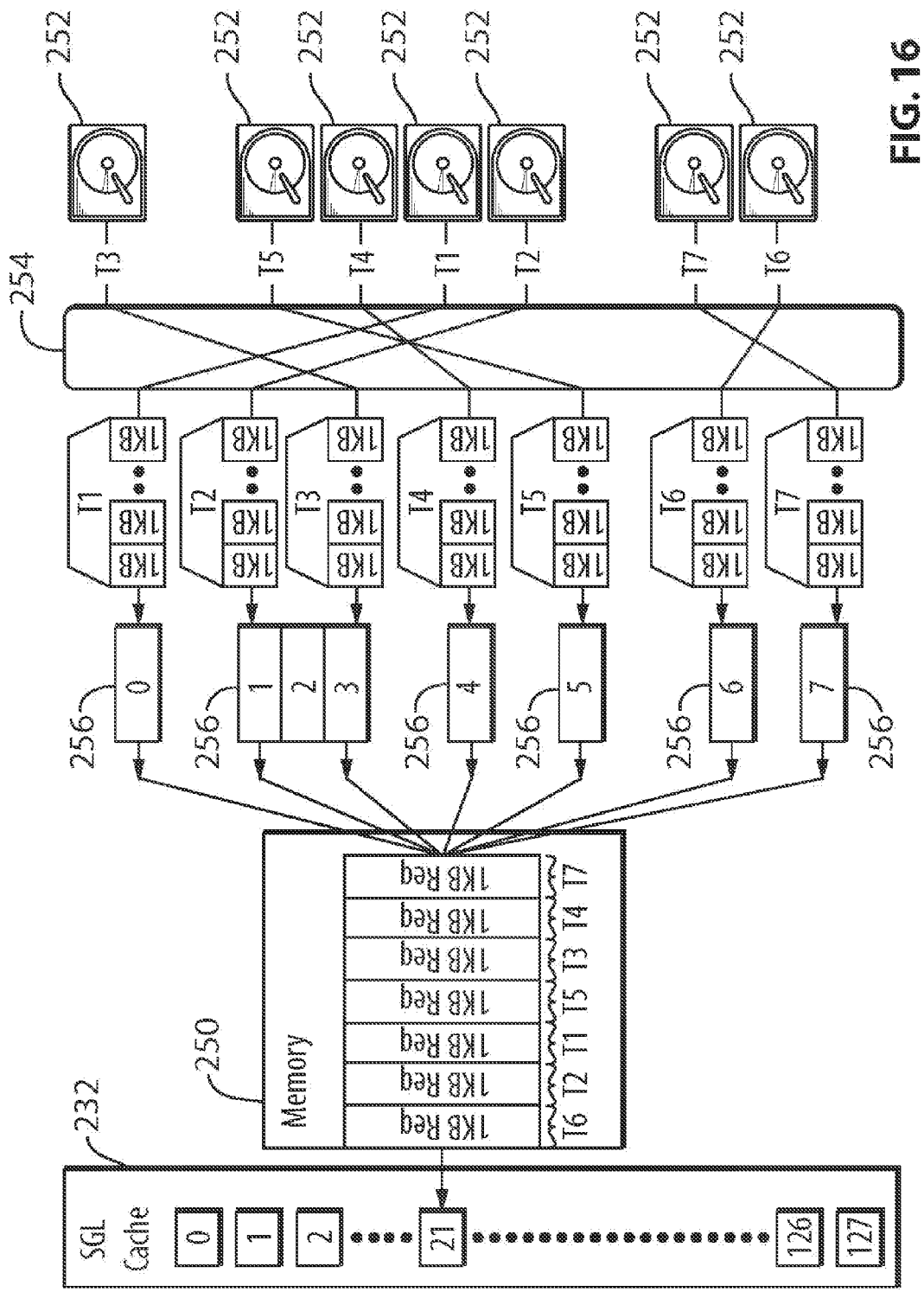
FIG. 16 shows a scenario in one embodiment of an SGL Cache used within the Storage controller.

FIG. 16 shows a scenario in one embodiment of an SGL Cache used within the Storage controller. In this example, the Storage Controller has a total of 8 PHYs, and the SGL cache used in this example is a direct-mapped cache with 128 entries, indexed using the buffer state table (BST) index value. There are 7 drives that are streaming data to the Storage Controller, and the Internal Memory interleaves the drive contents to the DMA Master in 1 KB frames.

In this particular example of a typical usage model, the least significant bits of all of the incoming BST indices (a BST index uniquely identifies a Scatter-Gather List) share a common value that is equal to the SGL Cache Line number ('21'). Because of this, all of them map onto the same SGL cache line and evict each other constantly (conflict misses), which causes a drop in performance. Although this is an extreme case, even if two BST indices share the least significant bits, they are both going to constantly evict each other and cause conflict misses. Note also that the other cache lines are simply unused in this scenario, when they could have actually been put to good use.

A fully associative implementation of the SGL cache 232 will reduce this problem considerably. However, even in those cases there is the problem of replacement strategy. Most fully associative caches use probabilistic replacement strategies like Least Recently Used (LRU), Least Frequently Used (LFU), Most Recently Used (MRU) etc. The problem with using such replacement strategies is that they rely on statistical optimization for performance improvement.

Figure 17:
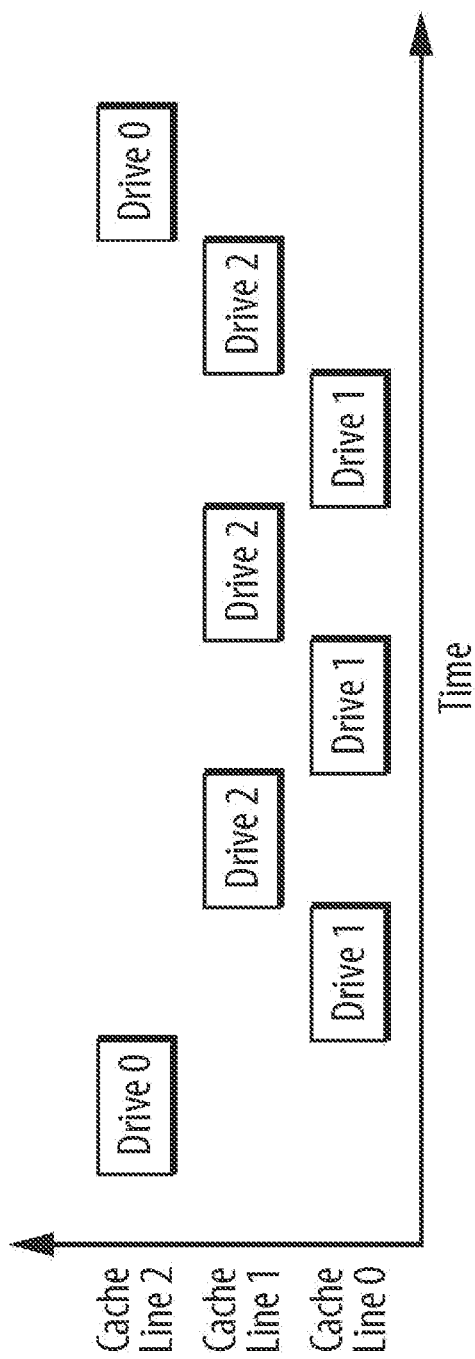
FIG. 17 shows an example of an SGL cache with a total of 3 cache lines, servicing 4 drives.

For example, consider the LRU replacement strategy. FIG. 17 shows an example of an SGL cache with a total of 3 cache lines, servicing 4 drives. Each drive has to transfer a total of 3 KB of data, in blocks of 1 KB.

Initially, Drive 0 transfers its 1 KB of data and its Scatter-Gather List is placed in Cache Line 2 of the SGL Cache. Drive 1 and Drive 2 then transfer their 3 KB total of data in 1 KB transfers and are placed in Lines 0 and 1 respectively. At this point Drive 3 comes in with 1 KB of data to be transferred. The best choice of cache line replacement at this point would have been to replace either Cache Line 1 or Cache Line 2, given that those drives would have finished their transfers. Instead, because Drive 0's SGL was the 'least recently used', its contents are thrown out of Cache Line 2 and Drive 3's SGL is put in its place.

Virtual Indices

To address the thrashing issue, according to embodiments of the present disclosure, a virtual index based caching system and method are provided, which implement a bandwidth based caching scheme for caching Scatter-Gather elements. In an embodiment, a virtual index-based 'replacement policy' for the Scatter-Gather cache is provided to decide which cache line to evict for replacement. The virtual indices can also be used to prevent the swapping of cache line data and tags.

Figure 18:
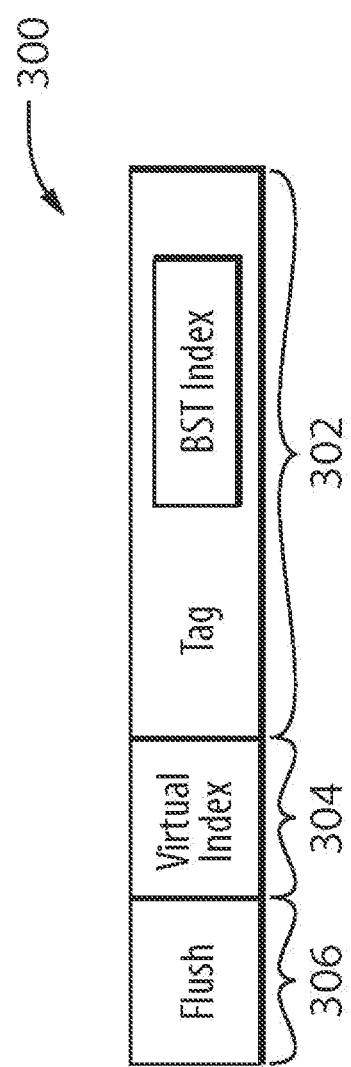
FIG. 18 illustrates an incoming DMA request according to an embodiment of the present disclosure.

FIG. 18 illustrates an incoming DMA request 300 according to an embodiment of the present disclosure. A two-dimensional SGL Cache design according to an embodiment indexes into cache memory in a fully associative fashion using the 'Tag' field. Each incoming request 300 to the cache comprises a 'Tag' field 302 and a 'Virtual Index' field 304, and can include a 'Flush' bit 306. The SGL cache looks first for a match of the 'Tag' fields of a valid cache entry and the incoming request. While the elements that make up the 'Tag' can vary, in an embodiment the 'Tag' comprises the BST index of the incoming DMA request.

In an embodiment, in addition to having the 'Tag' field 302, each incoming request will also have a 'virtual index' field 304 that the SGL Cache also tries to match, depending upon the scenario. The range of the 'virtual index' field 304 has no limits, but in one preferred embodiment (for simplicity of explanation), it is equal to the number of cache lines—in other words, if the number of cache lines is 'n' and 'k' is the number of virtual indices, then k=n. Also, in an exemplary embodiment, there is a one-to-one mapping between a virtual index and a cache line, meaning that one virtual index can be at most associated with one cache line. Each cache line in the SGL cache also stores the 'virtual index' field along with 'Tag' information. For this embodiment, during reset or power-on, each cache line's virtual index field is initialized to the cache line number. At the time of reset therefore, cache line 0's virtual index is set to '0', cache line 1's virtual index is set to '1' and so forth.

Figure 19:
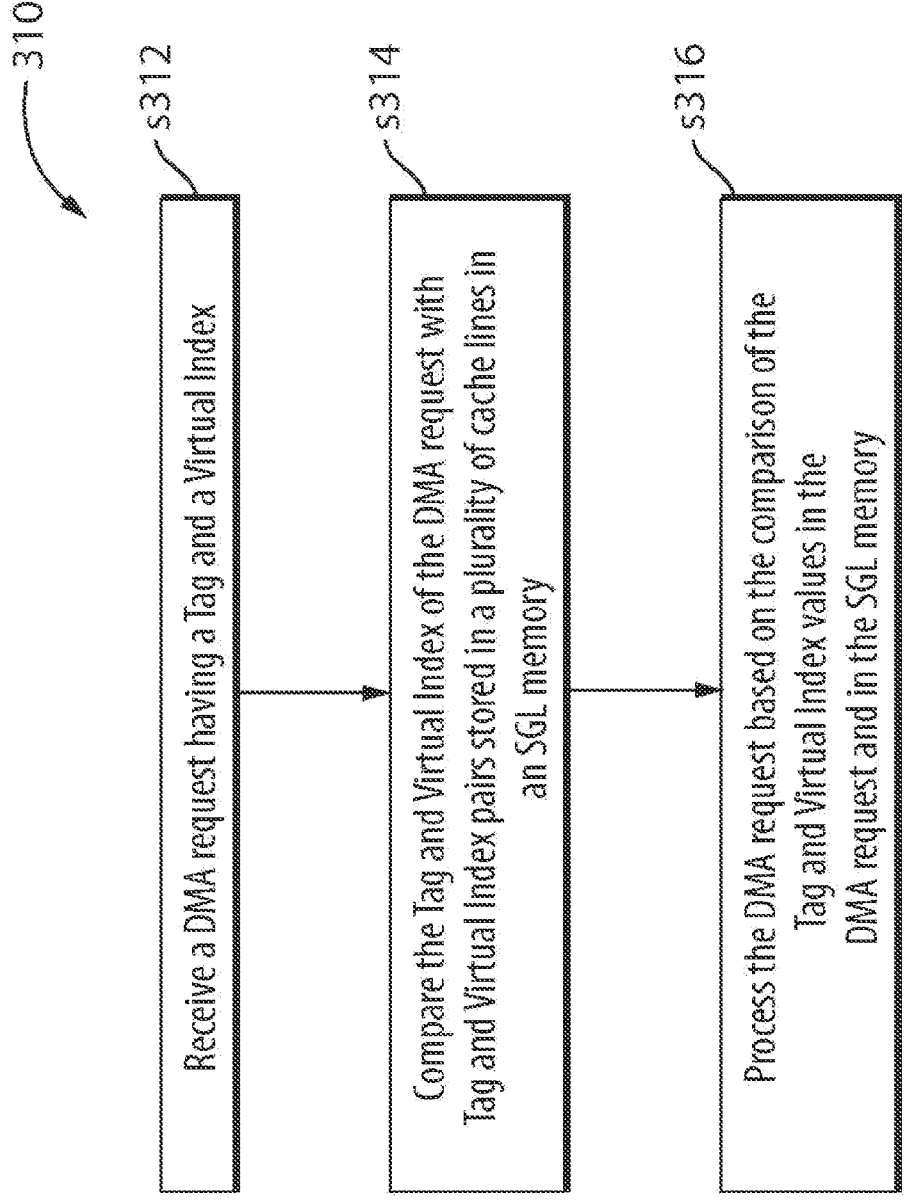
FIG. 19 illustrates a method of SGL cache processing according to an embodiment of the present disclosure.

FIG. 19 illustrates a method of SGL cache processing according to an embodiment of the present disclosure. The method comprises: receiving a DMA request having a Tag and a Virtual Index, the Tag comprising a BST index uniquely identifying an SGL (s312); comparing the Tag and Virtual Index of the DMA request with Tag and Virtual Index pairs for a plurality of cache lines in an SGL cache memory (s314); and processing the DMA request based on the comparison of the Tag and Virtual Index values in the DMA request and in the SGL cache memory (s316).

Two-Dimensional Scatter-Gather Cache

Figure 20:
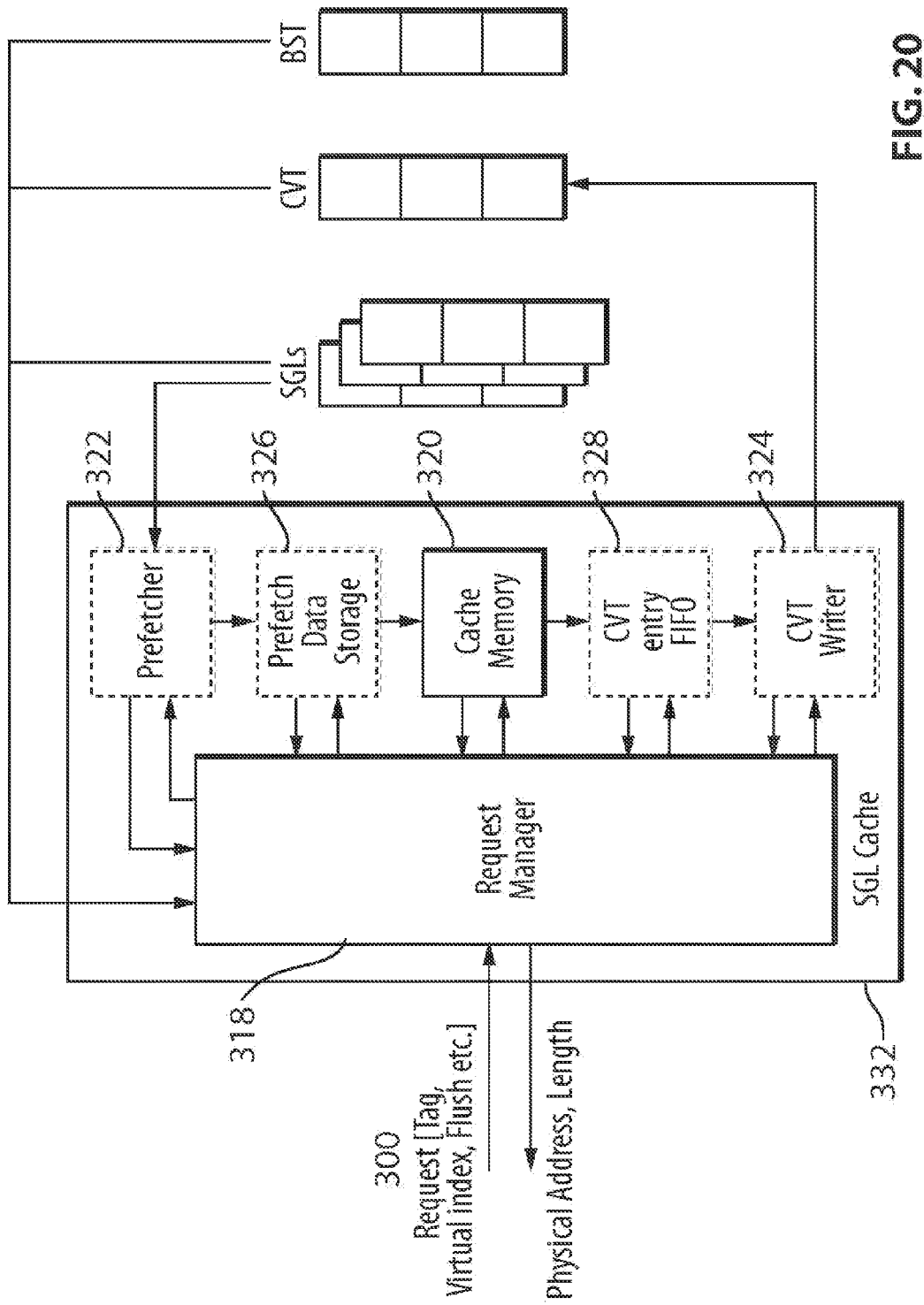
FIG. 20 is a block diagram of an SGL cache module according to an embodiment of the present disclosure.

FIG. 20 is a block diagram of an SGL cache module 332 according to an embodiment of the present disclosure. The SGL cache includes a request manager 318 and a cache memory 320 to provide the virtual indices. Other embodiments may have more or fewer components, or may combine certain components etc. In the embodiment shown in FIG. 20, the SGL Cache includes four major components: the Request Manager 318, a Pref etcher 322, a Context Victim Table (CVT) Writer 324 and the Cache Memory 320. The Prefetcher 322 and CVT Writer 324, and the associated Prefetch data storage 326 and CVT entry FIFO 328, are optional components, and will be described briefly in the context of FIG. 20, and in further detail later.

The Request Manager 318 is arranged to receive a DMA request 300. In the embodiment of FIG. 20, the Request Manager 318, Prefetcher 322 and CVT Writer 324 all have access to a plurality of memories and memory interfaces as necessary in order to fulfill SGL and BST table and CVT access. The Request Manager 318 is able to read from the BST, CVT and SGLs in memory. The Prefetcher 322 reads only from SGLs and the CVT Writer 324 only writes into the CVT. The contents and organization of the BST Table in memory are substantially the same as described earlier herein. The contents and organization of the CVT in memory and the CVT Writer are discussed in the following section.

In embodiments of the present disclosure, the Victim Table is implemented as a Context Victim Table, or CVT. The CVT stores context information for SGLs that have been evicted from the cache memory 320. It is indexed using BST indices and has a one-to-one association with the BST table (i.e. one entry in the BST table will get one entry in the CVT). In one embodiment, the BST Table and CVT are kept in separate memory spaces. In another embodiment, the CVT and BST Table may be combined into one table (since they are both indexed using BST indices). The context information stored into a CVT entry comprises information such as the starting address of the first SGL element in the evicted cache line, the accumulated SGL element length, cache region id, etc. The Request Manager uses the CVT as sort of a secondary level cache.

Figure 21:
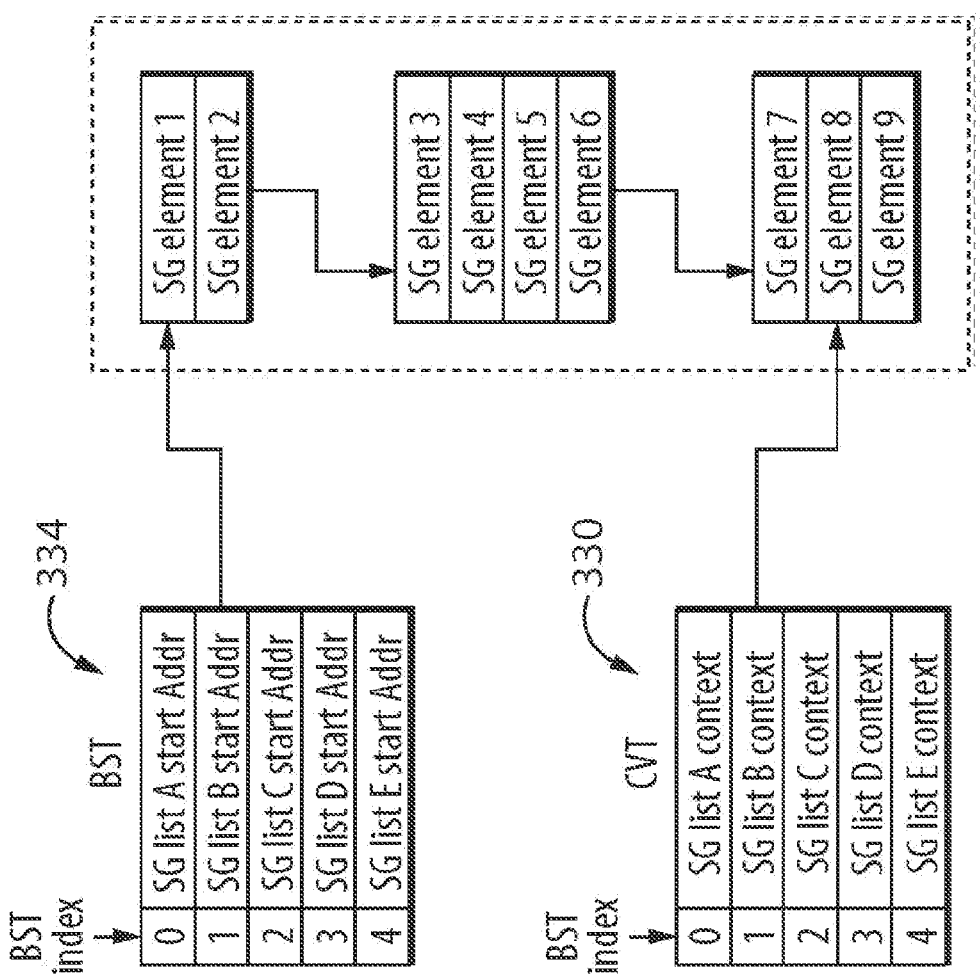
FIG. 21 shows an example of the CVT in memory, as well as a comparison to the BST Table.

FIG. 21 shows an example of a CVT 330 in memory, as well as a comparison to the BST Table 334. The main difference between the CVT 330 and the BST Table 334 is that the CVT 330 can point to the starting address of any element in the SGL and stores that element's 'accumulated length offset', whereas the BST stores the starting address of the SGL and has no length information (as seen in FIG. 21).

In an embodiment, the CVT 330 is used as a secondary caching table that stores the starting address of the most recently used SGL element, so that the SGL Cache need not traverse the entire list when resuming data transfers for this SGL. In contrast, the BST Table 334 points to the starting address of an SGL.

Referring back to FIG. 20, consider the CVT Writer 324. Since there is a finite number of cache lines, the Request Manager 318 will have to eventually evict a BST index's information from a cache line to make room for the current BST index being serviced. When this happens, the Request Manager 318 will write the evicted BST index's context information into the CVT entry FIFO 328. The CVT Writer 324 will then read this information from the FIFO 328 and will then write this context information into the appropriate place in the CVT 330. The CVT entry FIFO 328 can be sized to meet performance requirements. In one scenario, the Request Manager 318 may find the CVT entry FIFO 328 full when attempting to evict an SGL entry. Various embodiments can be provided to deal with such a situation. In one such embodiment, the Request Manager 318 will stall if the CVT entry FIFO 328 is full when it requests a writeback. In this case, the Request Manager 318 will wait until a slot is available in the CVT entry FIFO 328 for writing out the CVT context before proceeding to service the next request.

The Request Manager 318 takes a request from a requestor and looks to see if the 'Flush' bit 306 is set in the incoming request. The Flush bit 306 is shown in FIG. 18 in the context of a DMA request 300.

If the 'Flush' bit 306 is not set, it attempts to look into the cache to see if the SGL information is available for that BST index. If the information is in the cache, the state machine will return the requested data to the requestor and will return to the idle state OR fetch more SGL elements from memory using the information in the cache line and then return data to the requestor. If the information is not available in the cache, the Request Manager 318 will read the CVT Table 330 to get information of the SGL's address.

If the incoming request has the 'Flush' bit 306 set, then the cache will first invalidate any SGL information being currently held for that BST index and will then go out to the BST table to fetch the SGL address. In an embodiment, the 'Flush' bit 306 informs the SGL cache 332 that the incoming BST index is being newly re-used for another SGL and that the SGL Cache 332 should invalidate all data pertaining to that BST index in case of a Tag match (hit).

If the Request Manager 318 is able to find SGL information in the cache while servicing a request, it checks to see how many SGL elements the requestor has consumed. In an embodiment, any time the requestor has consumed more than a predetermined number of SGL elements in the cache line, the Request Manager 318 will attempt to launch a prefetch for that BST index (SGL), by writing a prefetch context for that BST index into the Prefetcher 322. The Prefetcher 322 then launches a prefetch for that BST index, prefetches a number of SGL elements and stores it in the Prefetch data storage 326.

The Prefetch data storage 326 then stores this data into the same cache line that contains the BST index that was used to launch the prefetch. The size of the Prefetch data storage 326, or the number of prefetches that the Prefetcher can handle, can vary with each embodiment and is dependent on performance and other trade-offs.

The Cache Memory 320 is simply the storage unit of the SGL cache. It stores the SGL elements of a given SGL list (BST index) into a cache entry. In addition to this, in an embodiment each cache entry also has a 'Valid' bit and 'Tag' and 'Virtual Index' fields.

The operation of the SGL cache will now be described in further detail. In particular, there are four possible scenarios that can happen when the SGL Cache receives an incoming request: miss without eviction; miss with eviction; hit; and swap hit.

Miss without Eviction

Figure 22:
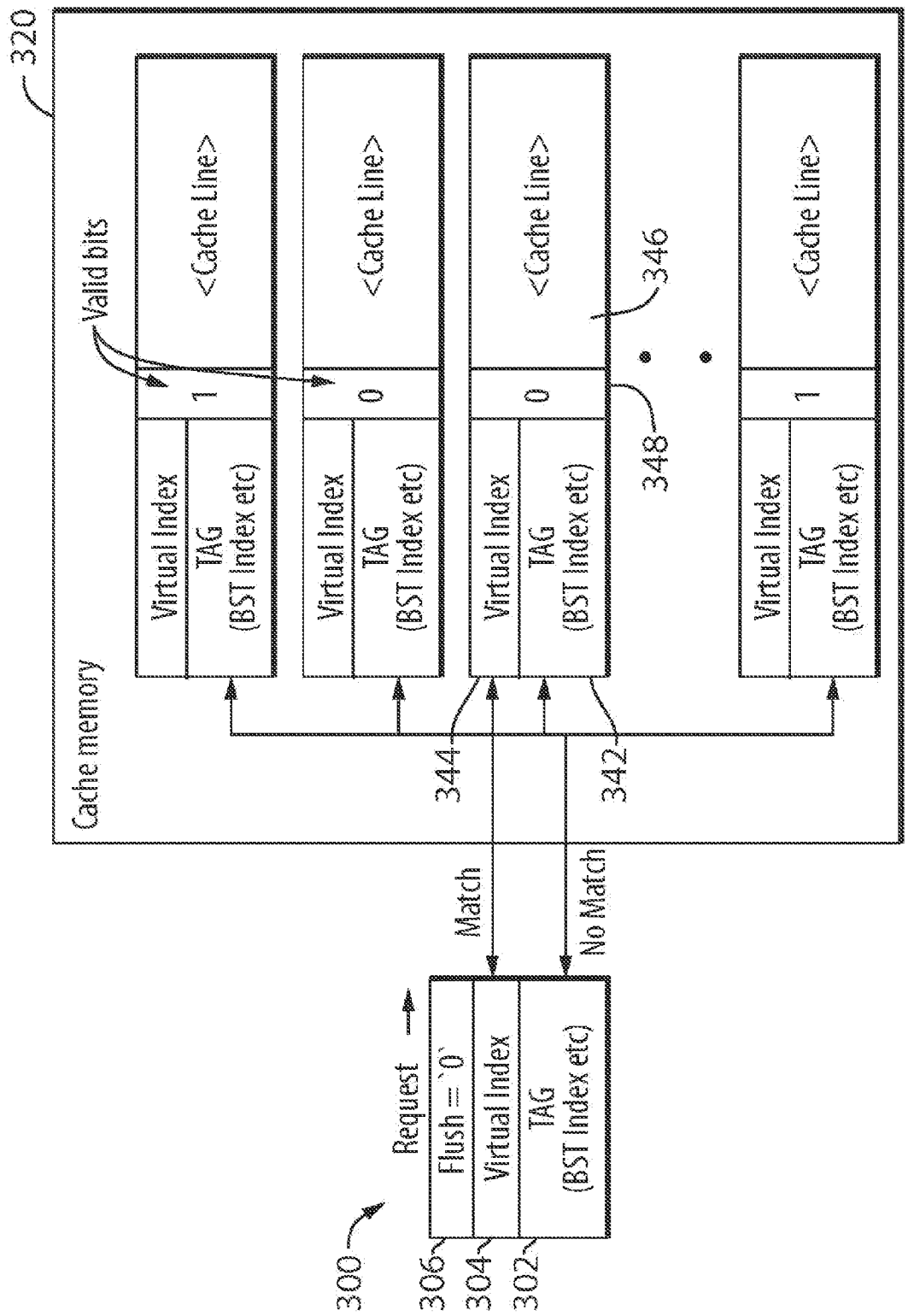
FIGS. 22 and 23 illustrate block and flow diagrams of an incoming DMA request and an SGL cache memory showing a miss without eviction scenario.
Figure 23:
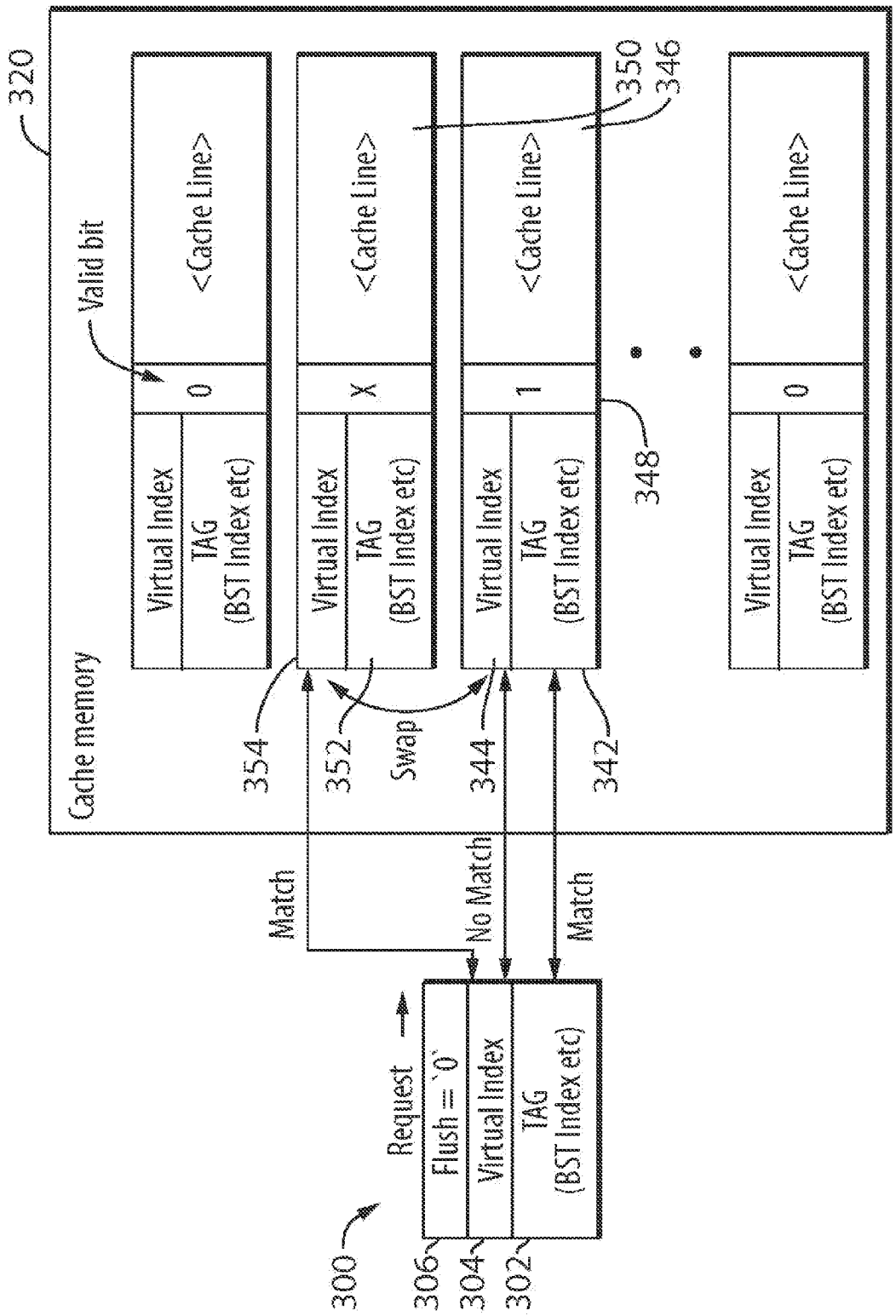

FIGS. 22 and 23 illustrate block and flow diagrams of an incoming DMA request 300 and an SGL cache memory 320 showing a miss without eviction scenario.

As shown in FIG. 22, when the SGL Cache 320 cannot match the incoming 'Tag' field 302 from the requestor to any of the valid tags 342 in any cache line 346 AND the cache line currently marked with the 'virtual index' number 344 for the request has its 'Valid' bit 348 set to zero, a miss without eviction occurs. In this case, the SGL Cache 320 will fetch information from the CVT 330 for the current BST index and proceed to fetch SGL elements, if the 'Flush' bit 306 was not set in the incoming request.

After the elements have been fetched and data has been returned for the request, the cache 320 will store the elements into the cache line 346 that matches the 'virtual index' field 304 for the request and sets the Valid bit to '1' in the tag 342.

In FIG. 23, when the SGL Cache 320 matches the incoming 'Tag' field 302 from the requestor to any valid tags 342 in any cache line 346 but the incoming request has the 'Flush' bit 306 set, a miss without eviction occurs. In this case, the SGL Cache 320 will fetch information from the BST table for the current BST index and proceed to fetch SGL/Index List elements, provided the 'Flush' bit 306 is set in the incoming request 300. In other words, the incoming request 'Hit' into the cache, but had its 'Flush' bit 306 set, so it constituted a Miss without eviction. The cache 320 goes out and fetches information for the BST index and stores it in the line 346 that 'matches' the Tag 302 of the incoming request, and then swaps the 'virtual indices' 344 and 354.

Therefore, in an embodiment, in a miss without eviction scenario: (a) either the incoming request is going to fill-up a cache line that did not have valid SGL information for some other BST index stored in it previously, and therefore there is no eviction to the CVT or (b) the incoming request 'Tag' matches a valid cache line, but the 'Flush' bit was set, which forced a miss.

Miss with Eviction

Figure 24:
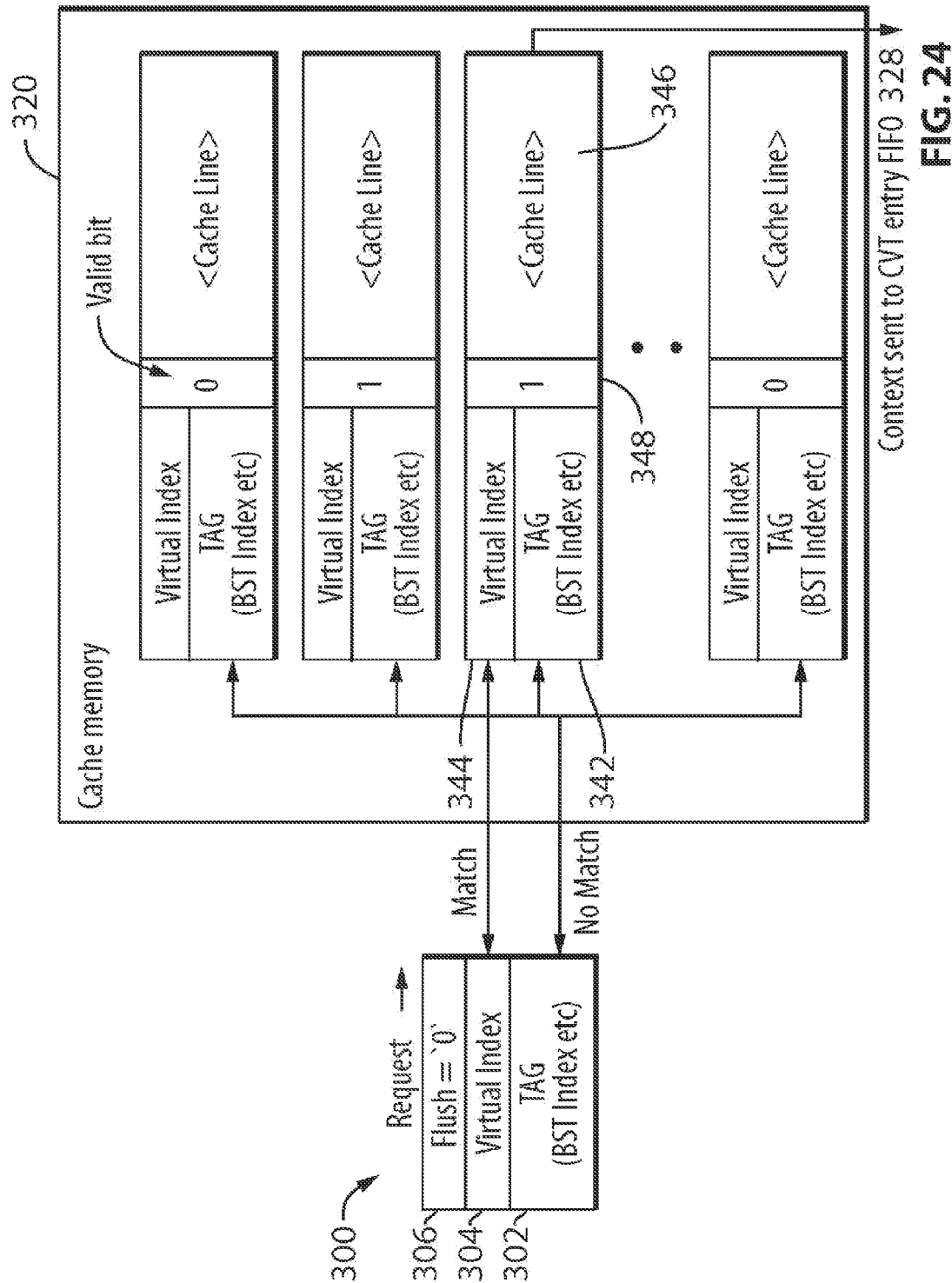
FIG. 24 illustrates a block and flow diagram of an incoming DMA request and an SGL cache memory showing a miss with eviction scenario.

FIG. 24 illustrates a block and flow diagram of an incoming DMA request 300 and an SGL cache memory 320 showing a miss with eviction scenario. In FIG. 24, the incoming request 300 has no Tag match in any cache line, but the Valid bit 348 for the cache line 346, with a virtual index 344 matching the virtual index 304, is set to '1'.

When the cache region cannot match the given BST index (and other tag details) from the requestor to any of the valid tags in any cache line AND the cache line currently marked with the 'virtual index' number 344 for the request has its Valid bit 348 set to '1', a miss with eviction occurs. In this case, the Request Manager 318 follows the same steps as in the 'miss without eviction' case, but also writes context details of the evicted BST index into the CVT entry FIFO 328 in order to launch a writeback to the CVT 330. By doing this, embodiments of the present disclosure 'save' the context of the SGL that was present in that cache line into the CVT 330.

In an embodiment, in the miss with eviction scenario, the incoming request is going to fill-up a cache line that had valid SGL information for some other BST index stored in it previously, and therefore the SGL context of that BST index is evicted to the CVT.

Hit

Figure 25:
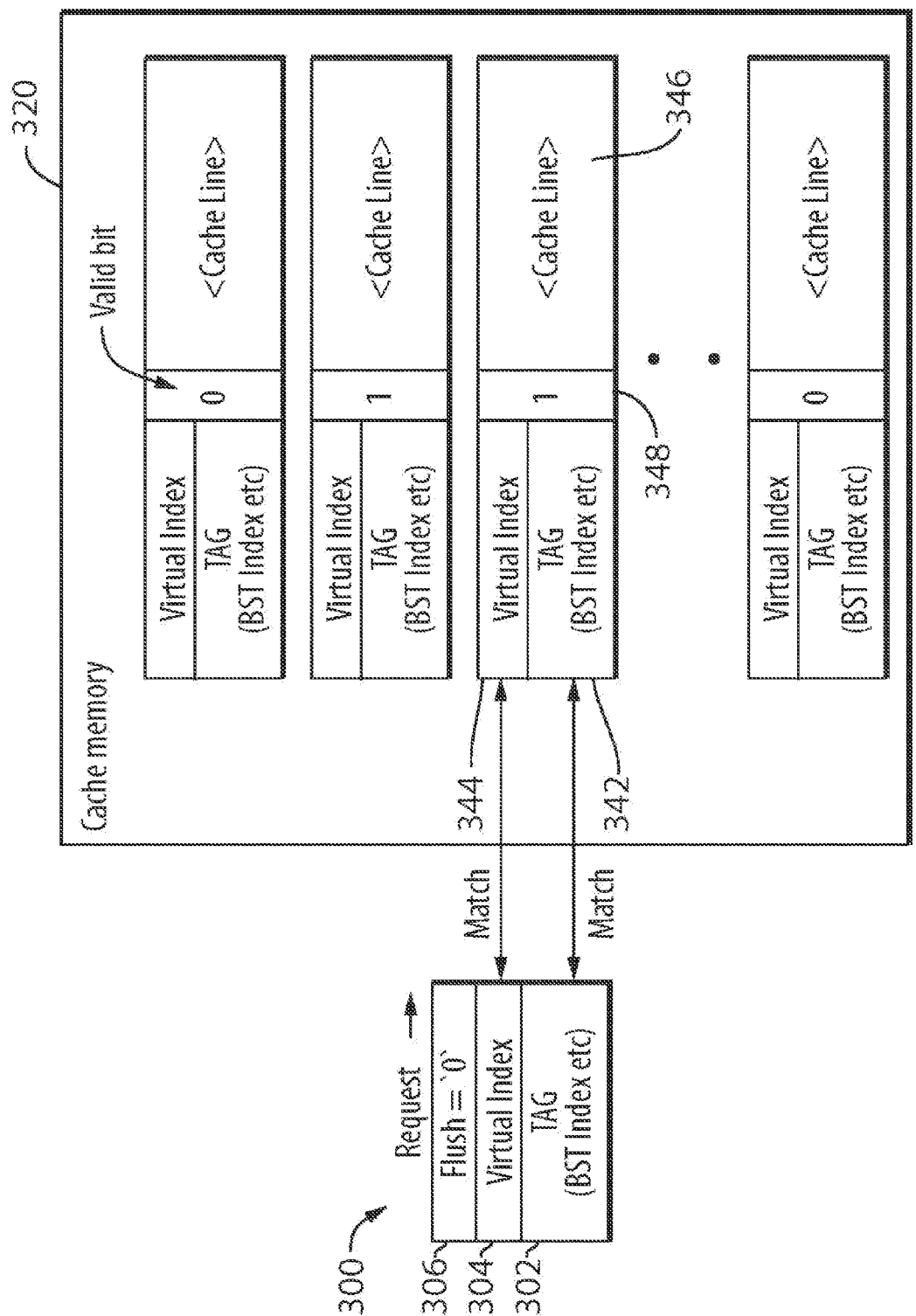
FIG. 25 illustrates a block and flow diagram of an incoming DMA request and an SGL cache memory showing a hit scenario.

FIG. 25 illustrates a block and flow diagram of an incoming DMA request 300 and an SGL cache memory 320 showing a hit scenario. When the SGL Cache 320 matches the given BST index (and other Tag 302 details) from the requestor to the valid tag 342 in a cache line 346 AND also matches the 'virtual index' field 304 from the request to the 'virtual index' field 344 of the current cache line 346, a hit occurs. Also, for this case the incoming 'Flush' bit 306 should not be set.

In this case, the Request Manager 318 will either:

a) return information from the cache line 346 to the requestor, if the line contains the appropriate SGL elements to satisfy the request; and launch a prefetch if more than a predetermined number of SGL elements have been consumed by the requestor;

b) fetch information directly from the SGL list in memory using context information stored in the cache if the cache does not contain enough SGL elements to satisfy the request, and then return data to the requestor;

c) wait for the Prefetcher module to return data for the SGL list (in an embodiment, when a prefetch request has already been launched for this SGL list and is outstanding, there is no need to launch another read for those SGL elements; other embodiments can implement this differently); or d) fetch information from the BST and then fetch SGL elements from memory and return data to the requestor (in case of a 'reverse' traversal—for example, the cache line has SGL elements 5 through 8, and the requestor requested information that lies before SGL element 5).

Swap Hit

Figure 26:
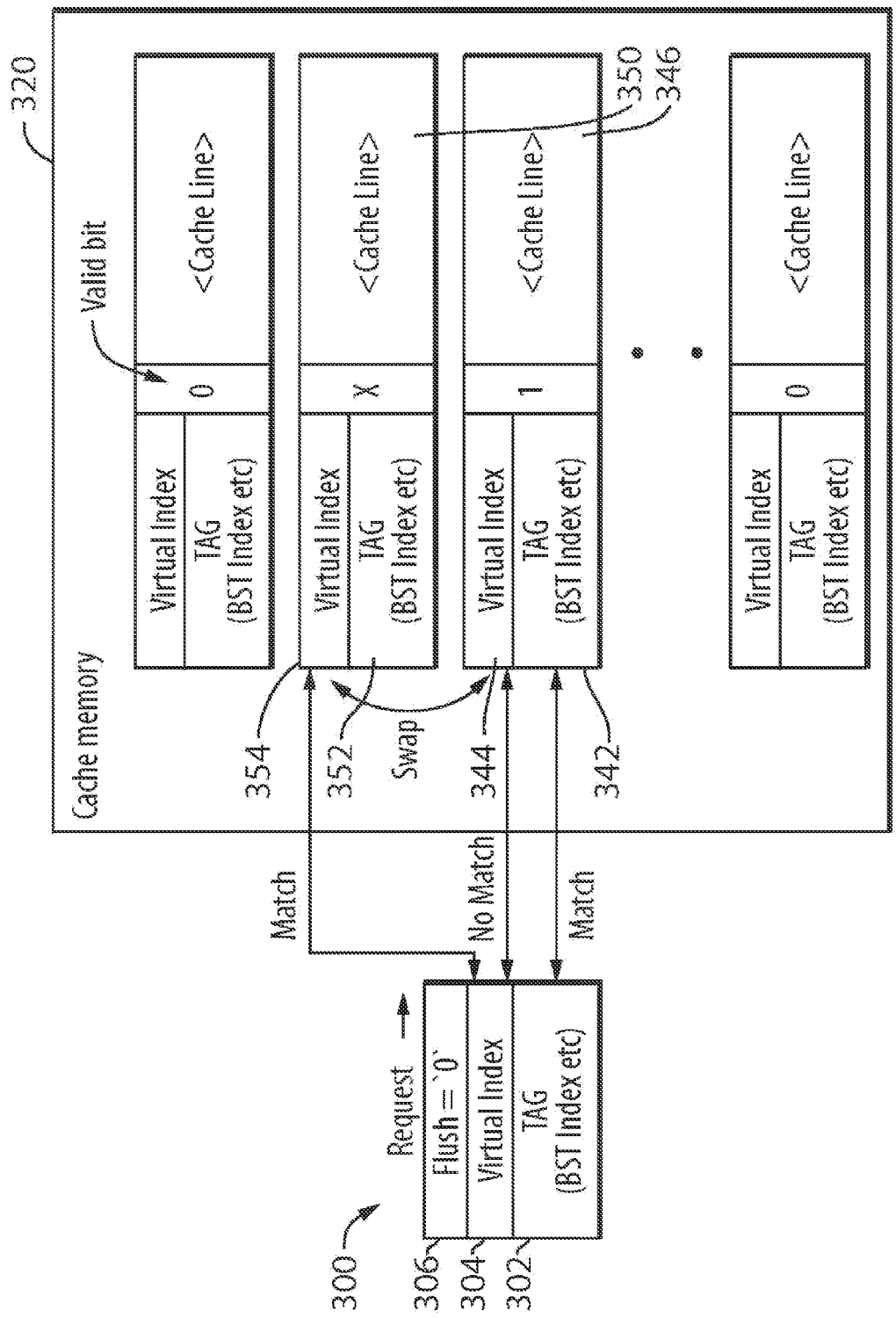
FIG. 26 illustrates a block and flow diagram of an incoming DMA request and an SGL cache memory showing a swap hit scenario.

FIG. 26 illustrates a block and flow diagram of an incoming DMA request 300 and an SGL cache memory 320 showing a swap hit scenario. When the cache matches the given BST index (and other tag 302 details) from the requestor to the valid Tag 342 in a cache line 346, but the 'virtual index' 304 from the request does NOT match the 'virtual index' 344 of the hit cache line 346, and the incoming 'Flush' bit 306 is not set, a Swap Hit is said to have occurred. In this case, the Request Manager 318 will first search for the cache line 350 containing the 'virtual index' 354 matching the virtual index 304 of the incoming request 300 and overwrite it with the 'virtual index' 344 from the hit cache line 346. It will also overwrite the 'virtual index' 344 of the hit cache line with the 'virtual index' 304 from the incoming request (basically a virtual index 'swap' operation). Other than that, the Request Manager 318 will perform the same actions as a Hit.

When comparing FIGS. 23 and 26, FIG. 23 has a Tag match to a valid cache line and a 'Flush' bit set, while FIG. 26 has a Tag match to a valid cache line and the 'Flush' bit not set.

In an embodiment, in a 'Swap Hit' scenario, the incoming 'hit' request's Tag and Virtual Index are kept together in the same cache line, but rather than swap the Tag and Cache line data between cache lines, the 'Virtual Index' is swapped, which is much smaller in size.

The table below summarizes the scenarios discussed above:

TABLE 1

| Flush | Tag match | Virtual index match | Valid bit set* | Action | Case |
|---|---|---|---|---|---|
| 0 | yes | no | Don't care | Swap virtual indices | Swap Hit |
| 1 | Yes | no | Don't care | Swap virtual indices – go to BST table for fetch and not CVT | Miss without eviction |
| 0 | yes | yes | N/A | Hit | Hit |
| 1 | yes | yes | N/A | go to BST table for fetch and not CVT | Miss without eviction |
| 0 | No | yes | Yes | evict the current contents of cache line to CVT + use CVT to fetch information for request | Miss with eviction |
| 0 | No | yes | No | use CVT to fetch information for request | Miss without eviction |
| 1 | No | Yes | Yes | evict the current contents of cache line to CVT + use BST to fetch information for request | Miss with eviction |
| 1 | No | Yes | No | use BST to fetch information for request | Miss without eviction |
| Don't Care | No | No | Don't care | This case cannot exist, since the incoming request will always either match Tag or Virtual Index at a minimum | |

*for cache line that matches the virtual index

Thrashing Solved

Figure 27:
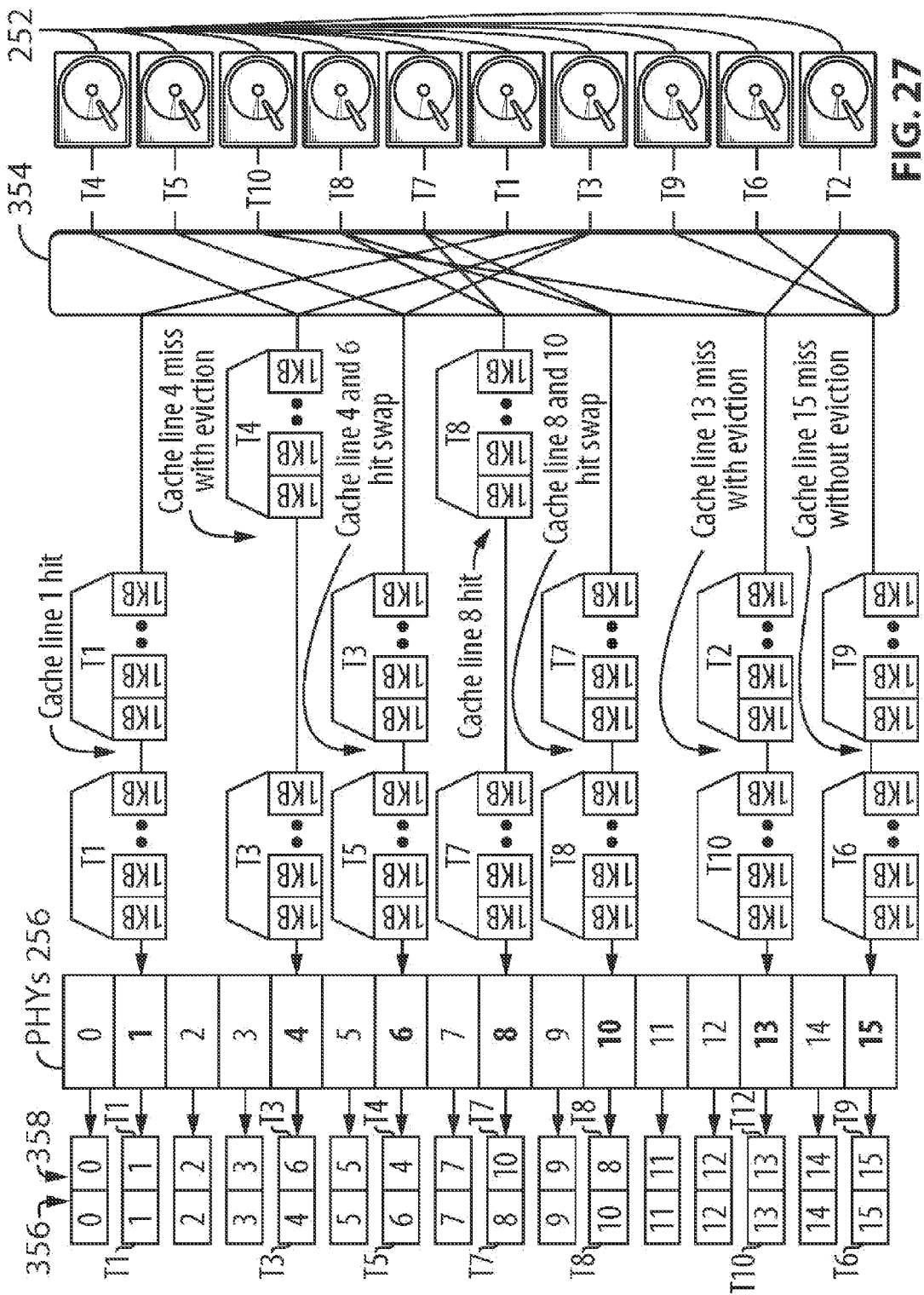
FIG. 27 shows a usage model where a two-dimensional SGL Cache with 16 cache lines is used.

FIG. 27 shows a usage model where a two-dimensional SGL Cache with 16 cache lines is used. The number of PHYs of the device and the number of 'virtual indices' is also equal to 16. As seen in FIG. 27, the PHYs 256 are numbered 0 through 15, and the Cache lines are initially marked in "column" 356 with a virtual index value that is equal to the cache line number (0 through 15), and remain so marked after the first transfer. The "column" 358 indicates the virtual index value after the second transfer. There are 10 drives 252 in the system (shown on the right hand side) that are attempting to send data to the DMA Master through the expander network 254. Note that any drive 252 can choose to send data through any PHY 256 because the expander 254 acts as a switch. In the example, only PHYs 1, 4, 6, 8, 10, 13 and 15 are receiving data from the drives.

Note that drives 252 that are bursting data at the same point in time are not thrashing (conflict misses) with each other on any cache line for the duration of their bursts. This is because each PHY 256 is getting its own 'dedicated' share of the cache due to a one-to-one mapping between the PHY 256, virtual index and cache line. This ensures that we have at least one available cache line per PHY 256. The scheme favours bandwidth optimization (through the choice of virtual index) rather than favouring temporal or spatial characteristics of the cached data like most common caches. Therefore, in an embodiment, 'virtual indices' can be used to ensure a certain bandwidth dedication to the PHYs 256 of the device.

In an embodiment, the 'virtual indices' act as the replacement strategy in the SGL cache while allowing the cache to be fully associative. When the SGL cache does not find a match for a given request in the cache, it uses the virtual index to determine which entry to evict from the cache. The two-dimensional SGL Cache can thus be thought of as a fully associative cache (search every cache line for a given BST index) with a 'virtual index' based replacement policy. To illustrate this, refer to PHY 15 in FIG. 27. Note that drive T6 bursts data into this cache line followed by drive T9. Also note that when drive T9's data comes in through the PHY, drive T6's data is evicted from the cache rather than using a free cache-line to store drive T6's data. T6 was chosen for replacement since PHY 15 can at most have one active drive bursting data at a time, (T9), and removing T6 from PHY 15's allotted cache line doesn't have a negative effect on the bandwidth.

In another aspect, using virtual indices prevents expensive cache line data swapping—the 'Swap Hit' feature of the virtual indices ensures that the virtual indices of the cache line are swapped rather than the cache line data/Tags between two cache lines, which can save processing time. Embodiments can therefore choose to implement the virtual index memory storage using a faster memory than the rest of the cache line, effectively reducing the hit time during a Swap Hit. An example of Swap Hit can be seen between PHYs 8 and 10 in FIG. 27, where the data from drives T7 and T8 come in on PHYs 8 and 10 in an alternating fashion. With this exemplary virtual index implementation, virtual indices 8 and 10 are swapped between cache lines 8 and 10 and therefore the SGL cache has dynamically changed its cache line allocation for PHYs 8 and 10. Without using virtual indices, cache lines 8 and 10 would have to exchange their data/Tags fields in order to maintain the PHY to cache line allocation.

Alternative Caching Scheme Implementations Using Virtual Indices

In addition to the advantages of using virtual indices described above, in some embodiments the virtual indices can be used to implement other replacement schemes merely by changing their behaviour to an incoming request. The SGL cache therefore, can mimic various caching schemes on-the-fly in the same device. One advantage is that the caching schemes in a device can be changed and can be observed to see which one offers the best performance for a given traffic profile. Once this is known, the SGL cache can be programmed to operate in this mode.

Figure 28:
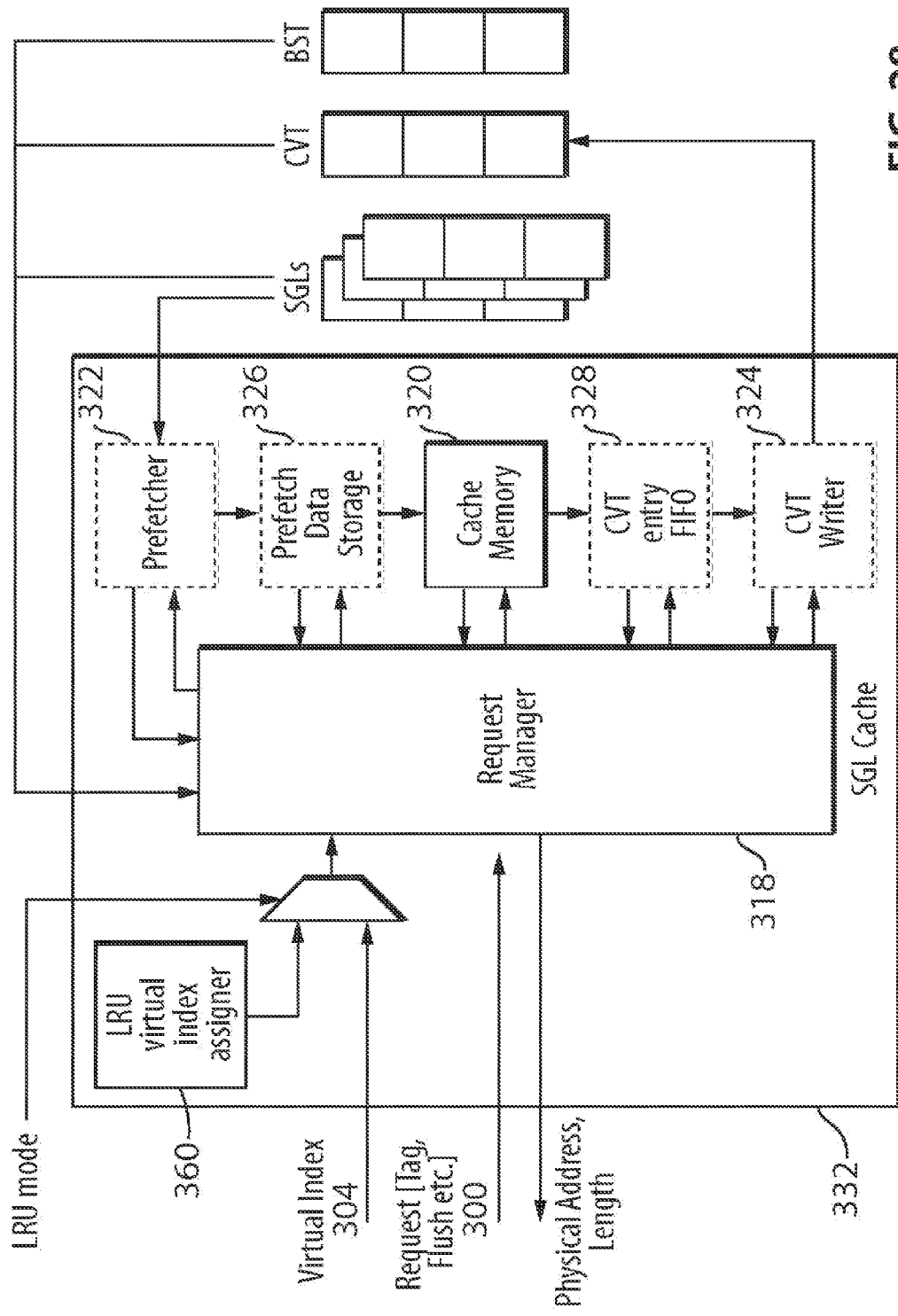
FIG. 28 shows an example of how the SGL Cache of FIG. 20 can be re-structured to support LRU as well.

FIG. 28 shows an example of how the SGL Cache of FIG. 20 can be re-structured to support LRU as well, and includes an LRU virtual index assigner 360. The virtual index 304 of the incoming request 300 is muxed (multiplexed) out if the LRU mode is selected for operation.

For example, consider one embodiment of the two-dimensional SGL Cache in which the number of virtual indices is equal to the number of cache lines. This SGL Cache with the LRU virtual index assigner 360 can be used to implement a fully associative cache with a LRU (Least Recently Used) replacement policy with minimal changes to the way virtual indices are assigned. For implementing LRU, the virtual indices can be assigned by the SGL Cache, in particular the LRU virtual index assigner 360, and not by the incoming requestor or PHY. The key element to implementing LRU is to know which cache line to replace (the least recently used cache line). Since the number of cache lines is equal to the number of virtual indices, the virtual indices can be used as a sort of 'relative time' number to mark the cache lines in a gradient fashion from the 'oldest' to 'newest' entries. For example, in a SGL cache with 4 virtual indices, virtual index '0' could always mark the oldest cache line, while virtual index '3' marks the newest. Virtual index '1' is older than index '2' but newer than '0', while virtual index '2' is older than '3', but newer than T. In this fashion, the same virtual indices can be re-used to evict the least recently used entry (virtual index '0') whenever there is a need to evict a cache line.

Bandwidth Distribution/QoS

As mentioned earlier, the virtual indices can be used to ensure a certain data bandwidth distribution between the PHYs 256 of the design. So far, examples have been described that use a one-to-one mapping between a virtual index, cache line and PHY. Some alternative embodiments are now discussed.

In one usage example, multiple virtual indices are mapped to one PHY 256, with a one-to-one association between a cache line and virtual index. This PHY 256 therefore has an increased probability of getting a 'hit' in the SGL Cache 320 for a DMA that it is servicing and therefore an increase in bandwidth. The assignment of a virtual index to a request on the PHY can be dynamic (round-robin for example), or the choice of virtual index can be left to the SGL Cache (LRU for example, as demonstrated in 0), and in any case performed by the LRU virtual index assigner 360.

In another usage example, multiple PHYs 256 are mapped to the same virtual index, with a one-to-one mapping between virtual index and cache line. Therefore these PHYs 'share' the bandwidth on that cache line via the virtual index. This scheme can be used for low bandwidth applications.

Figure 29:
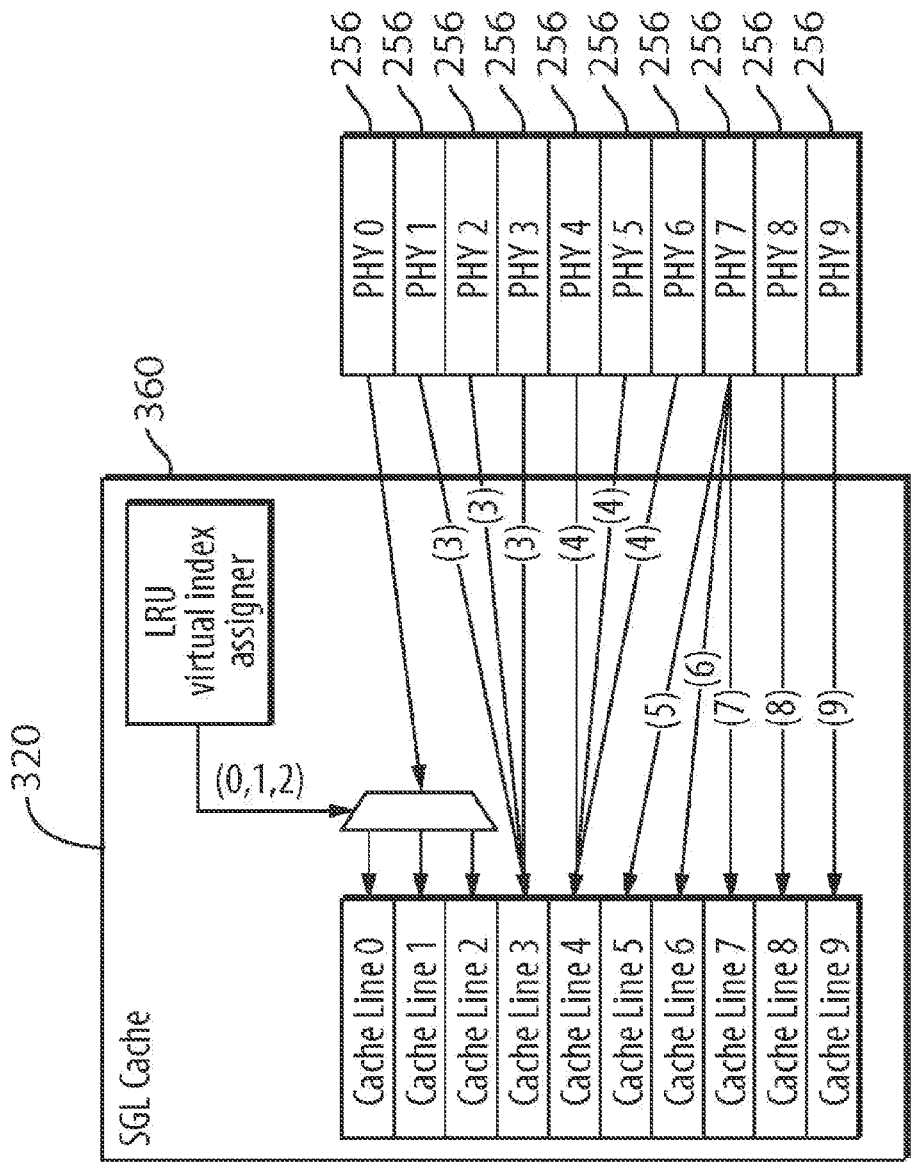
FIG. 29 illustrates virtual index allocations according to embodiments of the present disclosure.

Both of these usages are illustrated in FIG. 29, which illustrates virtual index allocations. PHY 0 is assigned a cache line using the SGL Cache's internal LRU module 360. PHYs 1, 2 and 3 all use the same virtual index (3) and therefore share the usage of cache line 3. PHYs 4, 5 and 6 similarly share cache line 4. PHY 7 chooses virtual indices 5, 6 or 7 dynamically (round-robin) and therefore consumes cache lines 5, 6 and 7. PHYs 8 and 9 are directly mapped to cache lines 8 and 9.

One advantage in such an embodiment is that these distributions of bandwidth via distribution of virtual indices allow us to dynamically change the bandwidth distribution to PHYs. An SGL Cache 320 can therefore be designed to be programmable in order to accommodate several different bandwidth usage scenarios. The SGL Cache 320 can be designed to have a programmable mapping between cache lines/virtual indices/PHYs, with the ability to re-program the SGL Cache on the fly.

Large 'Hit' Penalty

Under certain conditions, even when a particular BST index 'hits' in the cache, the cache incurs a large 'hit penalty' time in attempting to service the SGL request. This is due to the fact that the cache can only hold a limited number of elements from a particular SGL. If the list is large, there is good chance that the cache will run out of valid SGL elements once in a while and will have to go out to memory to fetch more elements from that SGL. The hit penalty is especially bad if the memory is high latency.

Figure 30:
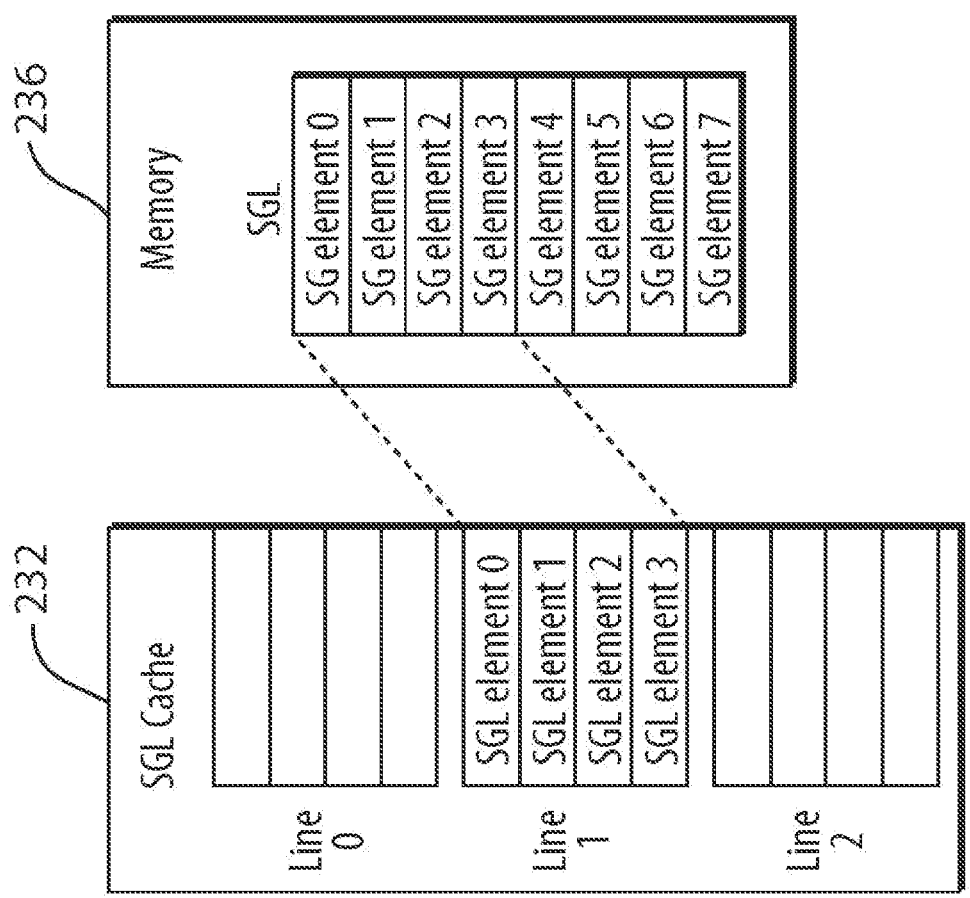
FIG. 30 shows an embodiment of the earlier described SGL cache design that stores up to 4 SGL elements per cache line.

FIG. 30 shows an embodiment of the SGL cache 232 that stores up to 4 SGL elements per cache line. In this case, the first time a request is made for a particular SGL, the SGL Cache 232 will go to memory 236 and fetch the first four elements of that SGL. After this is done, the SGL cache 232 is successfully able to return SGL information for a DMA transfer that 'hits' into Line 1 of the cache for some time. However, when the request comes in for SGL element 4, the cache 232 has now run out and must go back to memory 236 to fetch the next four SGL elements in order to return SGL information. During the time that the SGL Cache 232 spends in fetching the SGL elements, the DMA Master is kept waiting for SGL information (thus the term 'hit penalty') and this in turn directly affects DMA performance.

Prefetching

In an embodiment, the present disclosure provides for prefetching a dynamic or fixed number of SGL elements in order to hide the memory latency and reduce the 'hit' time of the Scatter-Gather element cache. Prefetch bandwidth can be saved by triggering a prefetch only when a request is present for that SGL, and it hits into the SGL, and it satisfies the prefetch criteria (number of SGL elements remaining or used, extension is present or not etc).

Referring back to FIG. 20, the Prefetcher 322 is described in the context of a system according to an embodiment of the present disclosure. If the Request Manager 318 is able to find SGL information in the cache 332 while servicing a request, it checks to see how many SGL elements the requestor has consumed.

In an embodiment, any time the requestor has consumed more than a predetermined number of SGL elements in the cache line, the Request Manager 318 will attempt to launch a prefetch for that BST index (SGL), by writing a prefetch context for that BST index into the Prefetcher 322. The Prefetcher 322 then launches a prefetch for that BST index, prefetches a number of SGL elements and stores it in the Prefetch data storage 326. The Prefetch data storage 326 then stores this data into the same cache line that contains the BST index that was used to launch the prefetch. The size of the Prefetch data storage 326, or the number of prefetches that the Prefetcher 322 can handle can vary with each embodiment and is dependent on performance and other trade-offs.

In an embodiment, the hit penalty problem is solved by 'prefetching' SGL elements before they are needed by the DMA. In an aspect, the SGL elements are prefetched before the DMA needs it, thereby preventing the DMA from stalling due to a lack of SGL elements.

In an embodiment, the prefetching is initiated ONLY when an incoming request hits into a cache line AND that cache line satisfies the threshold and other criteria for prefetching (this prevents wasting of prefetch bandwidth on cache lines that are not high usage). The 'Prefetcher' module 322 shown in FIG. 20 performs this function. As a example, in one preferred embodiment of the cache, each cache line contains upto 8 SGL elements from an SGL list. Also, the 'Prefetcher' module 322 sends out prefetches for 4 SGL elements at a time. The prefetches are sent out when the SGL cache 332 has 'used up' atleast 4 elements in the SGL cache (meaning that there are 4 'used' elements that can be replaced by 4 'new' elements. By doing this scheme, we ensure that we are bringing in SGL elements into the SGL cache 332 before they are needed by the DMA, thereby 'hiding' the Hit Penalty by hiding the latency involved in fetching SGL elements from memory.

Figure 31B:
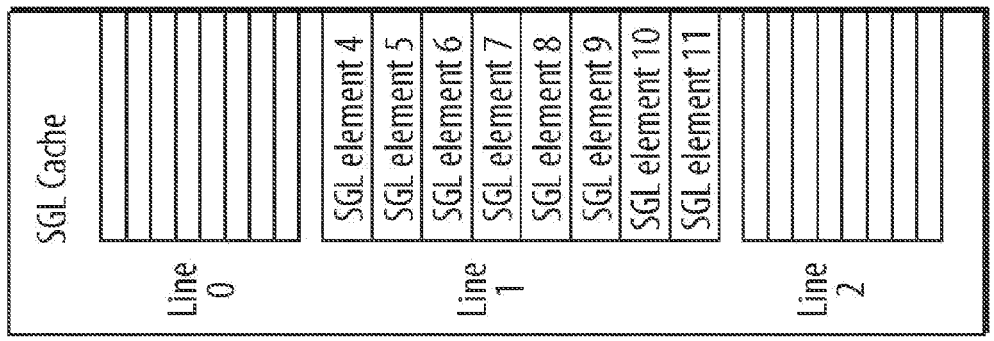
FIG. 31B illustrates a prefetch complete.
Figure 31A:
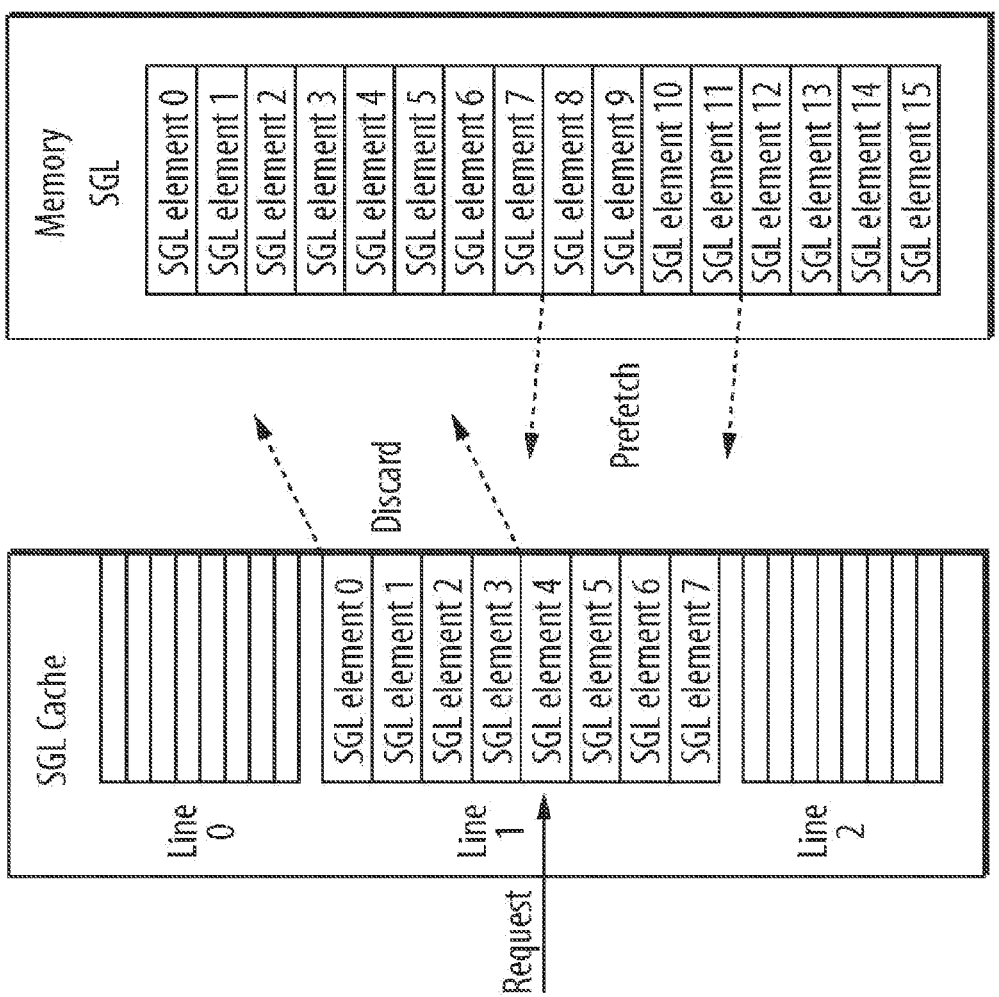
FIG. 31A illustrates an example of a prefetch requested.

FIG. 31A illustrates an example of a prefetch requested, and FIG. 31B illustrates a prefetch complete. One scenario that may happen during the course of operation is that the Prefetcher 322 is full and cannot accept a request from the Request Manager. Various embodiments can be provided to deal with this situation. In one such embodiment, the Request Manager 318 discards the prefetch request and continues on without stalling—that SGL loses a chance to prefetch its elements.

Because of the nature of prefetches, it is possible that the Prefetcher 322 may attempt to decipher invalid data after the end of an SGL and run into various error conditions because it does not have information that those locations may be invalid. For example, an SGL list may be only 4 elements long. The Prefetcher 322 may send out a fetch for SGL elements 5 though 8, which are non-existent. After the data returns, the Prefetcher 322 may mis-operate when attempting to translate the random data returned. Various embodiments can address such situations. In one such embodiment, the Prefetcher 322 does not issue any prefetches if it observes the presence of an extension SGL element in the cache line. Another embodiment can use the presence of the EOB bit as a prefetch enable signal, only prefetching if none of the elements in the cache line have this bit set.

As another example of an error condition, it is possible that the cache entry for a particular SGL may have been evicted before the Prefetcher data returns. Again, various embodiments can be provided to address this. In one such embodiment, when a context is evicted from cache to be written to the CVT entry FIFO 328, the BST index of this SGL entry is also sent to the Prefetcher state machine, and a discard bit is set in the corresponding SGL's entry into the 'Prefetch data storage' 326 to indicate that the data returned for that prefetch is to be discarded.

Large 'Miss Penalty' Due to SGL Traversal

Due to the nature of caching, it is expected for caches to have some sort of 'miss penalty'. However, in some implementations, this penalty may be exacerbated greatly when a miss occurs on transfers with long SGLs. This is due to the fact that when a miss occurs, the SGL Cache will traverse the SGL starting from the beginning SGL element in the list and will have to work its way down the list until it reaches the SGL element that is required to service the DMA transfer.

Figure 32:
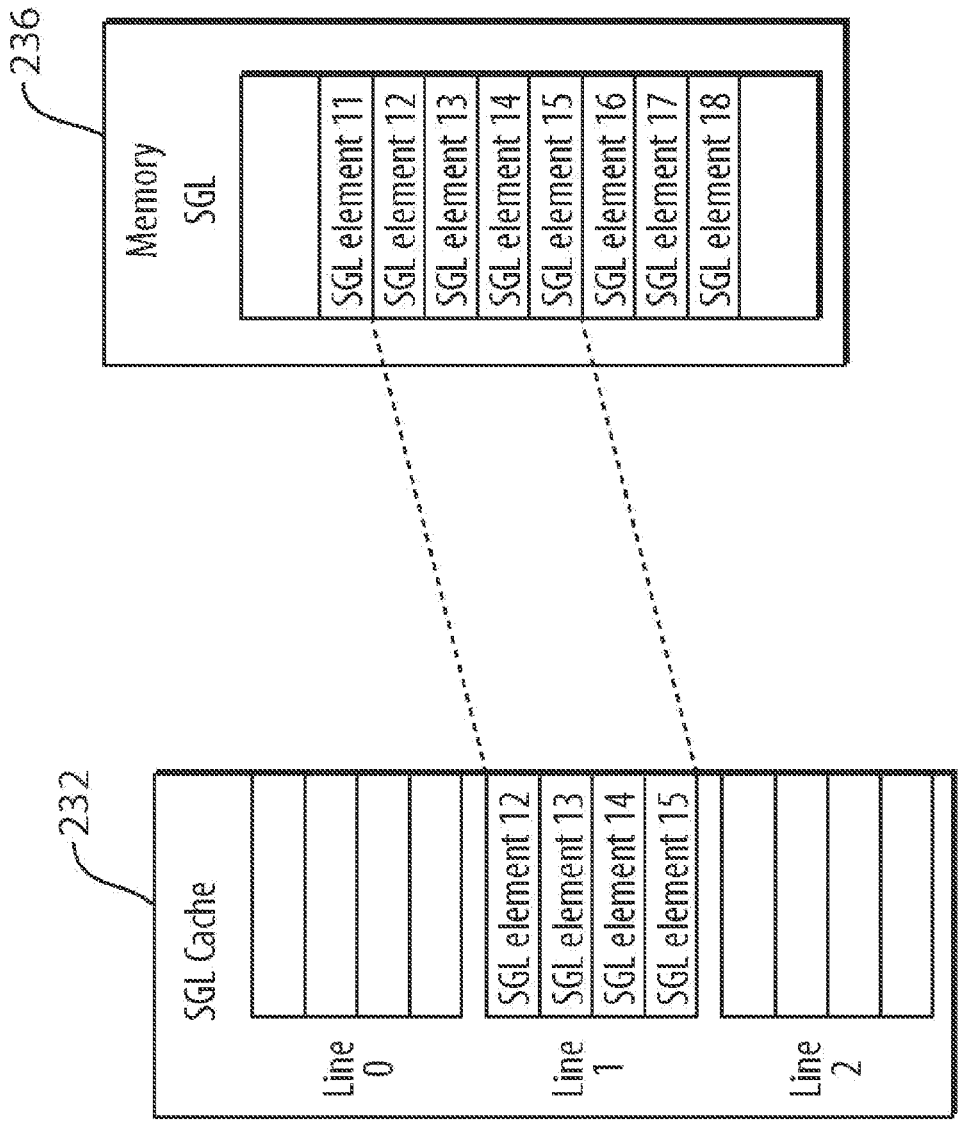
FIGS. 32 and 33 illustrate a miss penalty due to pre-eviction and list traversal, respectively.
Figure 33:
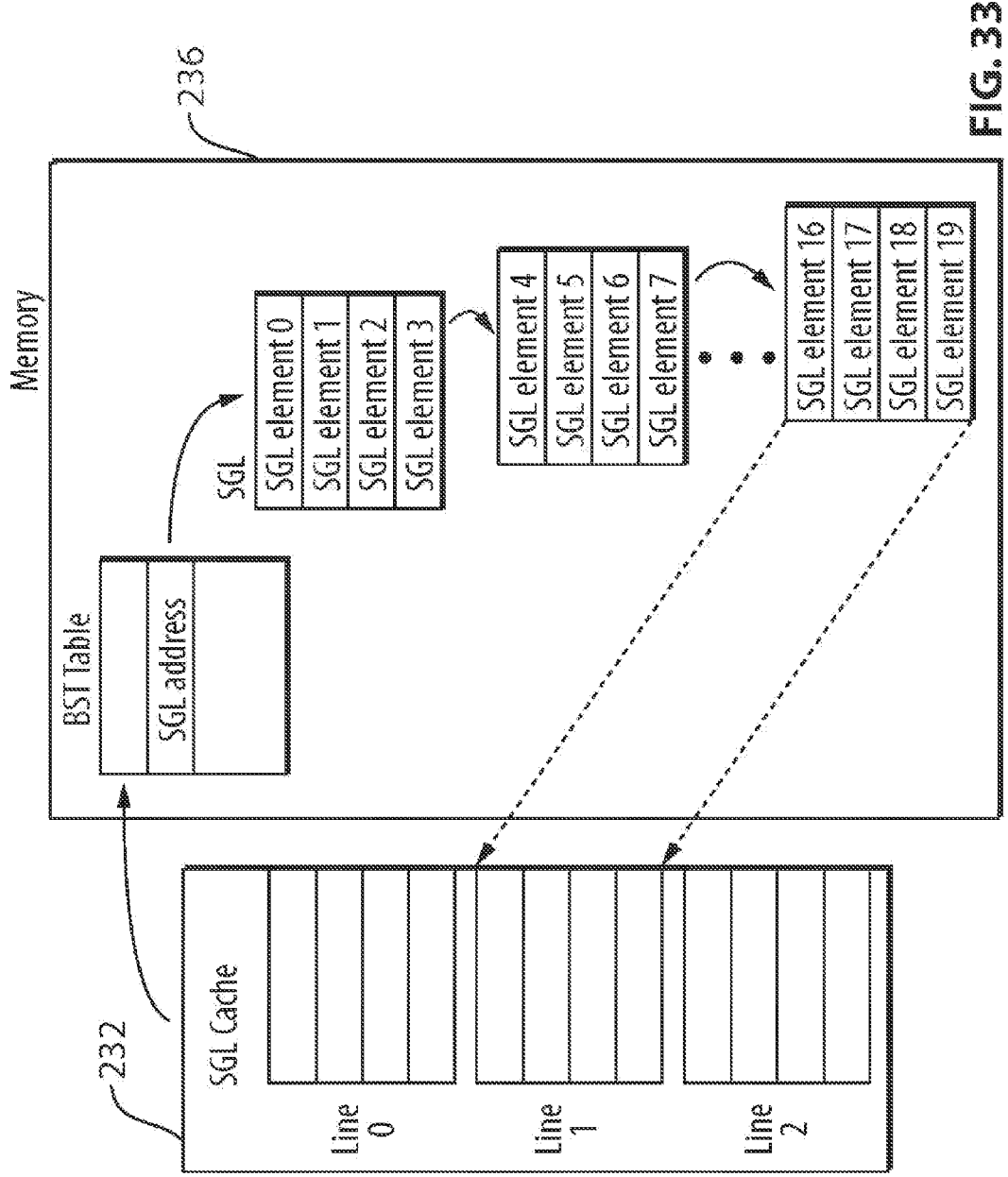

FIGS. 32 and 33 illustrate a miss penalty due to pre-eviction and list traversal, respectively. Consider an example of an SGL with 20 elements. Cache Line 1 initially serviced the request for this SGL and eventually held SGL elements 12 through 15 (FIG. 32). Sometime later, this cache line is evicted and used for another SGL. A short while after that, a request was made for SGL element 16 of the original list. The SGL Cache 232 now starts over and first reads the BST Table in order to find the starting address of the SGL. After this is done the SGL Cache 232 traverses the entire SGL in memory 236 starting with SGL element 0 and brings in four elements at a time until it reaches SGL element 16, which was required to satisfy the DMA transfer. This is illustrated in FIG. 33. This process of traversing the list is quite costly and degrades performance, especially with a high latency memory.

Context Victim Table

As described earlier, embodiments of the present disclosure provide a 'context' victim table (CVT) 330 (shown in FIG. 21) rather than a 'data' victim table to store evicted cache entries from a Scatter-Gather Cache. A CVT entry can be used to quickly resume Scatter-Gather operations on a DMA by storing, in the entry, the address of the most recently requested SGL element in the SGL and its accumulated offset in the SGL.

The Miss Penalty problem can be solved using the CVT Writer 324 of FIG. 20 and the CVT 330 shown in FIG. 21. Since the CVT Writer 324 writes out the current 'context' of an evicted SGL element, the SGL Cache 332 can then use this content information the next time this list is used by a DMA, thereby letting the SGL Cache 332 'pick up where it left off' in the SGL. This is a central idea behind the CVT 330 usage of the SGL Cache 332.

In an embodiment, unlike typical Victim Caches that contain the 'data' that was evicted from the cache line, each CVT entry only contains the 'context' (SGL address etc) that points to the 'data' (SGL), thereby saving memory space and minimizing the size of the CVT 330.

Support for Multiple SGL Caches

One of the other features of the SGL Cache 332 is that multiple instances of the Cache can be used in the same system for improving performance of the system. In such a system, there is a plurality of SGL Caches 332 and there may also be a plurality of DMA Masters 240 that access these Caches. In the simplest case, one DMA Master 240 has a plurality of SGL Caches 332 to whom the Master 240 assigns SGL requests, distributing the requests between the SGL Caches 332 as the Master sees fit for maximizing throughput.

In such a system, there is the possibility of corruption of the CVT 330, because it is both written to and read by multiple instances of the SGL Cache 332. This is because the CVT 330 is typically indexed using the BST index, and if the BST index were issued to one (first) SGL Cache instance and then subsequently re-issued to another (second) SGL cache instance, there is a possibility that stale data from the first SGL Cache instance overwrites the current data information from the second SGL Cache instance. This will happen if the stale information gets evicted from the first SGL Cache instance AFTER current information gets evicted from the second SGL Cache instance.

Figure 34:
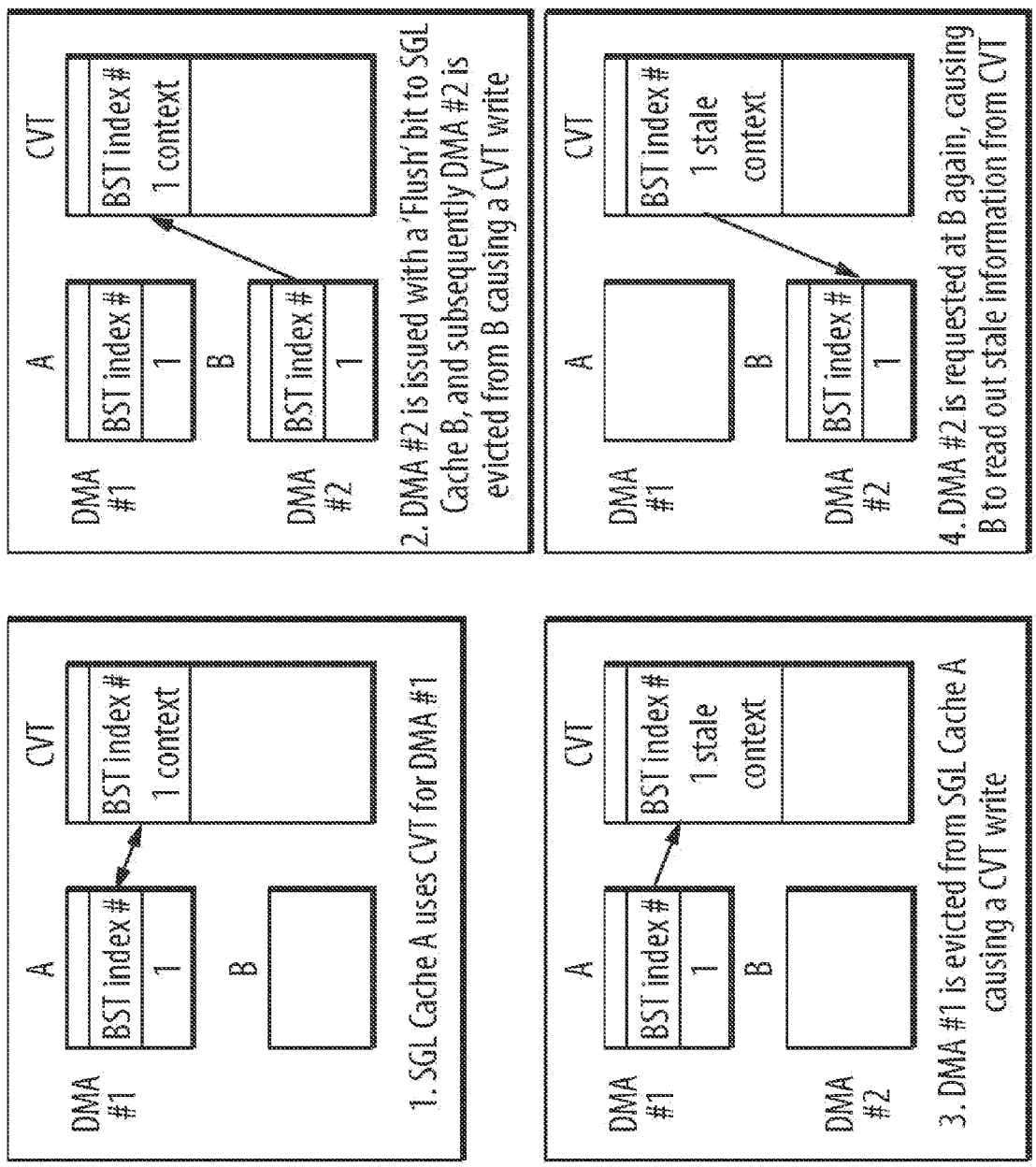
FIG. 34 illustrates a problem of CVT corruption using two SGL Cache instances.

FIG. 34 illustrates this problem of CVT corruption using two SGL Cache instances 'A' and 'B', where BST index #1 is used first for DMA #1 and is then subsequently re-used for DMA #2.

There are various ways to solve this issue, summarized below.

Dedicated BST Indices Per SGL Cache

In one embodiment, the total BST indices (say 'n') are divided amongst the 'k' instances of SGL Caches 332, so that no BST index is 'shared' among the SGL caches. This has the effect of splitting up the CVT 330 into dedicated sections that are accessible only by one SGL Cache instance. Since only one instance 'owns' the BST index, there is no possibility of corruption. The distribution of the indices to the SGL Cache 332 can be done either by firmware/CPU or using various other methods.

Dedicated CVT Per SGL Cache

In another embodiment, each SGL Cache 332 is given its own CVT memory space. If there are 'n' BST indices and 'k' SGL Caches 332, then the total memory space required (in terms of CVT entries) would be 'k'בn'. By duplicating the CVT 330 per SGL Cache instance, we avoid the possibility of corruption, and all BST indices can be re-issued across all SGL Cache instances.

CVT Coherency Check

In yet another embodiment, each SGL Cache 332 instance writes a constant but unique 'number' or 'code' into each CVT entry context when writing into the CVT 330. Also, each SGL Cache 332 checks to see if the number or code matches when it reads an entry from the CVT 330. If the number or code doesn't match, then the SGL Cache 332 knows that the entry does not belong to it (the entry has been written to by some other SGL Cache instance) and discards the CVT data, preventing corruption. It then reads the BST table for information on that particular SGL and resumes operation. In the simplest case, the 'code' is just the instance number of the SGL Cache—for example SGL Cache instance '0' will write a '0' into a field in the CVT context, SGL Cache instance '1' will write a '1' in this field and so on. An advantage of this scheme is that all of the BST indices can be shared across all SGL Caches (which could not be done using the 'Dedicated BST indices per SGL cache' scheme) without having to duplicate or increase the size of the CVT 330 (which could not be done using the 'Dedicated CVT per SGL Cache' scheme).

Bandwidth Degradation Due to 'Flush'

BST indices are uniquely used to identify an SGL. When an I/O or DMA transfer has run its course, a BST index can then be re-assigned to another SGL to be used as part of another I/O. However, the SGL Cache 332 may still have remnants of the previous SGL used cached under the BST index. In order to maintain coherency, the original SGL Cache design required a 'flush' operation before a BST index was reassigned to another SGL—the flush operation invalidated the SGL contents of a cache line if that BST index was present in that cache line.

A downside to this approach was that it ate into firmware bandwidth. Each 'flush' request originated from Firmware, and was done using a handshaking mechanism wherein firmware would post a flush request and wait for the SGL Cache 332 to acknowledge the flush request. The wait period was indeterminate, since the SGL Cache 332 may be servicing an SGL request at the time the 'flush' request arrives, and the SGL Cache 332 will only honor the flush request after the SGL request service has been completed. This causes unnecessary burden on firmware (because firmware has to wait and poll the SGL Cache 332 to ensure that the 'flush' request is complete) and bandwidth degradation (because firmware cannot issue an I/O with the BST index unless it knows the SGL Cache 332 has flushed it).

Inline Flush

In an embodiment of the present disclosure, a 'Flush' bit 306 is used along with the incoming request to clear the BST Index's previous association with an SGL (a just-in-time flush), instead of having a dedicated 'flushing' path. This improves the SGL Cache's performance, such as in the previously described miss without eviction scenario. The 'Flush' bit 306 can be used to determine if, on a Miss, the Cache should go to the CVT 330 or not to fetch information for that SGL, such as in the miss without eviction scenario. The 'Flush' bit's functionality can be re-used to clear out the Error context field associated with that BST index in the cache line.

The bandwidth degradation problem due to flushing can be solved by the usage of the 'Flush' bit 306, as described earlier. Unlike embodiments where each BST index was flushed using a mechanism that was separate from the SGL Request, this embodiment uses the 'Flush' bit 306 as a sort of qualifier on the incoming request to indicate to the SGL Cache 332 that the current BST index is being newly re-used for a SGL. Therefore, firmware does not need to flush a BST index from the SGL Cache 332 before re-issuing it for a new SGL list—it just updates the BST Table, and then sets the 'Flush' bit as part of the incoming SGL request the first time it re-issues the BST index. Therefore, rather than dedicating a separate path for 'flushing' BST indices, they are flushed as part of the incoming request when the BST index is re-issued for a new SGL. This 'inline' flush methodology is another advantage of an SGL Cache 332 according to an embodiment of the present disclosure.

Error Handling

Figure 35:
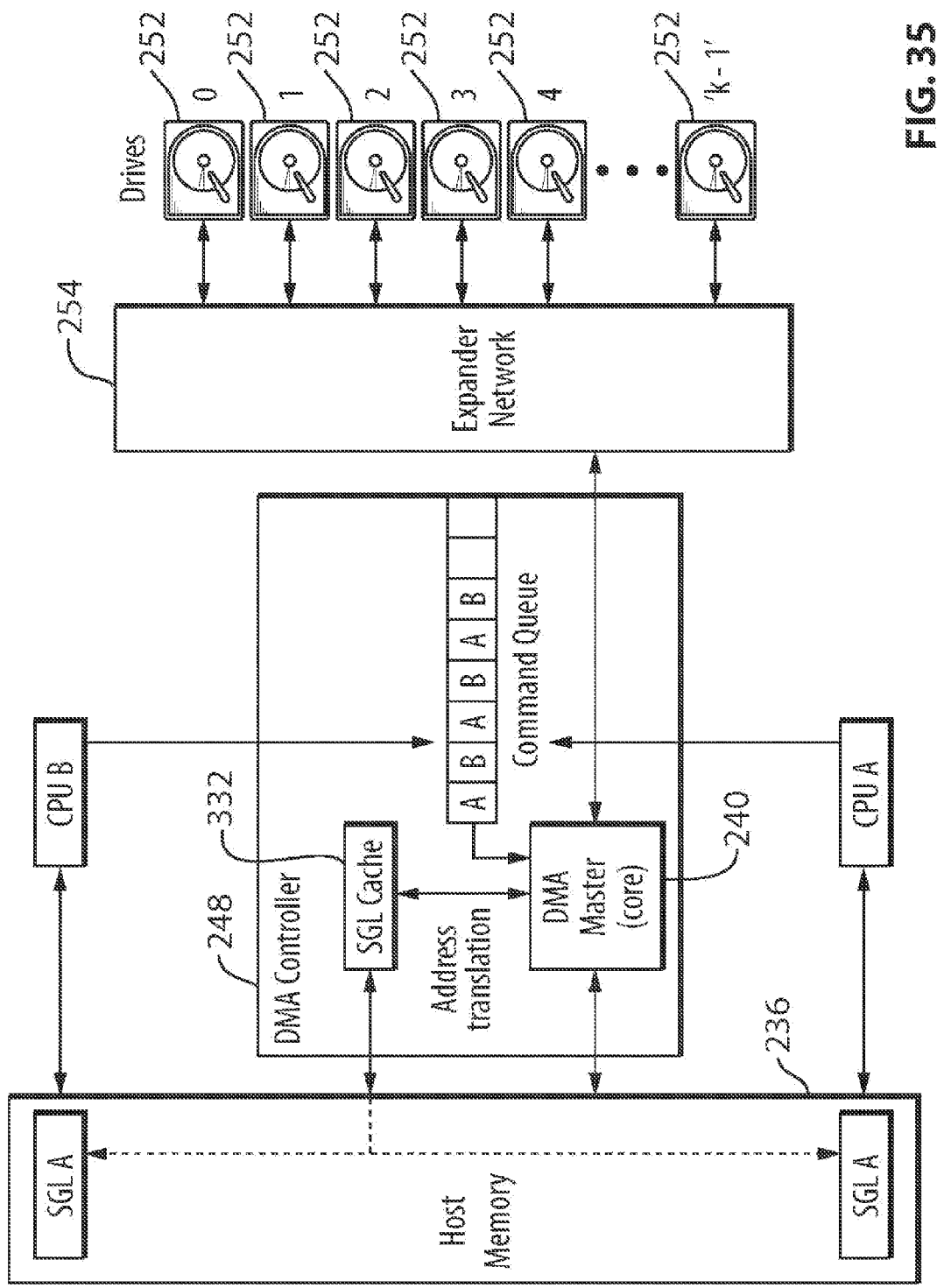
FIG. 35 illustrates a system with two CPUs according to an embodiment of the present disclosure.

Some approaches to SGL design do not have sophisticated error handling techniques, which eased error handling scenarios for DMA Masters in the design. This is best illustrated with an example. Consider a system with two CPUs A and B as shown in FIG. 35. The DMA Master 240 is servicing both CPUs' DMA requests with the help of the SGL Cache 332, which helps translate the SGL lists for accessing the CPU memories. CPU A has I/O 'A' in progress while CPU B has I/O 'B' in progress. Both I/Os use several DMAs to complete the transfer from the drives. As seen in FIG. 35, the DMA Master 240 services both CPU A and B in a fair fashion by alternating service between their DMAs, which are placed in its command queue. The CPUs create the SGLs A and B in Host Memory, which will be read by the SGL Cache 332 in order to do the address translation for the DMA Master.

Consider a scenario in which CPU A failed, and is now out of commission. The SGL A, which was maintained by this CPU will no longer be accessible by the SGL Cache 332 and any attempts to access this list will return an error back to the SGL Cache 332. Also, any attempts to write/read data from Host Memory 236 by the DMA Master 240 for CPU A's DMAs will be met with an error response. Two main issues arise in this situation:

1. A number of DMAs for CPU A are already in progress and commands for read/write have been issued to the drives. This means that the drives in the system (0 through 'k−1') will be sending or expecting to receive data for those outstanding commands. Although some of those commands can be aborted, some data may already be in-flight for those commands from the drives (in case of a read from the drive) and the DMA Master 240 has to now put that data somewhere. The SGL Cache 332 merely returns an error status back to the DMA Master (that it could not find/access the SGL), but the DMA Master 240 needs a physical address to write to. (This problem is therefore present even in a system with a single CPU).

2. The command queue for the DMA Master 240 still contains a number of DMA commands from CPU A, which are interleaved with DMA commands from CPU B. Given that CPU A is non-functional, every DMA belonging to CPU A will error out (SGL Cache unable to read SGL or DMA Master 240 unable to read/write from certain locations in memory). However, each error generation itself may take a significant amount of time (due to the timeout values in the system) and may happen multiple times during a single DMA operation. However, because CPU A's DMAs are interleaved with CPU B's DMAs, CPU B's DMAs are unduly delayed, which may cause CPU B to abort or restart operations unnecessarily.

Remembering Error States

In an embodiment of the present disclosure, the error status of a given SGL is 'stored' in the cache line using an error context field. An error status is returned on subsequent requests for that SGL, for faster 'flushing' of these errored transfers and for preventing good transfers from aborting due to timeouts. A legacy DMA Master compatible 'bit-bucketing' address and an associated length (size) can be returned to the DMA Master 240 on encountering an error, which helps the DMA Master 240 finish up the transfer.

The error handling issues mentioned above are solved in the below-described SGL cache design by providing the following modifications and enhancements:

1. Whenever the SGL Cache 332 encounters an error when attempting to access an SGL, it marks that SGL entry (BST index) in the cache memory with an error context field. In an embodiment, when the DMA Master 240 attempts to access that SGL subsequently, the SGL Cache 332 will immediately return the error status instead of trying to access that SGL in memory. This error context field is also written out as part of the victim table context when the SGL is evicted from the cache into the context victim table. Therefore, the SGL Cache 332 is able to retrieve this error status from the context victim table if need be to indicate the error. This error context field is only cleared if the 'Flush' bit 306 is set in the incoming request along with the BST index (because the 'Flush' represents the re-use of the bst index for another SGL). In an aspect, the system 'remembers' the error status of a given SGL and returns an error status immediately when a request comes in for that SGL. In another aspect, this error status is cleared when the 'Flush' bit 306 is set for that BST index.

2. The SGL Cache 332 returns a 'bit-bucket' SGL address and an error fragment size (programmable or fixed, depending upon the embodiment) to the DMA Master 240 along with the error status when it encounters an error condition. The 'bit-bucket' SGL address indicates to a DMA Master 240 that it may discard data (in case of write) or makeup data (in case of a read) for up to the size of the fragment. In an aspect, a 'discard' address is given to the DMA Master 240 in case of an error on an SGL request.

Therefore, an SGL Cache 332 according to an embodiment of the present disclosure overcomes the error scenario deficiencies as described above and presented in FIG. 35. Because the SGL Cache 332 returns a 'bit-bucket' address to the DMA Master 240, the DMA Master 240 can now simply discard any data in-flight for that DMA. This solves the issue of returning a physical address to the DMA Master 240 in case of an error scenario.

Also, because the SGL cache 332 'remembers' the error generated for an SGL using the error context field, it is able to immediately return an error status to the DMA Master 240 when a request is made for that particular SGL, rather than actually attempt to fetch that SGL again from memory. This 'flushes' out the errored DMAs faster, which in turn means that the DMAs of a good CPU are no longer unnecessarily delayed.

Embodiments of the present disclosure provide advantages over some other approaches to SGL caches, which can have one or more of the following limitations: master must be SGL aware; master has to keep track of the current SGL head, SGL current entry, and the offset within current pointer; master carries the burden of maintaining SGL context (must maintain contexts of SGL lists of both the read and the write sides); master cannot switch context between I/O transfers without penalty; master only keeps the context of the last SGL element fetched, and cannot traverse an SGL element before or after the current element without penalty (i.e. no SGL element caching); little or no caching intelligence across multiple transfers (global no retirement algorithm); most schemes first buffer the data read from the non-contiguous memory locations pointed to by the SGL list before writing the data in order to simplify transfer and improve performance; no safety net if master crosses the end of the SGL list (i.e. attempts to transfer more than the list supports); fixed offset scatter/gather context maintenance and no support for random offset scatter/gather elements; pre-fetch of descriptor lists rather than SGL lists (each SG element may have its own descriptor); fetching blocks of SGL lists (segments) rather than 'caching' lists; MMU type approach (Data prefetch) with TLB rather than storing the list; and/or no advanced error handling methods or error context storage methods.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of scatter gather (SG) cache processing comprising:
    receiving a DMA request having a tag and a virtual index, the tag comprising a buffer state table (BST) index uniquely identifying a scatter gather list (SGL);
    comparing the tag and virtual index of the received DMA request with tag and virtual index pairs for a plurality of cache lines in an SGL cache memory; and
    processing the DMA request based on the comparison of the tag and virtual index values in the DMA request and in the SGL cache memory.

2. The method of claim 1 wherein each virtual index value is equal to a cache line number.

3. The method of claim 1 wherein a plurality of virtual indices are mapped to one PHY.

4. The method of claim 1 wherein a plurality of PHYs are mapped to the same virtual index.

5. The method of claim 1 further comprising providing a one-to-one mapping between a PHY, virtual index and a cache line to provide bandwidth dedication for the PHY.

6. The method of claim 1 further comprising performing cache line replacement and eviction based on virtual index.

7. The method of claim 1 further comprising writing out a current context of an evicted SGL element to enable the SG cache.

8. The method of claim 7 wherein the current context comprises an address of the most recently requested SGL element and its accumulated offset in the SGL.

9. The method of claim 7 further comprising resuming data transfers for an SGL associated with the evicted SGL element without having to traverse the entire list.

10. The method of claim 1 further comprising storing an error status of a given SGL; and returning an error status substantially immediately when a subsequent request is received for the given SGL.

11. The method of claim 1 further comprising providing a discard address to a DMA master in response to an error on an SGL request.

12. The method of claim 1 further comprising prefetching a plurality of SGL elements before a DMA requires the plurality of SGL elements for processing.

13. The method of claim 12 further comprising prefetching the plurality of SGL elements when a request is present for a given SGL and the DMA request matches the given SGL and the request satisfies prefetch criteria.

14. The method of claim 1 further comprising:
    when the DMA request's tag matches a tag stored in a first cache line and the DMA request's virtual index matches a virtual index stored in a second cache line, swapping the virtual indices of the first and second cache lines, to avoid swapping cache line data and cache line tags.

15. The method of claim 14 wherein the DMA request comprises a flush bit that is set, the method further comprising:
 fetching SGL elements from the BST table for the current BST index, without accessing a context victim table (CVT), and storing the SGL elements in the cache line that matches the tag of the DMA request.

16. The method of claim 1 wherein processing the DMA request comprises:
 returning SGL elements from a selected cache line when both the tag and virtual index of the request match a stored tag and virtual index pair associated with the selected cache line.

17. The method of claim 1 wherein the DMA request comprises a flush bit that is set, and wherein processing the DMA request comprises:
 fetching SGL elements from the BST table for the current BST index, without accessing a context victim table (CVT), and storing the SGL elements in a cache line that matches the tag of the DMA request, when the virtual index of the request matches a virtual index stored in the cache line.

18. The method of claim 1 wherein the DMA request comprises a flush bit that is not set, and wherein processing the DMA request comprises:
 fetching SGL elements from a context victim table (CVT) for the current BST index when the tag of the DMA request does not match any valid tags in any cache line.

19. The method of claim 18 further comprising:
 evicting another BST index stored in the cache memory to a context victim table when a cache line having a virtual index matching the incoming request's virtual index has its valid bit set.

20. The method of claim 1 wherein the DMA request comprises a flush bit that is set, the method further comprising:
 fetching SGL elements from the BST table for the current BST index without accessing a context victim table (CVT) when the tag of the DMA request does not match a valid tag in the SGL memory.

21. The method of claim 20 further comprising:
 evicting another BST index stored in the cache memory to a context victim table when a cache line having a virtual index matching the incoming request's virtual index has its valid bit set.

22. The method of claim 1 wherein stored data associated with the BST index is flushed inline as part of the incoming DMA request when the BST index is re-issued for a new SGL.

23. A scatter gather (SG) cache module, comprising:
 a memory management system interface to interface with a memory management system controller to exchange information about SG elements;
 an SG cache memory for storing SG element context in one or more cache lines; and
 a request manager in communication with the memory management system and the SG cache memory and arranged to:
 receive a DMA request having a tag and a virtual index, the tag comprising a buffer state table (BST) index uniquely identifying a scatter gather list (SGL);
 compare the tag and virtual index of the received DMA request with tag and virtual index pairs for a plurality of cache lines the SG cache memory; and
 process the DMA request based on the comparison of the tag and virtual index values in the DMA request and in the SGL cache memory.

24. The SG cache module of claim 23 further comprising:
 a context victim table (CVT) storing a starting address of a most recently used SGL element, to enable the SG cache to resume data transfers for an associated SGL without having to traverse the entire list.

25. The SG cache module of claim 23 further comprising:
 a prefetcher for prefetching the plurality of SGL elements when a request is present for a given SGL and the DMA request matches the given SGL and the request satisfies prefetch criteria.

26. The SG cache module of claim 23 further comprising:
 an error processing module for storing an error status of a given SGL, and for returning an error status immediately when a subsequent request is received for the given SGL.

27. A scatter gather (SG) cache module, comprising:
 a memory management system interface to interface with a memory management system controller to exchange information about SG elements;
 an SG cache memory for storing SG element context in one or more cache lines; and
 an error processing module for storing an error status of a given scatter gather list (SGL), and for returning an error status immediately when a subsequent request is received for the given SGL.

* * * * *

UNITED STATES PATENT AND TRADEMARK OFFICE
CERTIFICATE OF CORRECTION

PATENT NO. : 8,495,301 B1
APPLICATION NO. : 12/939128
DATED : July 23, 2013
INVENTOR(S) : Praveen Alexander et al.

Page 1 of 1

It is certified that error appears in the above-identified patent and that said Letters Patent is hereby corrected as shown below:

In the Claims

Column 36, claim 10, line 50, delete "substantially".

Signed and Sealed this
Twenty-fourth Day of December, 2013

Margaret A. Focarino
*Commissioner for Patents of the United States Patent and Trademark Office*